(12) United States Patent
Zhou

(10) Patent No.: US 12,346,626 B2
(45) Date of Patent: Jul. 1, 2025

(54) DISPLAY METHOD AND ELECTRONIC DEVICE

(71) Applicant: Huawei Technologies Co., Ltd., Shenzhen (CN)

(72) Inventor: Xueer Zhou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/691,350

(22) PCT Filed: Sep. 7, 2022

(86) PCT No.: PCT/CN2022/117647
§ 371 (c)(1),
(2) Date: Mar. 12, 2024

(87) PCT Pub. No.: WO2023/045763
PCT Pub. Date: Mar. 30, 2023

(65) Prior Publication Data
US 2024/0378009 A1  Nov. 14, 2024

(30) Foreign Application Priority Data
Sep. 27, 2021  (CN) .......................... 202111133943.8

(51) Int. Cl.
*G06F 3/14* (2006.01)
*G06F 9/451* (2018.01)

(52) U.S. Cl.
CPC ............ *G06F 3/1454* (2013.01); *G06F 9/451* (2018.02)

(58) Field of Classification Search
CPC ........... G06F 3/14; G06F 3/1454; G06F 9/451
See application file for complete search history.

(56) References Cited

U.S. PATENT DOCUMENTS

| | | |
|---|---|---|
| 9,129,550 B2 | 9/2015 | Doll |
| 2017/0003757 A1* | 1/2017 | Gao ...................... G06F 1/1615 |
| 2020/0326839 A1* | 10/2020 | Walkin ................ G06F 3/04883 |
| 2023/0044497 A1* | 2/2023 | Zhang ................... G06F 3/0488 |

FOREIGN PATENT DOCUMENTS

| | | |
|---|---|---|
| CN | 104581405 A | 4/2015 |
| EP | 2787434 A1 | 10/2014 |

* cited by examiner

*Primary Examiner* — Van N Chow
(74) *Attorney, Agent, or Firm* — Slater Matsil, LLP

(57) ABSTRACT

A method for sending and displaying information, including a first electronic device sending, in response to a first operation, display information on a first interface of a first application to a second electronic device. The second electronic device displays the first interface. The second electronic device indicates, in response to a screen rotation operation, a screen rotation direction of the second electronic device to the first electronic device. The first electronic device sends display information on a second interface of the first application to the second electronic device. The display information on the second interface is more than or less than the display information on the first interface, or a layout manner of the display information on the second interface is different from that of the first interface. The second electronic device displays the second interface.

18 Claims, 72 Drawing Sheets

TO

TO

TO

TO

~
TO

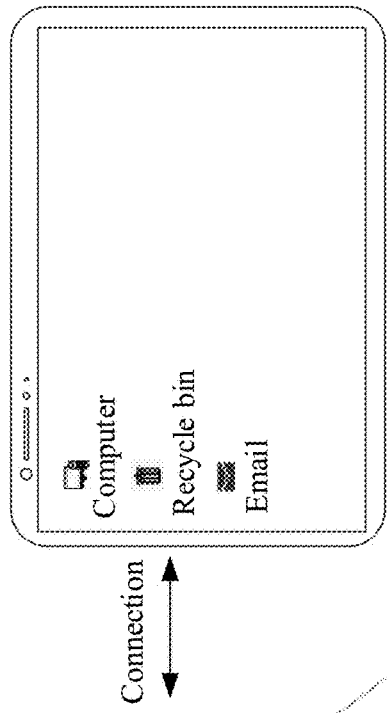
First interface of a first application
Connection
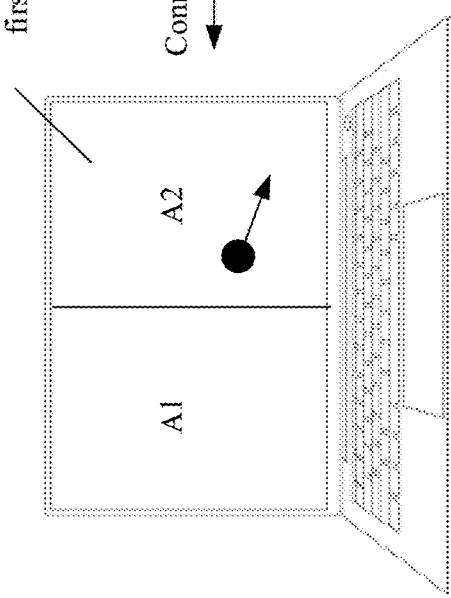
FIG. 9A(a)
FIG. 9A(b)
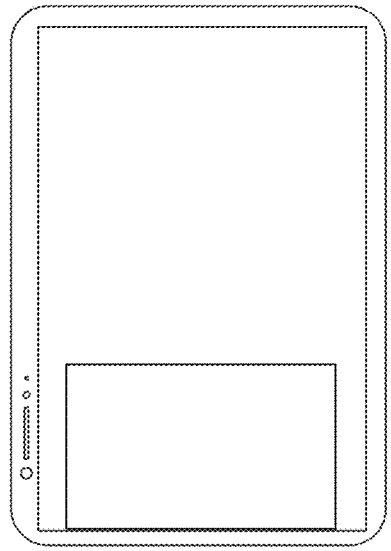
FIG. 9A(c)
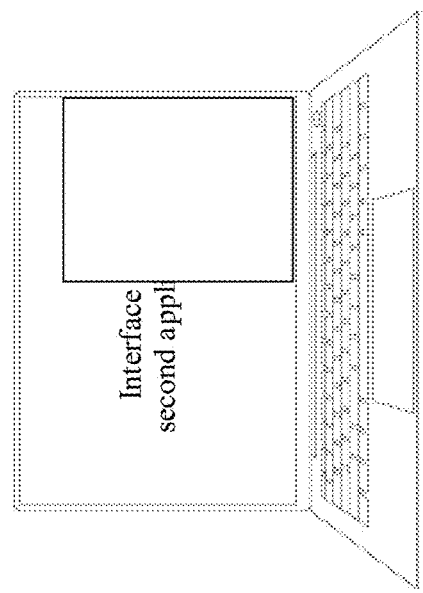
FIG. 9A(d)
TO
FIG. 9A(e)

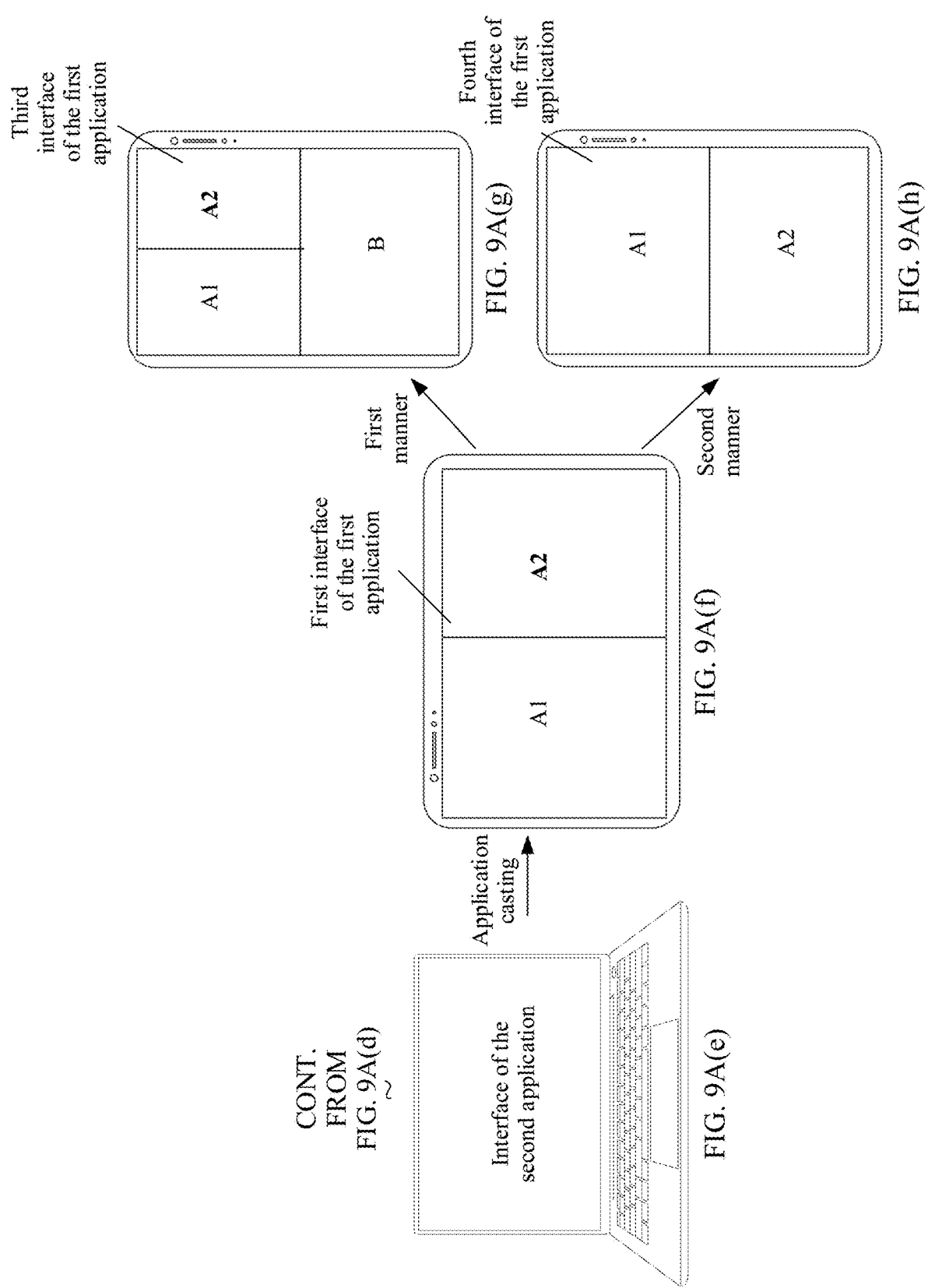

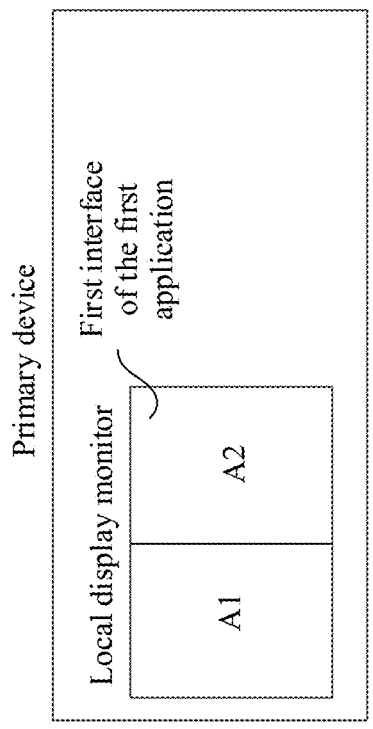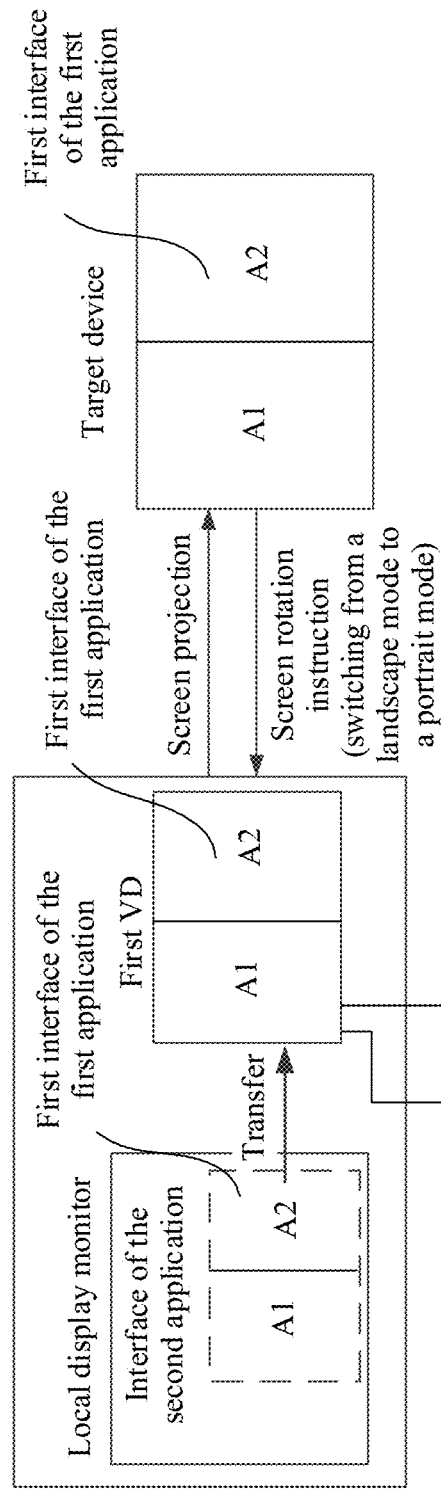
FIG. 9B(a)
FIG. 9B(b)
TO FIG. 9B(c)

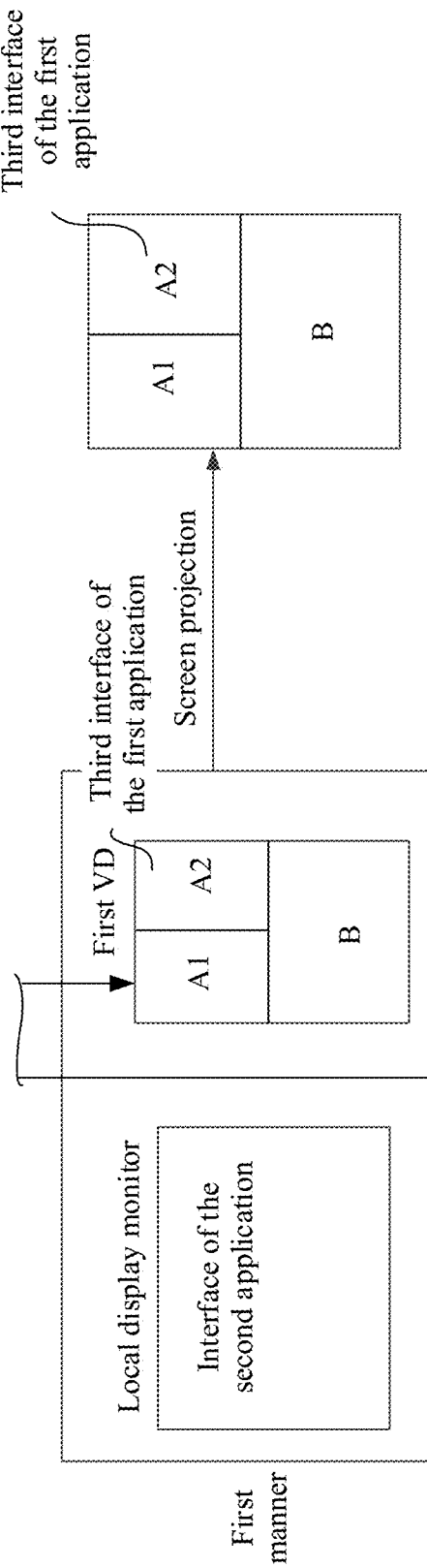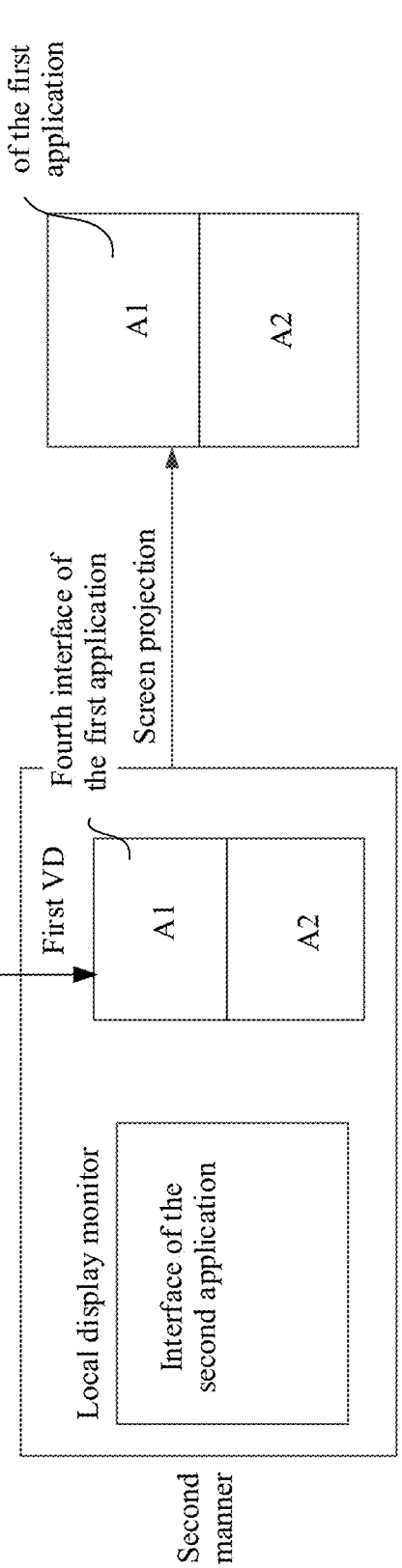
FIG. 9B(c)
FIG. 9B(d)

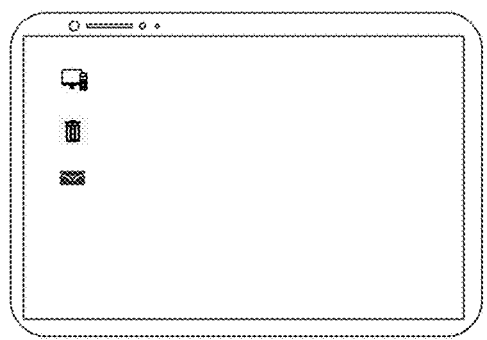
FIG. 10A(b)
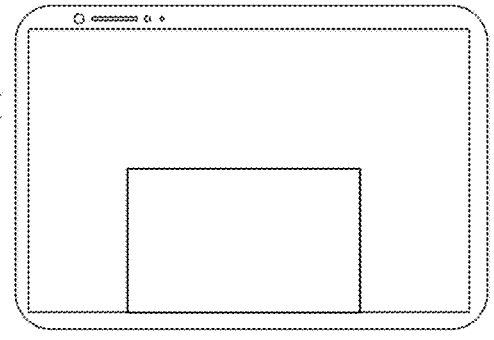
FIG. 10A(d) TO FIG. 10A(e)
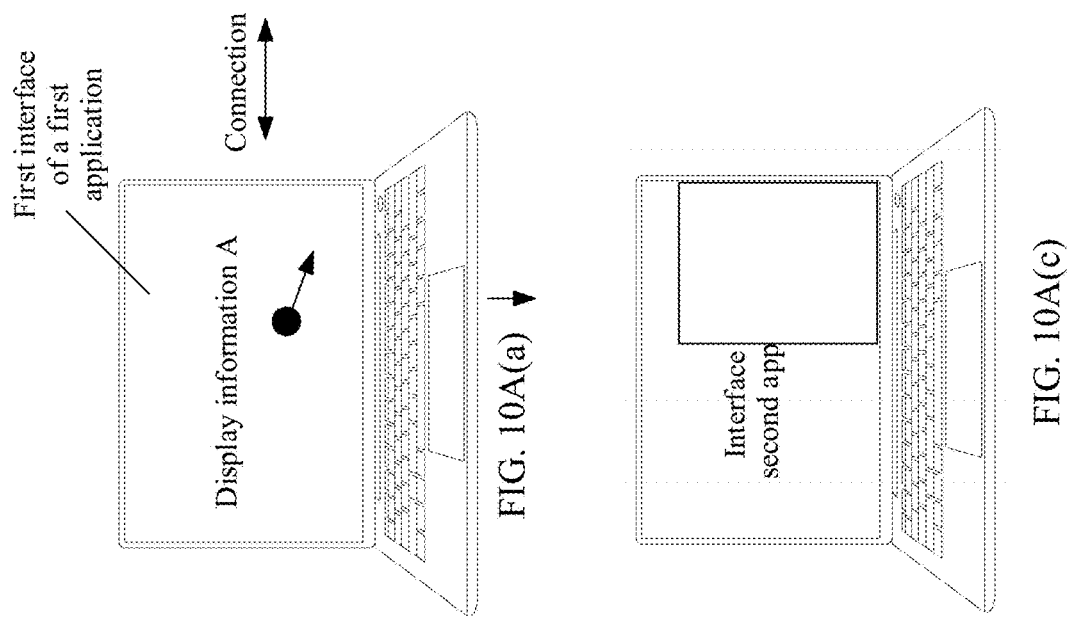
FIG. 10A(a)
FIG. 10A(c)

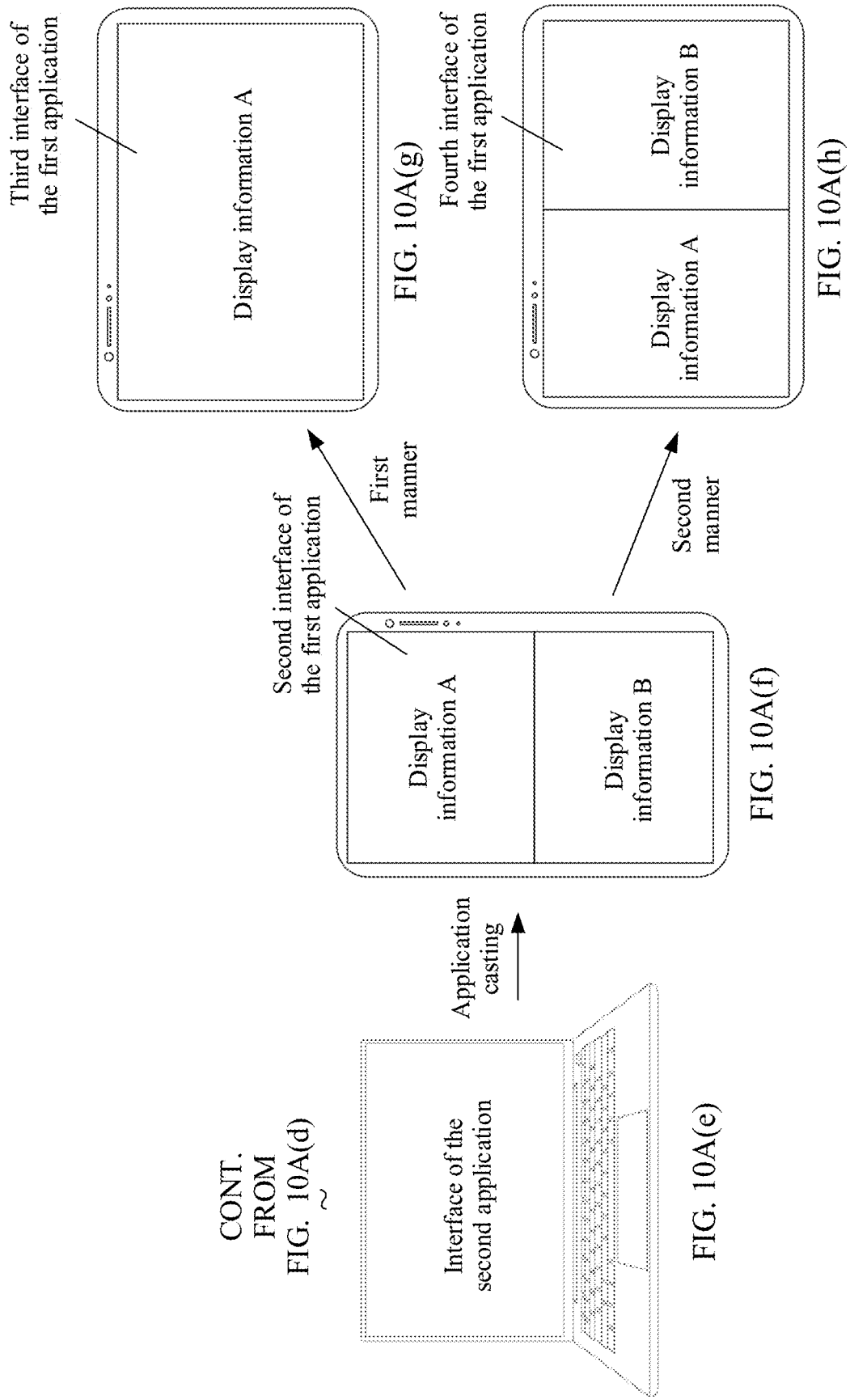

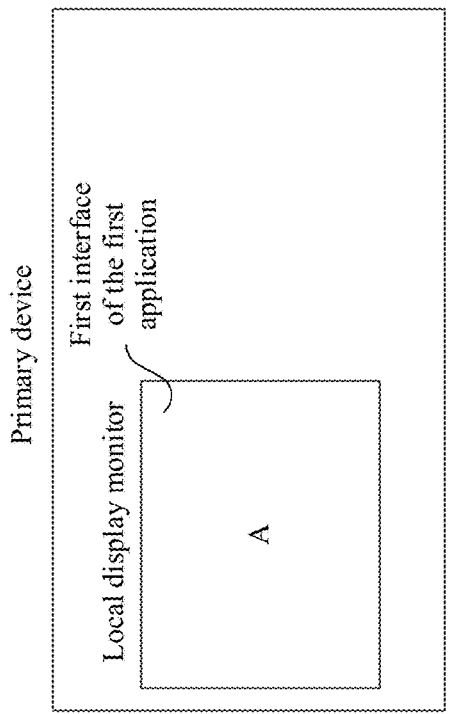
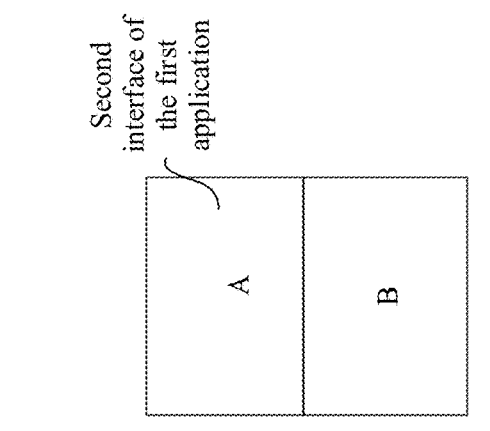
FIG. 10B(a)
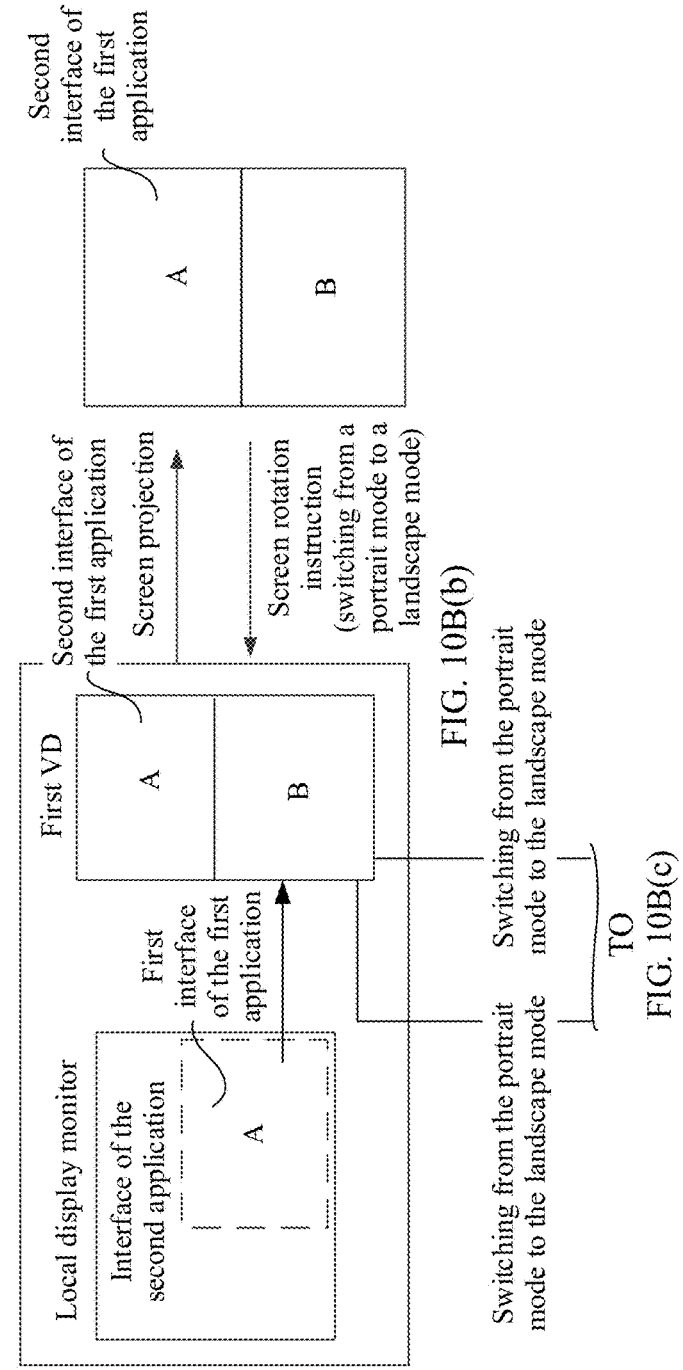
FIG. 10B(b)
TO FIG. 10B(c)

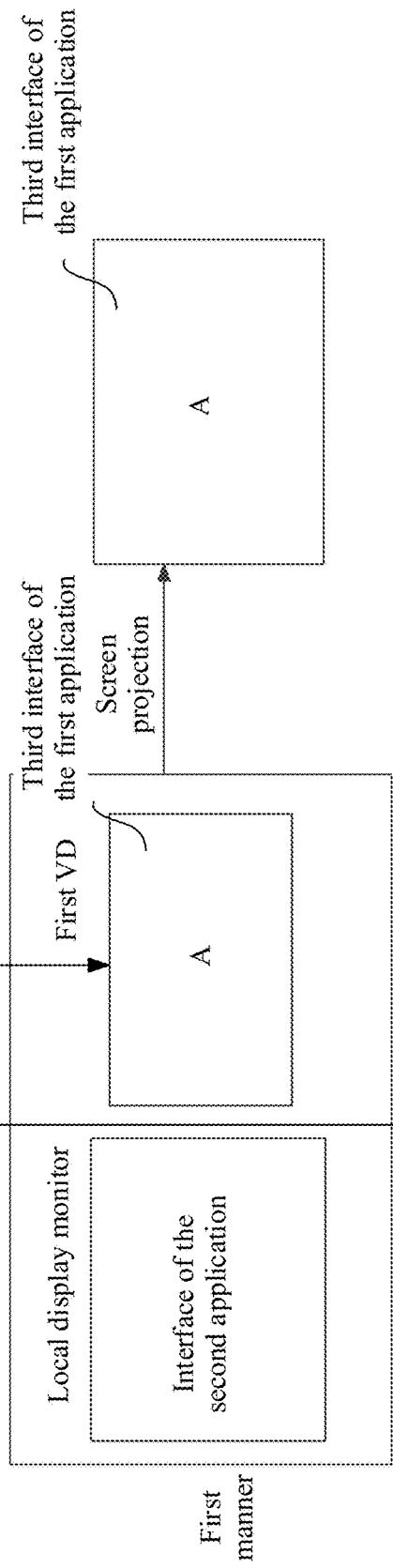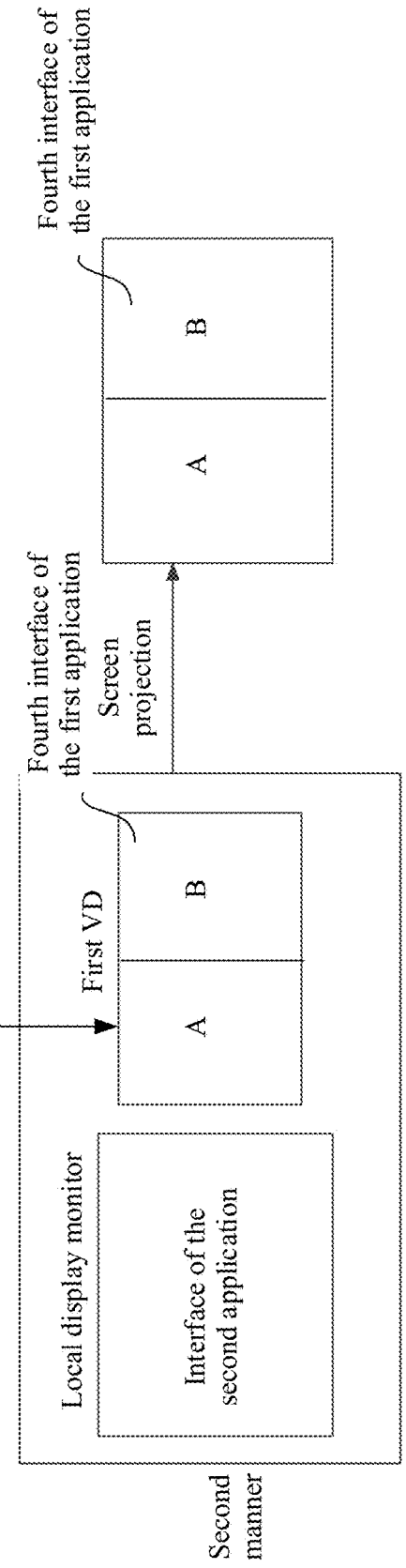
FIG. 10B(c)
FIG. 10B(d)

CONT. FROM FIG. 13D(a)

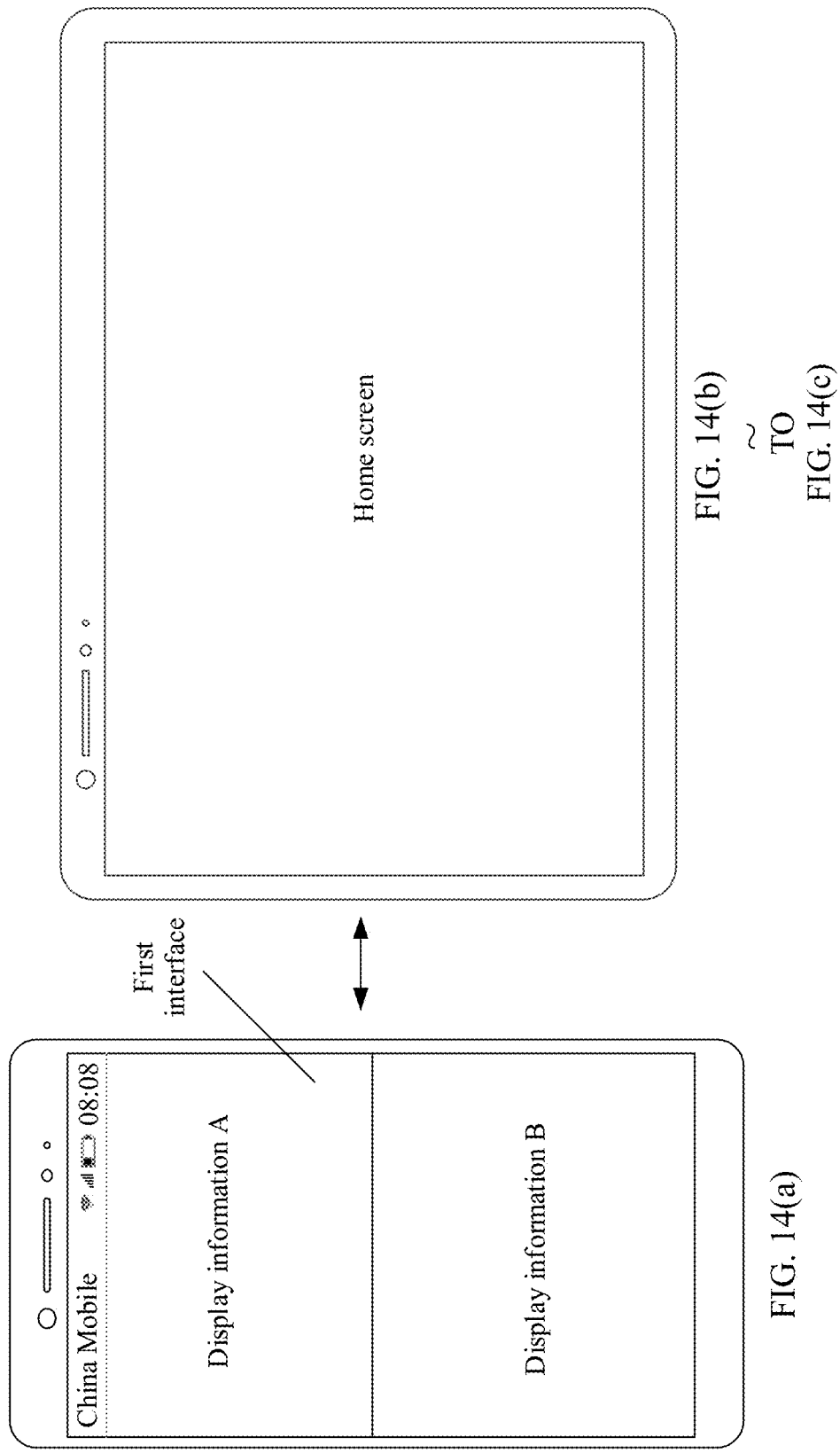

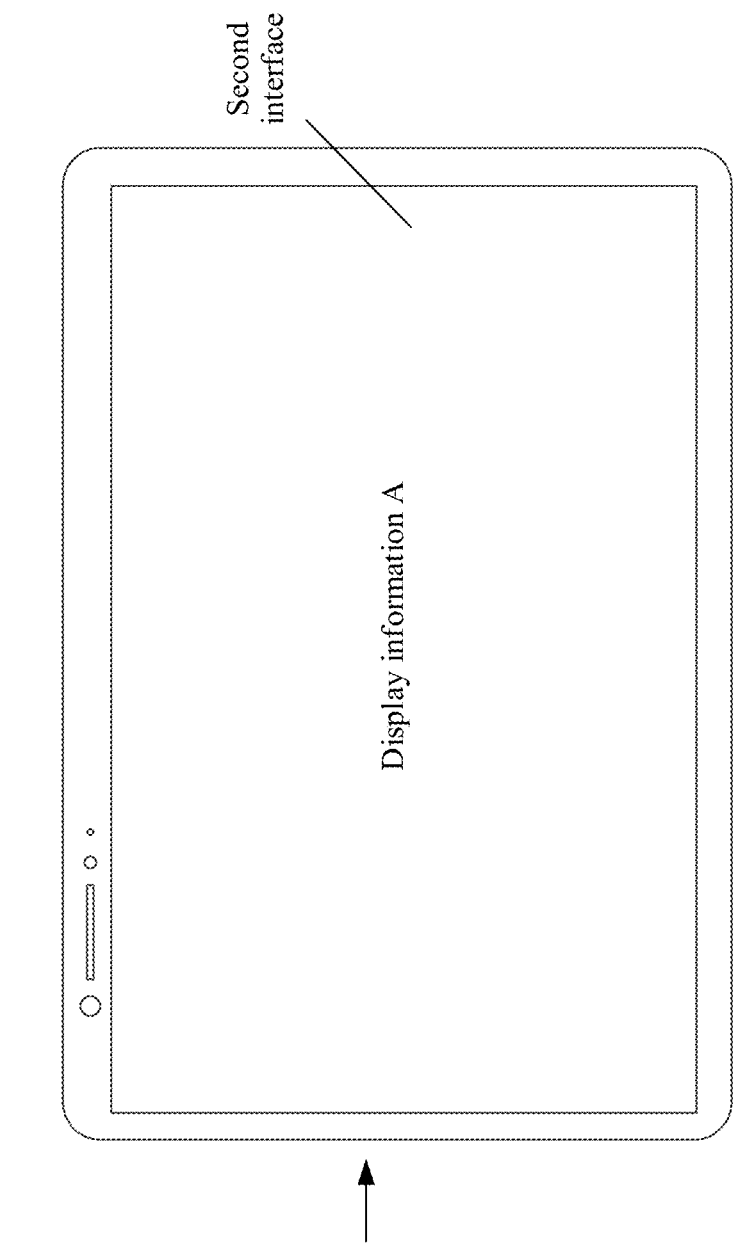
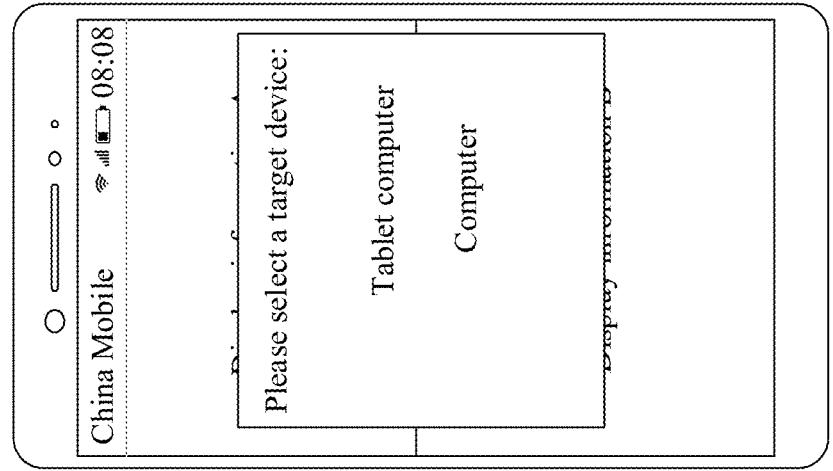
FIG. 14(c) ~ TO FIG. 14(e)
FIG. 14(d) ~ TO FIG. 14(e)

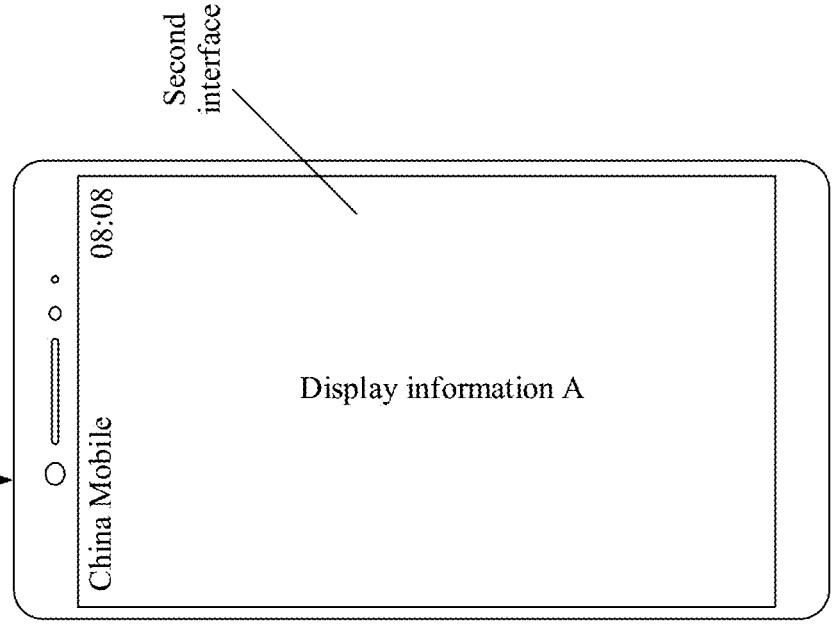

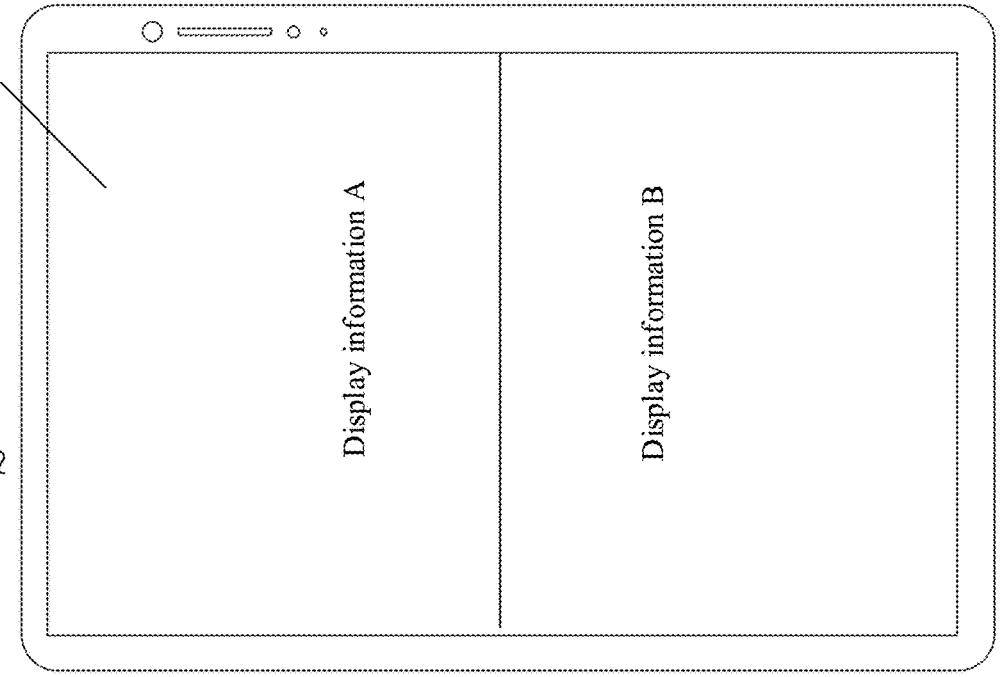

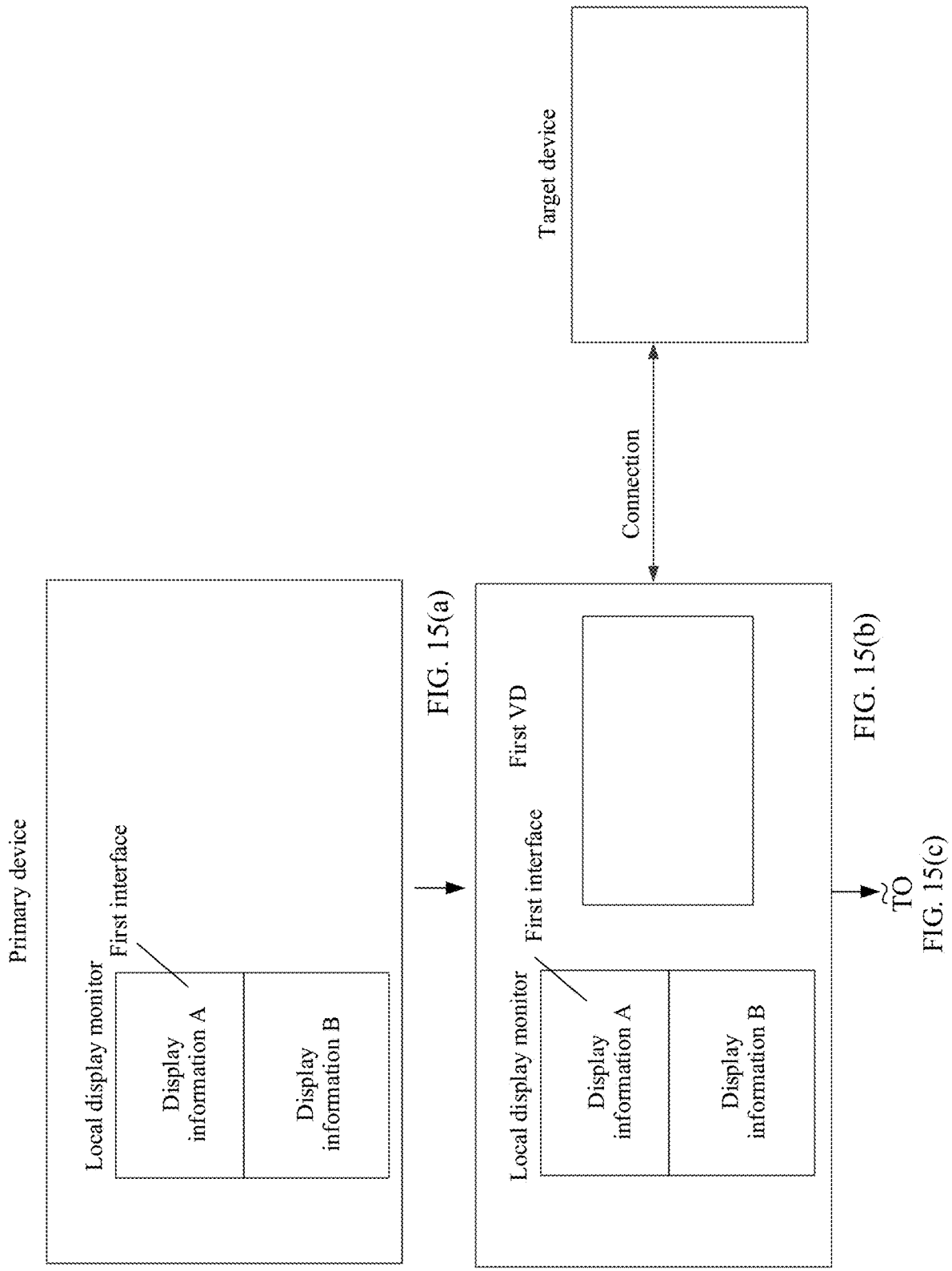

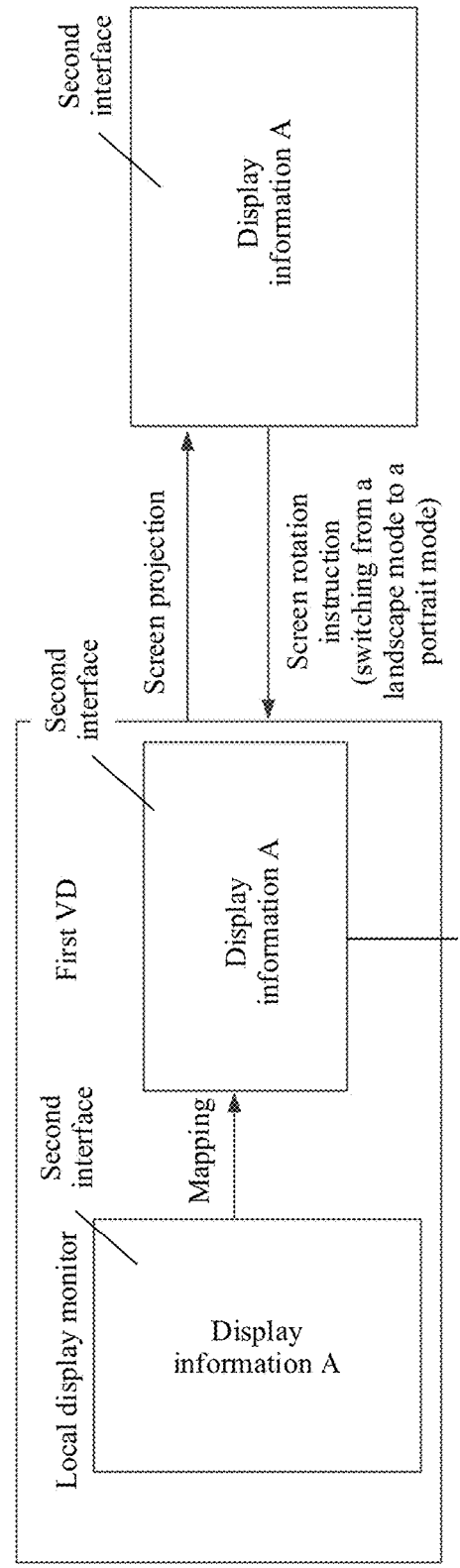
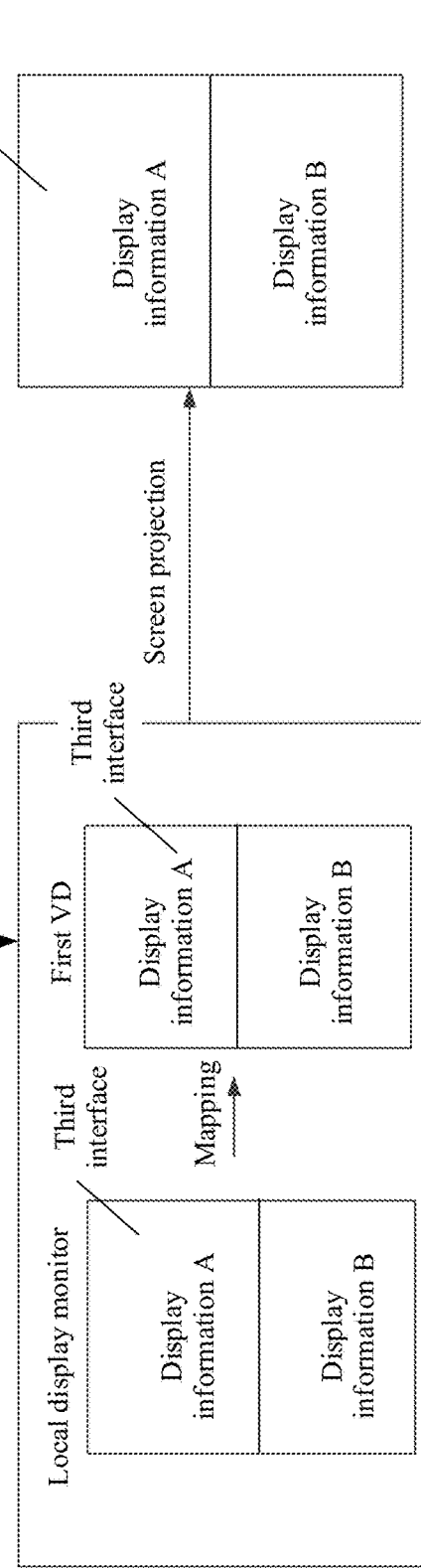
FIG. 15(c)
FIG. 15(d)

DISPLAY METHOD AND ELECTRONIC DEVICE

CROSS-REFERENCE TO RELATED APPLICATIONS

This application is a national stage of International Application No. PCT/CN2022/117647, filed on Sep. 7, 2022, which claims priority to Chinese Patent Application No. 202111133943.8, filed on Sep. 27, 2021. Both of the aforementioned applications are hereby incorporated by reference in their entireties.

TECHNICAL FIELD

This application relates to the field of electronic technologies, and in particular, to a display method and an electronic device.

BACKGROUND

The screen projection technology is a rising technology, and means that an electronic device may project a display interface on a display screen of the electronic device to another electronic device for display. For example, a document interface on a mobile phone may be projected to a laptop computer or a tablet computer for display.

For example, a screen of a laptop computer is projected to a tablet computer. As shown in FIG. 1, a first interface is displayed on the laptop computer. When detecting an operation of projecting (for example, screen mirroring) the screen to the tablet computer, the laptop computer sends display information on the first interface to the tablet computer. The tablet computer (in a landscape mode) displays the first interface. Because the tablet computer has a screen rotation function, a user may switch the tablet computer from the landscape mode to a portrait mode when operating the tablet computer. Still as shown in FIG. 1, when the tablet computer is switched from the landscape mode to the portrait mode, to adapt to portrait display, the first interface projected by the tablet computer is zoomed out. This causes a black area on the tablet computer. When the first interface is zoomed out, it is difficult for the user to view, and experience is poor.

SUMMARY

An objective of this application is to provide a display method and an electronic device, to improve screen projection experience.

According to a first aspect, a display method is provided, and is applied to a system including a first electronic device and a second electronic device. The method includes: The first electronic device sends, in response to a first operation, display information on a first interface of a first application on the first electronic device to the second electronic device. The second electronic device displays the first interface. The second electronic device sends, in response to a screen rotation operation, an instruction to the first electronic device. The instruction indicates a screen rotation direction of the second electronic device. The screen rotation direction includes switching from a landscape mode to a portrait mode or switching from a portrait mode to a landscape mode. The first electronic device sends, in response to the instruction, display information on a second interface of the first application to the second electronic device. The display information on the second interface is more than or less than the display information on the first interface, and/or a layout manner of the display information on the second interface is different from that of the first interface. The second electronic device displays the second interface.

In other words, after a primary device (that is, the first electronic device) projects a screen to a target device (that is, the second electronic device), an interface projected to the target device may change as a screen of the target device rotates. This change may include an addition to or removal from the display information on the interface projected to the target device, an adjustment for a layout manner of the display information, and the like. In short, the interface projected to the target device may adapt to the screen rotation of the target device. This improves screen projection experience.

In a possible design, when the screen rotation direction of the second electronic device is switching from the landscape mode to the portrait mode, the display information on the second interface is more than the display information on the first interface, and/or the layout manner of the display information on the second interface is different from that of the first interface. When a screen rotation manner of the second electronic device is switching from the portrait mode to the landscape mode, the display information on the second interface is less than the display information on the first interface, and/or the layout manner of the display information on the second interface is different from that of the first interface.

For example, the target device (that is, the second electronic device) may be switched from the landscape mode to the portrait mode or from the portrait mode to the landscape mode. When the target device is switched from the landscape mode to the portrait mode, there is more display information on the interface projected to the target device, or a layout of the display information is adjusted, to adapt to portrait display. When the target device is switched from the portrait mode to the landscape mode, there is less display information on the interface projected to the target device, or a layout is adjusted, to adapt to landscape display. In short, the interface projected to the target device may adapt to the screen rotation of the target device. This improves screen projection experience.

In a possible design, that the display information on the second interface is more than the display information on the first interface includes: The second interface includes all display information on the first interface, and further includes a part of or all display information on a third interface. The third interface includes at least one of a following interface of the first interface, a previous interface of the first interface, a system default interface, or a user-specified interface.

In other words, when the target device (that is, the second electronic device) is switched from the landscape mode to the portrait mode, there is more display information on the interface projected to the target device. Display information on the following interface or the previous interface may be added. In this way, the interface projected to the target device may adapt to the screen rotation of the target device. In addition, a user may view more display information on the primary device on the target device. User experience is good.

In a possible design, that a layout manner of the display information on the second interface is different from that of the first interface includes: When the screen rotation direction of the second electronic device is switching from the landscape mode to the portrait mode, the first interface includes first display information and second display information, and the first display information and the second display information are displayed in tiles in a horizontal direction; and the second interface includes the first display information and the second display information, and the first display information and the second display information are displayed in tiles in a vertical direction. When the screen rotation direction of the second electronic device is switching from the portrait mode to the landscape mode, the first interface includes first display information and second display information, and the first display information and the second display information are displayed in tiles in a vertical direction; and the second interface includes the first display information and the second display information, and the first display information and the second display information are displayed in tiles in a horizontal direction.

For example, when the target device (that is, the second electronic device) is in the landscape mode, display information A is on the left and display information B is on the right of the interface projected to the target device by the primary device. When the target device is switched from the landscape mode to the portrait mode, the display information A is located at an upper part and the display information B is located at a lower part of the projected interface. In this manner, the layout manner of the display information on the interface projected to the target device may change as a screen of the target device rotates, to adapt to the screen rotation of the target device.

In a possible design, that the first electronic device sends, in response to a first operation, display information on a first interface of a first application on the first electronic device to the second electronic device includes: The first electronic device displays the first interface. The first electronic device determines, in response to the first operation, whether a screen display direction of the first electronic device is consistent with that of the second electronic device. The first interface is sent to the second electronic device when the screen display direction of the first electronic device is consistent with that of the second electronic device.

In other words, in this embodiment of this application, before projecting a screen to the target device (that is, the second electronic device), the primary device (that is, the first electronic device) may determine whether the screen display direction of the target device is consistent with that of the primary device. If the screen display directions are consistent, a current interface (that is, the first interface) of the primary device may be projected to the target device. For example, the primary device is currently in the landscape mode and displays an interface 1. If the screen display direction of the target device is consistent with that of the primary device, the primary device may project the interface 1 to the target device, because the interface 1 adapts to landscape display.

In a possible design, a fourth interface of the first application is sent to the second electronic device when the screen display direction of the first electronic device is inconsistent with that of the second electronic device. Display information on the fourth interface is more than or less than the display information on the first interface, and/or a layout manner of the display information on the fourth interface is different from that of the first interface.

In other words, before projecting a screen to the target device (that is, the second electronic device), the primary device (that is, the first electronic device) may determine whether the screen display direction of the target device is consistent with that of the primary device. If the screen display directions are consistent, a current interface (that is, the first interface) of the primary device may be projected to the target device. If the screen display directions are inconsistent, the current interface of the primary device needs to be adjusted to be an interface (that is, the fourth interface) that adapts to the screen display direction of the target device. Then, the interface is projected to the target device. In this manner, an interface first projected to the target device by the primary device may adapt to the screen display direction of the target device. User experience is good.

In a possible design, that a fourth interface of the first application is sent to the second electronic device when the screen display direction of the first electronic device is inconsistent with that of the second electronic device includes:

When the first electronic device is in the landscape mode and the second electronic device is in the portrait mode, the display information on the fourth interface is more than that of the first interface, and/or the first interface includes third display information and fourth display information, and the third display information and the fourth display information are displayed in tiles in a horizontal direction; and the fourth interface includes the third display information and the fourth display information, and the third display information and the fourth display information are displayed in tiles in a vertical direction.

When the first electronic device is in the portrait mode and the second electronic device is in the landscape mode, the display information on the fourth interface is less than that of the first interface, and/or the first interface includes third display information and fourth display information, and the third display information and the fourth display information are displayed in tiles in a vertical direction; and the fourth interface includes the third display information and the fourth display information, and the third display information and the fourth display information are displayed in tiles in a horizontal direction.

For example, the primary device (that is, the first electronic device) is in the landscape mode, and the target device (that is, the second electronic device) is in the portrait mode. The primary device displays the first interface. The display information A is on the left and the display information B is on the right of the first interface. Because the target device is in the portrait mode, the primary device projects the second interface to the target device. The display information A is located at the upper part and the display information B is located at the lower part of the second interface. In this manner, an interface first projected to the target device by the primary device may adapt to the screen display direction of the target device. User experience is good.

In a possible design, that the first electronic device sends, in response to a first operation, display information on a first interface of a first application on the first electronic device to the second electronic device includes: The first electronic device creates, in response to the first operation, a first virtual display VD. A screen display direction of the first VD is consistent with a current screen display direction of the second electronic device. The first electronic device transfers the first application to the first VD for running. The first application displays the first interface on the first VD. The first VD sends the first interface to the second electronic device.

In this embodiment of this application, because the screen display direction of the first VD is consistent with that of the target device, when running in the first VD, the first application may adjust a display interface of the first application based on the screen display direction of the first VD, for example, display the first interface. Then, the first VD projects the first interface to the target device. This may ensure that the interface projected to the target device by the first application may adapt to the screen display direction of the target device, because the screen display direction of the first VD is consistent with the screen display direction of the target device.

In a possible design, that the first electronic device sends, in response to the instruction, display information on a second interface of the first application to the second electronic device includes: The first electronic device adjusts, in response to the instruction, the screen display direction of the first VD to be consistent with a screen display direction of the second electronic device after the second electronic device is rotated. The first application adjusts, in response to the adjustment for the screen display direction of the first VD, the first interface to the second interface. The first VD sends the second interface to the second electronic device.

In other words, the screen display direction of the first VD changes as the screen display direction of the target device changes. When the screen display direction of the first VD changes, the interface of the first application running in the first VD is adaptively adjusted (for example, adjusted from the first interface to the second interface). Then, the first VD projects an interface obtained through adjustment to the target device. This may ensure that the projected interface changes as the screen display direction of the target device changes.

In a possible design, the method further includes: After the first electronic device sends, in response to a first operation, display information on a first interface of a first application on the first electronic device to the second electronic device, the method further includes: The first electronic device displays an interface of a second application, or displays the first interface.

In other words, after projecting the first interface of the first application, the primary device may display the interface of the second application or display the first interface. If the primary device displays the interface of the second application after projecting the first interface of the first application, this is referred to as application casting. If the primary device displays the first interface after projecting the first interface of the first application, this is referred to as screen mirroring. Therefore, the technical solution in this application is applicable to both application casting and screen mirroring.

According to a second aspect, a display method is further provided, and is applied to a first electronic device. The method includes:

The first electronic device sends, in response to a first operation, display information on a first interface of a first application on the first electronic device to a second electronic device.

The first electronic device receives an instruction from the second electronic device. The instruction indicates a screen rotation direction of the second electronic device. The screen rotation direction includes switching from a landscape mode to a portrait mode or switching from a portrait mode to a landscape mode.

The first electronic device sends, in response to the instruction, display information on a second interface of the first application to the second electronic device. The display information on the second interface is more than or less than the display information on the first interface, and/or a layout manner of the display information on the second interface is different from that of the first interface.

In a possible design, when the screen rotation direction of the second electronic device is switching from the landscape mode to the portrait mode, the display information on the second interface is more than the display information on the first interface, and/or the layout manner of the display information on the second interface is different from that of the first interface.

When a screen rotation manner of the second electronic device is switching from the portrait mode to the landscape mode, the display information on the second interface is less than the display information on the first interface, and/or the layout manner of the display information on the second interface is different from that of the first interface.

In a possible design, that the display information on the second interface is more than the display information on the first interface includes:

The second interface includes all display information on the first interface, and further includes a part of or all display information on a third interface. The third interface includes at least one of a following interface of the first interface, a previous interface of the first interface, a system default interface, or a user-specified interface.

In a possible design, that a layout manner of the display information on the second interface is different from that of the first interface includes:

When the screen rotation direction of the second electronic device is switching from the landscape mode to the portrait mode, the first interface includes first display information and second display information, and the first display information and the second display information are displayed in tiles in a horizontal direction; and the second interface includes the first display information and the second display information, and the first display information and the second display information are displayed in tiles in a vertical direction.

When the screen rotation direction of the second electronic device is switching from the portrait mode to the landscape mode, the first interface includes first display information and second display information, and the first display information and the second display information are displayed in tiles in a vertical direction; and the second interface includes the first display information and the second display information, and the first display information and the second display information are displayed in tiles in a horizontal direction.

In a possible design, that the first electronic device sends, in response to a first operation, display information on a first interface of a first application on the first electronic device to a second electronic device includes:

The first electronic device displays the first interface.

The first electronic device determines, in response to the first operation, whether a screen display direction of the first electronic device is consistent with that of the second electronic device.

The first interface is sent to the second electronic device when the screen display direction of the first electronic device is consistent with that of the second electronic device.

In a possible design, the method further includes: A fourth interface of the first application is sent to the second electronic device when the screen display direction of the first electronic device is inconsistent with that of the second electronic device. Display information on the fourth interface is more than or less than the display information on the first interface, and/or a layout manner of the display information on the fourth interface is different from that of the first interface.

In a possible design, that a fourth interface of the first application is sent to the second electronic device when the screen display direction of the first electronic device is inconsistent with that of the second electronic device includes:

When the first electronic device is in the landscape mode and the second electronic device is in the portrait mode, the display information on the fourth interface is more than that of the first interface, and/or the first interface includes third display information and fourth display information, and the third display information and the fourth display information are displayed in tiles in a horizontal direction; and the fourth interface includes the third display information and the fourth display information, and the third display information and the fourth display information are displayed in tiles in a vertical direction.

When the first electronic device is in the portrait mode and the second electronic device is in the landscape mode, the display information on the fourth interface is less than that of the first interface, and/or the first interface includes third display information and fourth display information, and the third display information and the fourth display information are displayed in tiles in a vertical direction; and the fourth interface includes the third display information and the fourth display information, and the third display information and the fourth display information are displayed in tiles in a horizontal direction.

In a possible design, that the first electronic device sends, in response to a first operation, display information on a first interface of a first application on the first electronic device to a second electronic device includes:

The first electronic device creates, in response to the first operation, a first virtual display VD. A screen display direction of the first VD is consistent with a current screen display direction of the second electronic device.

The first electronic device transfers the first application to the first VD for running.

The first application displays the first interface on the first VD.

The first VD sends the first interface to the second electronic device.

In a possible design, that the first electronic device sends, in response to the instruction, display information on a second interface of the first application to the second electronic device includes:

The first electronic device adjusts, in response to the instruction, the screen display direction of the first VD to be consistent with a screen display direction of the second electronic device after the second electronic device is rotated.

The first application adjusts, in response to the adjustment for the screen display direction of the first VD, the first interface to the second interface.

The first VD sends the second interface to the second electronic device.

In a possible design, after the first electronic device sends, in response to a first operation, display information on a first interface of a first application on the first electronic device to a second electronic device, the method further includes:

The first electronic device displays an interface of a second application, or displays the first interface.

According to a third aspect, a communication system is further provided, and includes a first electronic device and a second electronic device.

The first electronic device includes a processor and a memory. The memory stores one or more computer programs. The one or more computer programs include instructions. When the instructions are executed by the processor, the first electronic device is enabled to perform steps of the first electronic device in the method according to the first aspect.

The second electronic device includes a processor and a memory. The memory stores one or more computer programs. The one or more computer programs include instructions. When the instructions are executed by the processor, the second electronic device is enabled to perform steps of the second electronic device in the method according to the first aspect.

According to a fourth aspect, an electronic device is further provided, including:

a processor, a memory, and one or more programs.

The one or more programs are stored in the memory. The one or more programs include instructions. When the instructions are executed by the processor, the electronic device is enabled to perform steps of the method according to the second aspect.

According to a fifth aspect, a computer-readable storage medium is further provided. The computer-readable storage medium is configured to store a computer program. When the computer program is run on a computer, the computer is enabled to perform the method according to the first aspect or the second aspect.

According to a sixth aspect, a computer program product is further provided, including a computer program. When the computer program is run on a computer, the computer is enabled to perform the method according to the first aspect or the second aspect.

According to a seventh aspect, a graphical user interface on an electronic device is further provided. The electronic device has a display screen, a memory, and a processor. The processor is configured to execute one or more computer programs stored in the memory. The graphical user interface includes a graphical user interface displayed when the electronic device performs the method according to the first aspect or the second aspect.

According to an eighth aspect, an embodiment of this application further provides a chip. The chip is coupled to a memory in an electronic device, and is configured to invoke a computer program stored in the memory and perform the technical solution according to the first aspect or the second aspect. In this embodiment of this application, "coupling" means that two components are directly or indirectly combined with each other.

For beneficial effects of the second aspect to the eighth aspect, refer to beneficial effects the first aspect. Details are not described herein again.

BRIEF DESCRIPTION OF THE DRAWINGS

FIG. 9A(a) to FIG. 9A(h) and FIG. 9B(a) to FIG. 9B(d) are schematic diagrams of a principle of a screen projection method according to an embodiment of this application;

FIG. 10A(a) to FIG. 10A(h) and FIG. 10B(a) to FIG. 10B(d) are schematic diagrams of another principle of a screen projection method according to an embodiment of this application;

FIG. 14(*a*) to FIG. 14(*g*) and FIG. 15(*a*) to FIG. 15(*d*) are schematic diagrams of a principle of a screen projection method according to an embodiment of this application;

DETAILED DESCRIPTION OF ILLUSTRATIVE EMBODIMENTS

Figure 1:
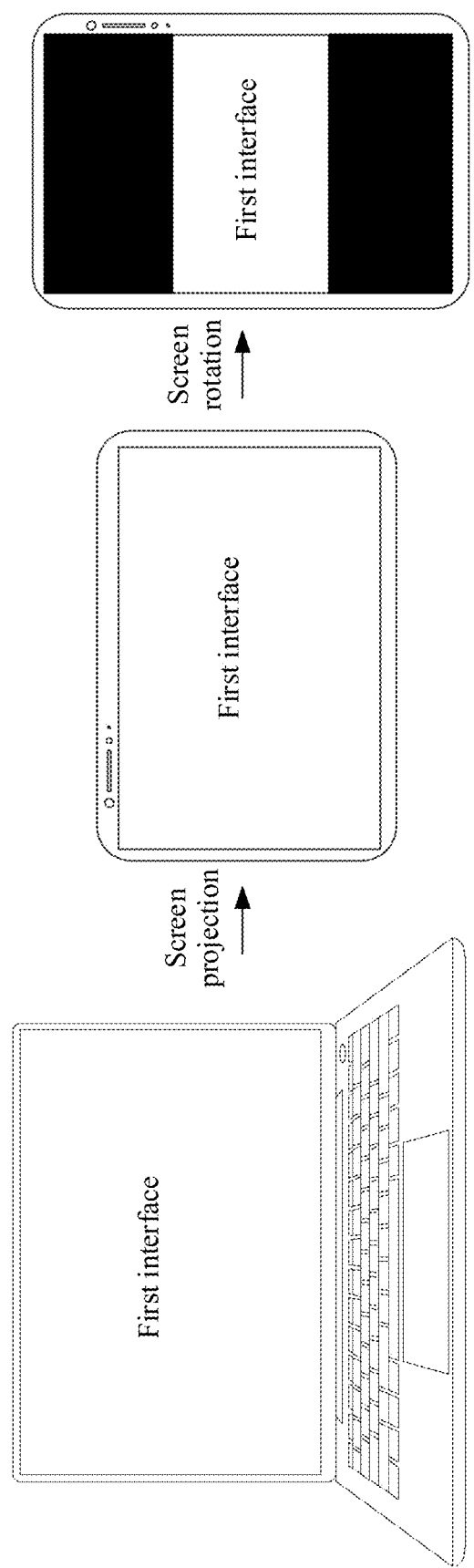
FIG. 1 is a schematic diagram of a screen projection procedure according to an embodiment of this application.

The following describes some terms in embodiments of this application, to help a person skilled in the art have a better understanding.

(1) Application (application, app for short), app for short, is a software program that can implement one or more specific functions. Generally, a plurality of applications, for example, an instant messaging application, a video play application, an audio application, and an image capture application, may be installed on an electronic device. The instant messaging application may include, for example, Messaging, MeeTime, WeChat® (WeChat®), WhatsApp Messenger®, Line® (Line®), Instagram (Instagram), Kakao Talk®, and DingTalk®. The image capture application may include, for example, a camera application (a system camera or a third-party camera application). The video play application may include, for example, YouTube®, Twitter®, TikTok®, iQIYI®, and Tencent Video®. The audio application may include, for example, Google Music®, KuGou®, Xiami®, and QQ Music®. An application mentioned in the following embodiments may be an application installed when the electronic device is delivered from the factory, or may be an application downloaded from a network or obtained from another electronic device when a user uses the electronic device.

(2) In embodiments of this application, "at least one" means one or more, and "a plurality of" means two or more. In addition, it should be understood that in descriptions of this application, words such as "first" and "second" are merely intended for purposes of description, and should not be understood as expressing or implying relative importance or a sequence.

A display method according to embodiments of this application is applicable to a screen projection scenario. Generally, the screen projection scenario includes a transmitter and a receiver. The transmitter sends display information to the receiver for display. For ease of description, the transmitter is referred to as a primary device, and the receiver is referred to as a target device in this specification. Certainly, the transmitter and the receiver may further have other names in addition to the primary device and the target device. For example, the transmitter is a screen projection initiator, and the receiver is a screen projection receiver. Alternatively, the transmitter is a primary device, and the receiver is a secondary device. Alternatively, the transmitter is a source device, and the receiver is a target device. Alternatively, the transmitter is a first electronic device, and the receiver is a second electronic device. This is not limited in this application. Roles of the transmitter and the receiver are interchangeable. In other words, the transmitter may project a screen to the receiver, and correspondingly, the receiver may project a screen to the transmitter. In embodiments of this application, the receiver is a device that can perform screen rotation (for example, switching between landscape and portrait modes), such as a tablet computer or a mobile phone. The transmitter may have a screen rotation function, or may not have a screen rotation function. For example, the transmitter includes a mobile phone, a tablet computer, a PC, a mobile phone, a watch, and the like. For ease of description, the following mainly uses an example in which the transmitter is a laptop computer or a mobile phone and the receiver is a tablet computer for description.

The screen projection technology includes screen mirroring and application casting.

Figure 2:
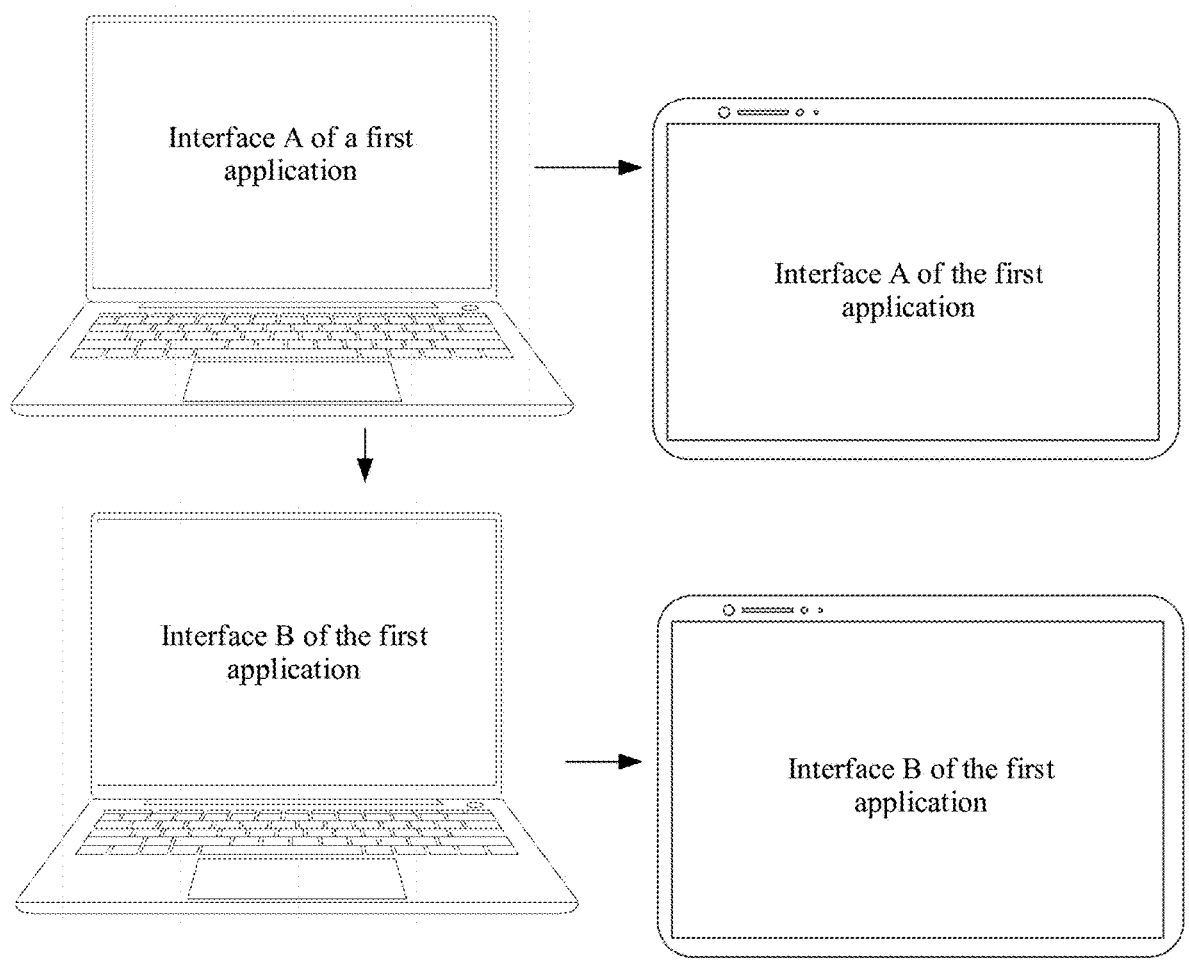
FIG. 2 is a schematic diagram of screen mirroring according to an embodiment of this application.

Screen mirroring means that the transmitter sends current display information on a display screen of the transmitter to the receiver, and the receiver displays the display information. In this way, the transmitter and the receiver may display a same picture. In other words, content currently displayed on the transmitter is exactly the content projected to the receiver. For example, FIG. 2 is a schematic diagram of a screen mirroring procedure. A transmitter (for example, a laptop computer) displays, on the foreground, an interface A of a first application. In this case, if the transmitter detects an operation of mirroring a screen to a receiver (for example, a tablet computer), the transmitter sends, in response to the operation, display information on the foreground to the tablet computer. The tablet computer displays the display information (for example, the interface A of the first application). When the display information on the foreground of the transmitter changes, for example, is switched from the interface A to an interface B, display information on the receiver also changes correspondingly, that is, is switched from the interface A to the interface B. This screen projection technology may be understood as that a display screen of the receiver is a mirror screen of a display screen of the transmitter.

Figure 3:
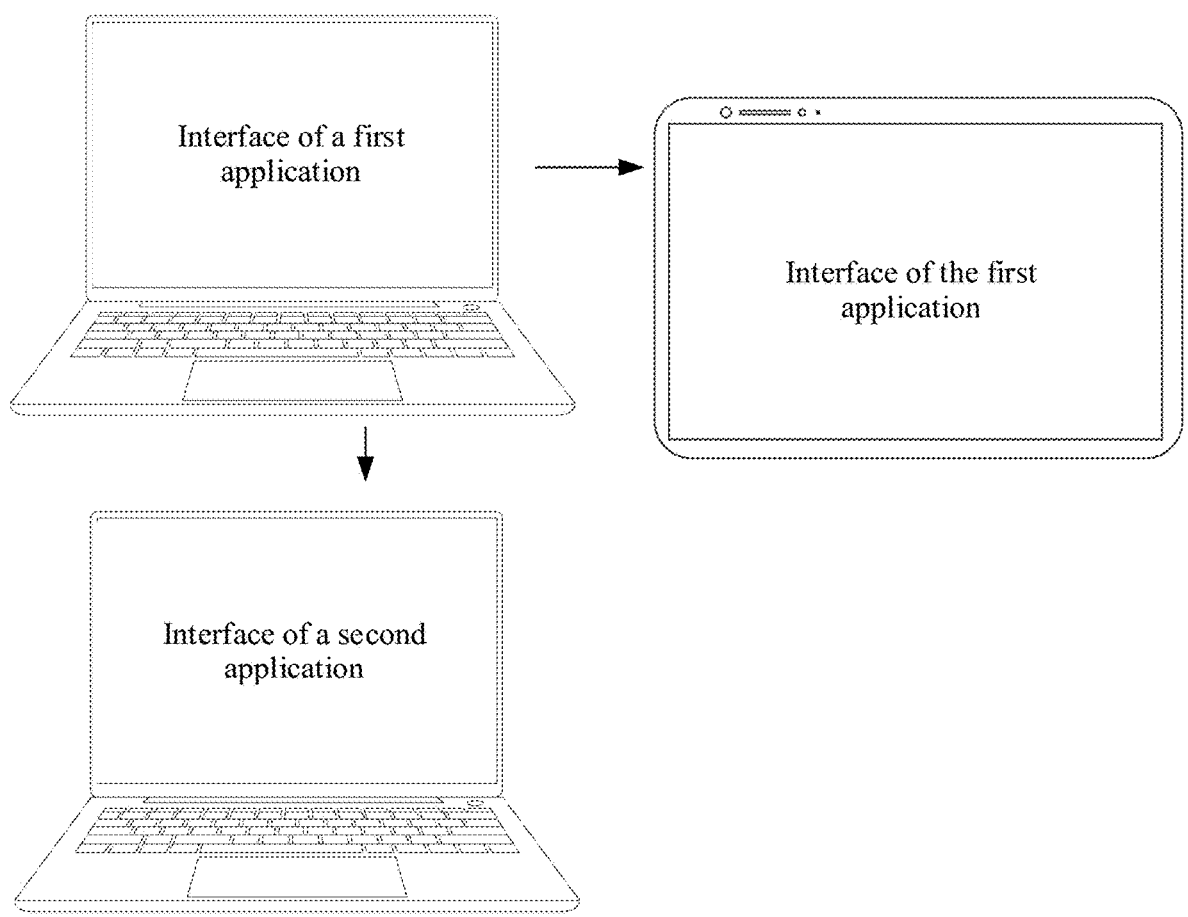
FIG. 3 is a schematic diagram of application casting according to an embodiment of this application.

Application casting is different from screen mirroring. Simply speaking, in an application casting scenario, display information that is on the receiver and that is projected by the transmitter may be different from display information that is being displayed on the foreground of the transmitter. For example, FIG. 3 is a schematic diagram of an application casting procedure. A transmitter (for example, a laptop computer) displays an interface of a first application. In this case, if detecting an operation of casting an application to a receiver (for example, a tablet computer) (this is described below), the transmitter casts the first application to the tablet computer for display. After the transmitter casts the first application, an interface of a second application is displayed on a foreground. This screen projection technology may be understood as that a display screen of the receiver is used as an extended screen of a display screen of the transmitter.

In some embodiments, in a procedure of projecting a screen (including mirroring a screen or casting an application) from the transmitter to the receiver, the screen of the receiver may rotate (for example, the receiver is switched from a landscape mode to a portrait mode or from a portrait mode to a landscape mode). When the screen of the receiver rotates, a size of the interface projected to the receiver by the transmitter (the projected interface for short) is adjusted to adapt to the screen rotation of the receiver.

For ease of understanding, the following uses an example in which the transmitter is a laptop computer and the receiver is a tablet computer for description.

Figure 4A:
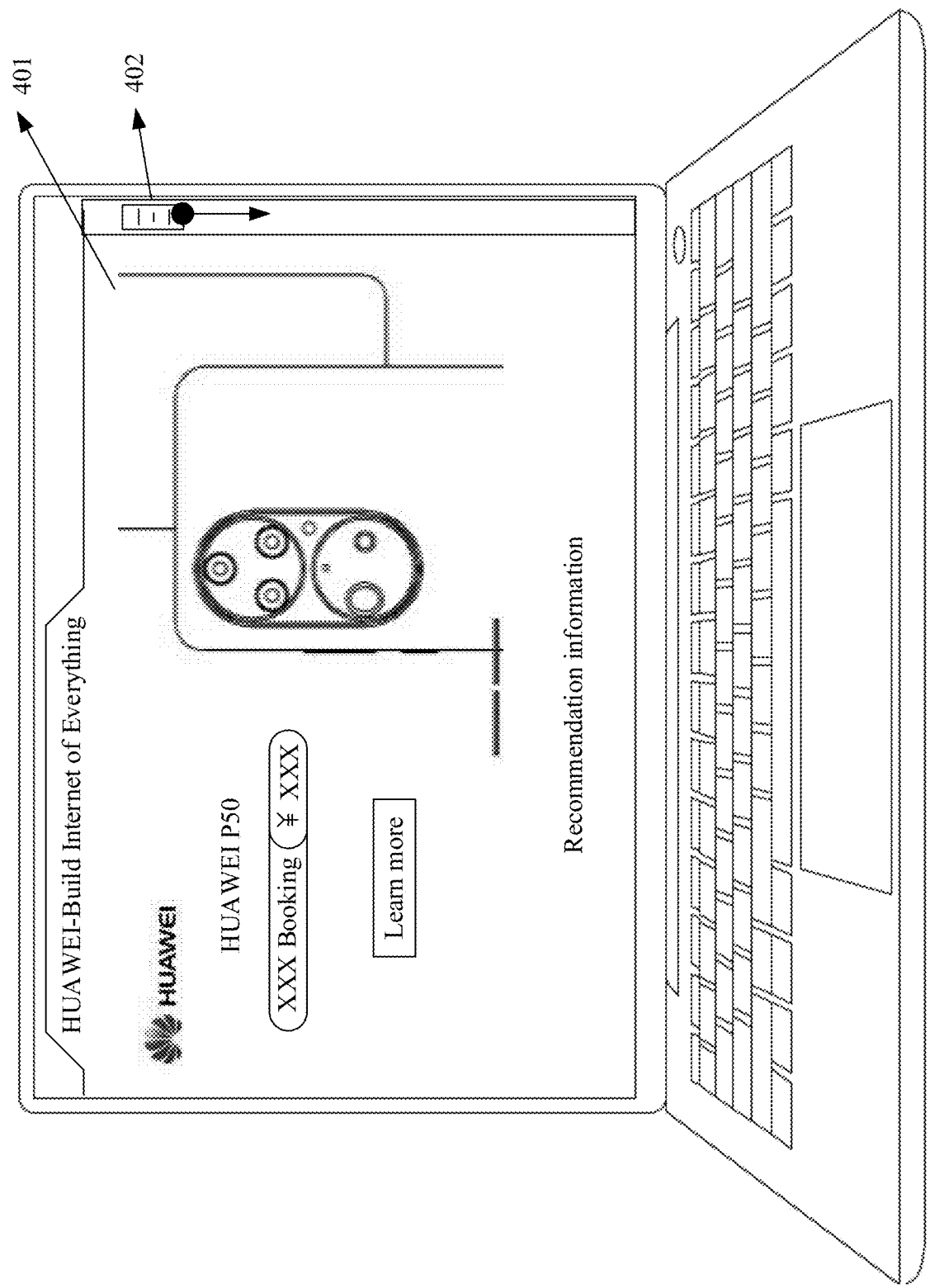
FIG. 4(a) and FIG. 4(b) are a schematic diagram of display interfaces of a laptop computer according to an embodiment of this application.
Figure 4B:
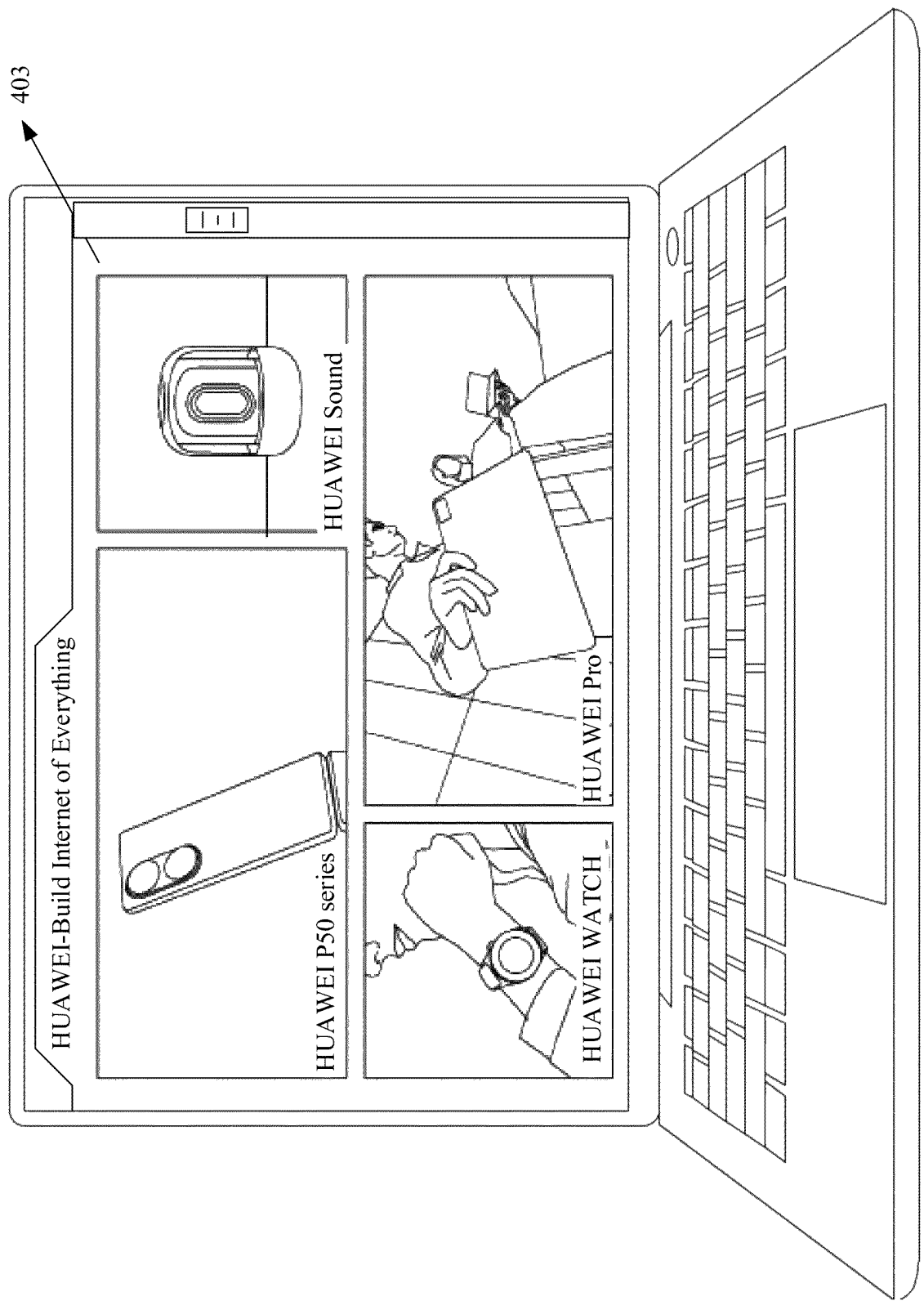

For example, in FIG. 4(a), a laptop computer displays an interface 401 of a browser application (for example, the interface 401 is an interface on an official website of HUAWEI). The interface 401 includes various types of display information, for example, text (for example, HUAWEI P50) and an image (for example, an image of a mobile phone). Generally, a web page includes a large amount of display information. Due to a limited size of a display screen of a laptop computer, not all display information on the web page can be displayed on the display screen. Therefore, a key for viewing more information on the web page is usually displayed on the laptop computer. For example, in FIG. 4(a), a slider bar 402 is displayed on the right of the interface 401. When the laptop computer detects a swiping-down operation on the slider bar 402, an interface 403 shown in FIG. 4(b) is displayed. The interface 403 may be understood as an interface that follows the interface 401 and that is generated on the web page (for example, the official website of HUAWEI) Therefore, when browsing the web page on the laptop computer, a user may view more information on the web page by using the slider bar 402.

Figure 5A:
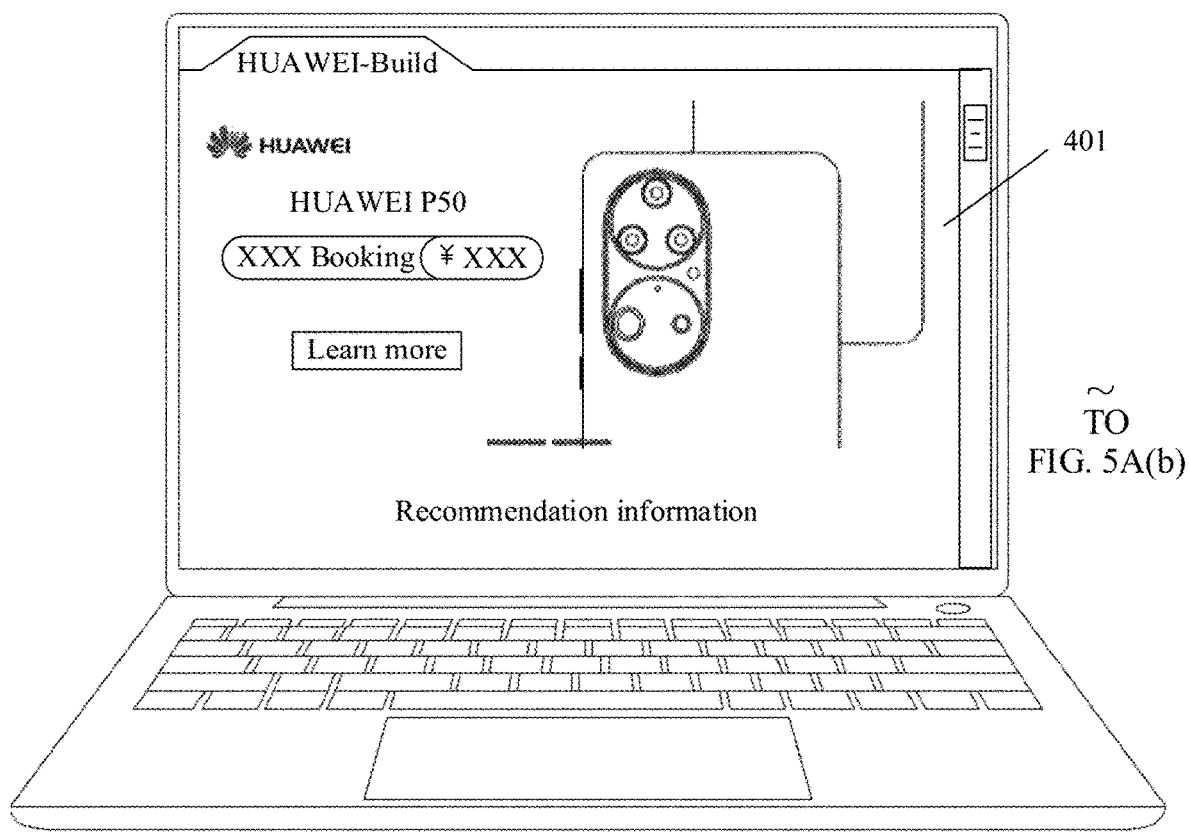
FIG. 5A(a) to FIG. 5A(d) are a schematic diagram of projecting a screen from a laptop computer to a tablet computer according to an embodiment of this application.
Figure 5A:
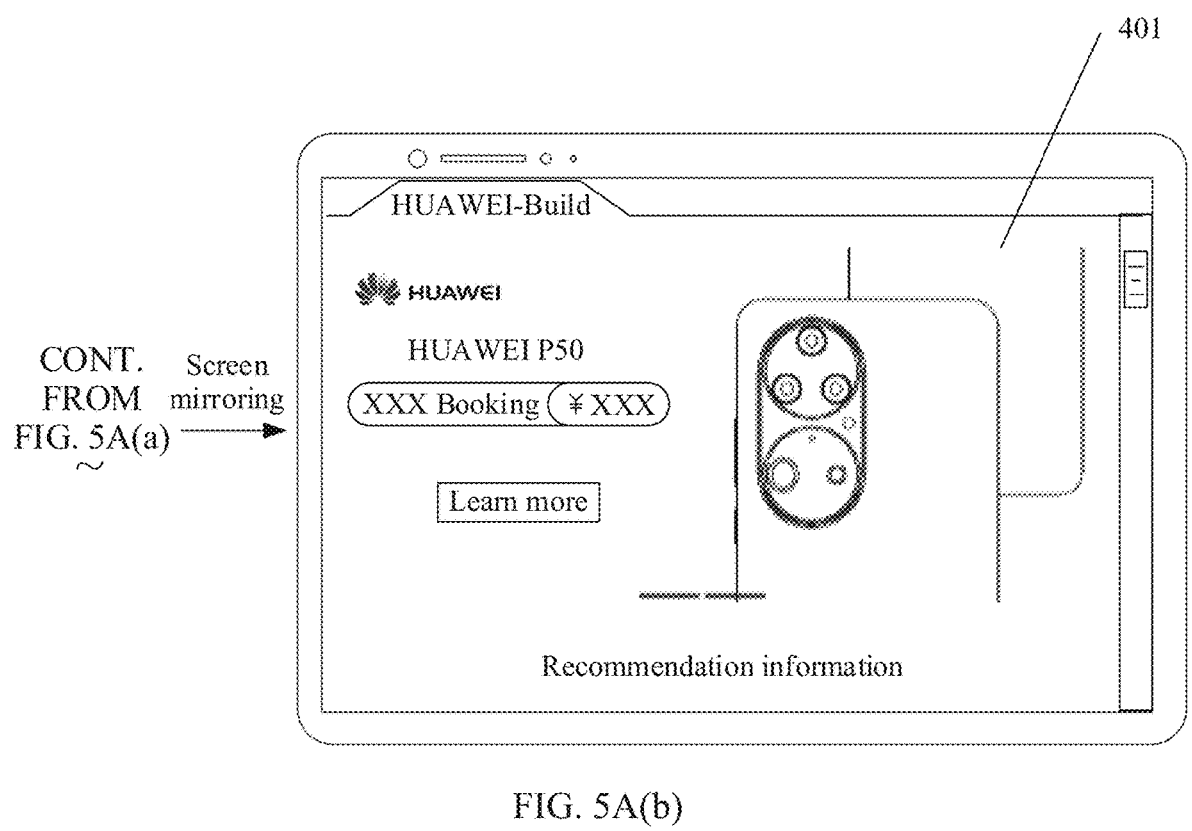
Figure 5A:
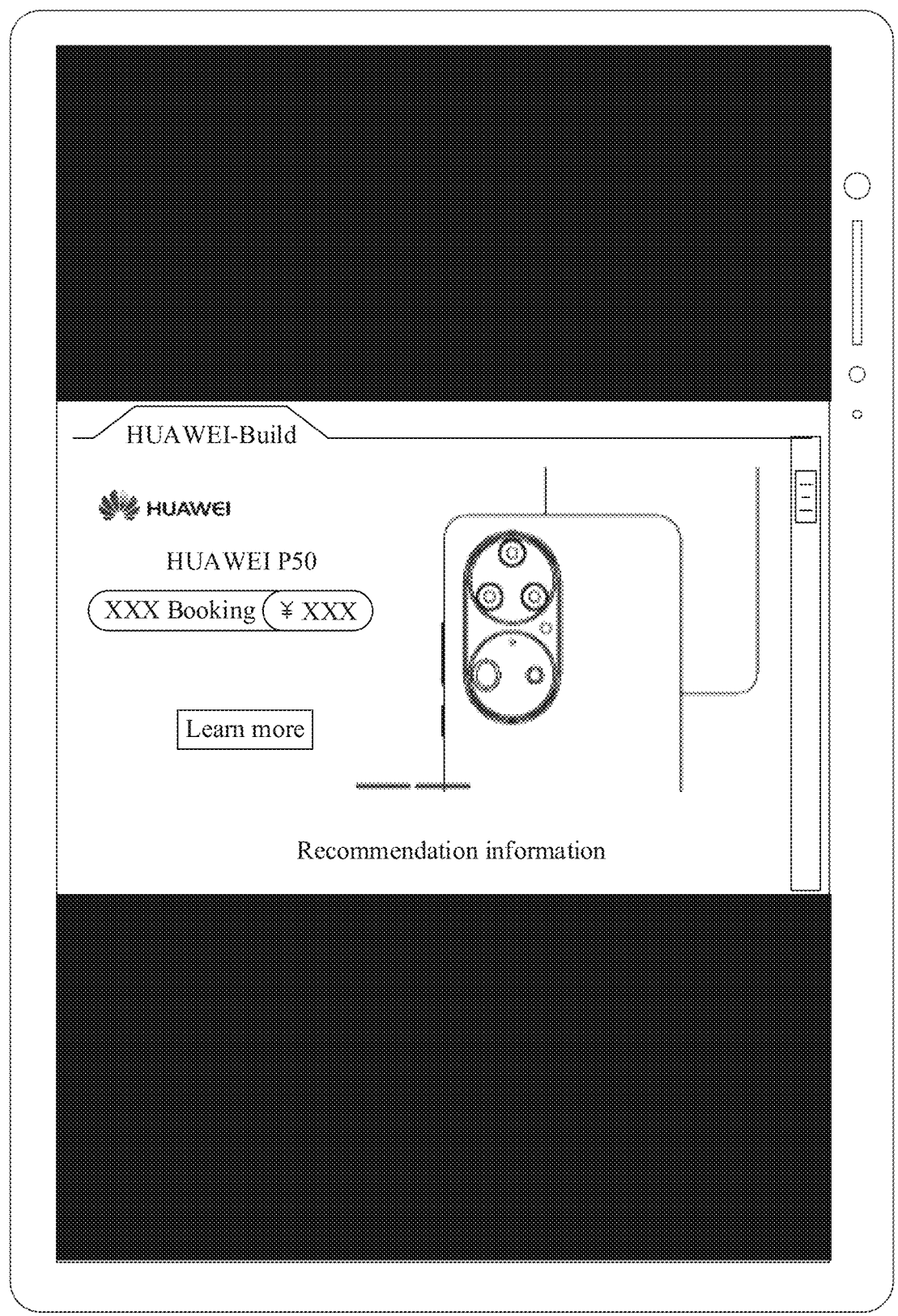
Figure 5A:
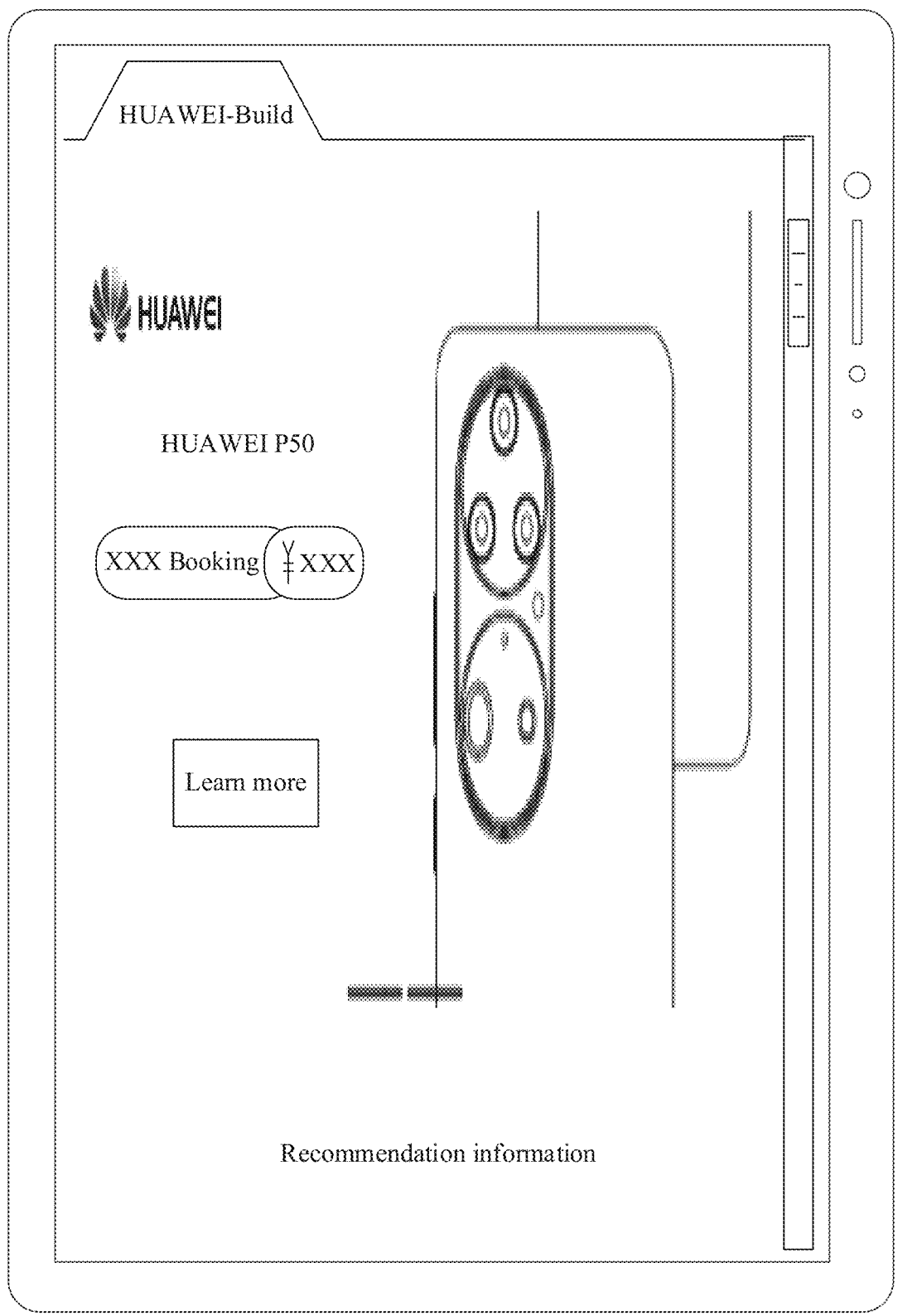

As shown in FIG. 5A(a), it is assumed that when the laptop computer detects, when displaying the interface 401, an operation of mirroring the screen to the tablet computer (this is described below), the laptop computer sends, in response to the operation, the display information on the interface 401 to the tablet computer (it is assumed that the tablet computer is currently in a landscape state). The tablet computer displays the interface 401, as shown in FIG. 5A(b). When the tablet computer is switched from a landscape mode to a portrait mode, a size of the projected interface (that is, the interface 401) on a display screen of the tablet computer is adjusted. For example, in FIG. 5A(c), the tablet computer is switched from the landscape mode to the portrait mode, and the interface 401 on the tablet computer is zoomed out. This results in a black area on the tablet computer. In this manner, display resources of the tablet computer are wasted, and the projected interface is zoomed out. This makes it difficult for the user to view the interface. User experience is affected. In another manner, when the tablet computer is switched from the landscape mode to the portrait mode, the projected interface on the tablet computer is stretched (or referred to as zoomed in), to fully cover the display screen of the tablet computer, as shown in FIG. 5A(d). In this manner, although the display resources are not wasted, the projected interface is stretched and distorted. User experience is affected. Therefore, in the current screen mirroring technology, in a procedure of projecting the screen from the transmitter to the receiver, if the screen of the receiver rotates (for example, the receiver is switched from the landscape mode to the portrait mode), the display resources are wasted, or a picture is stretched and distorted. Experience is poor.

FIG. 5A(a) to FIG. 5A(d) use screen mirroring as an example. Application casting has a similar problem.

Figure 5B:
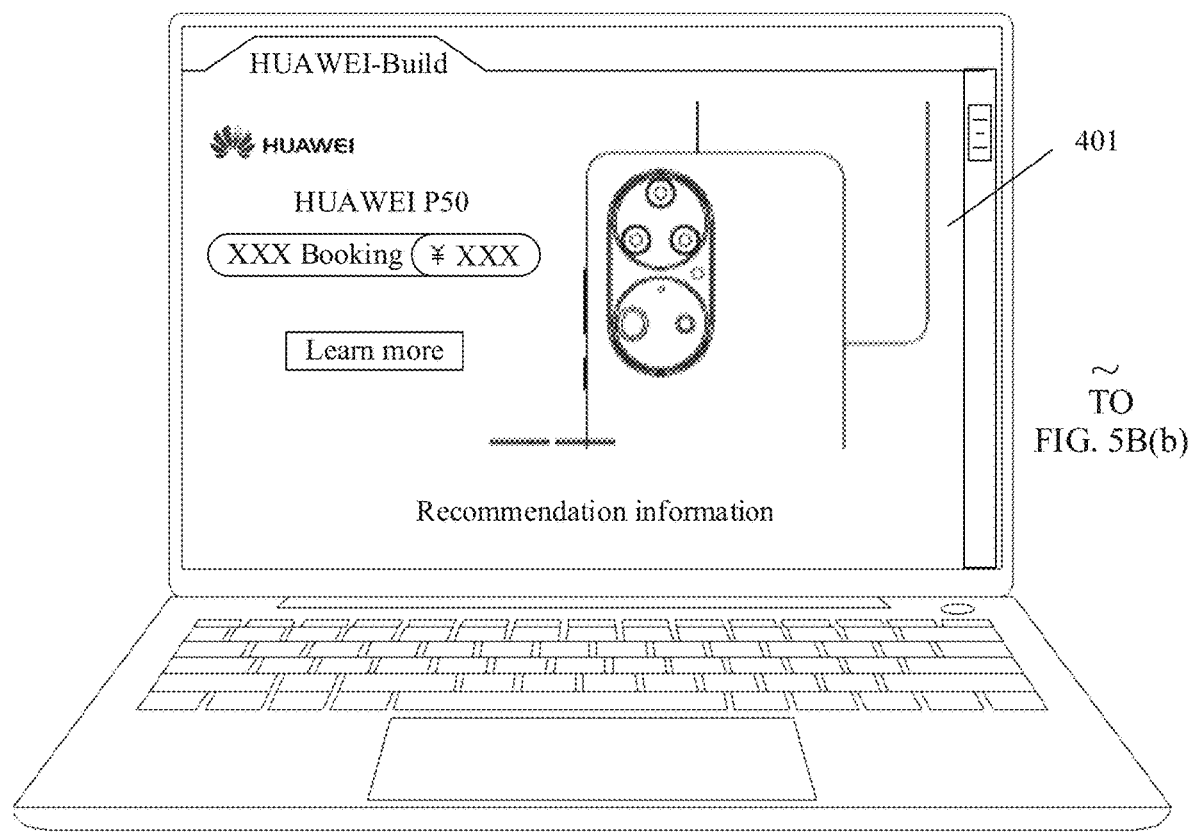
FIG. 5B(a) to FIG. 5B(e) are another schematic diagram of projecting a screen from a laptop computer to a tablet computer according to an embodiment of this application.
Figure 5B:
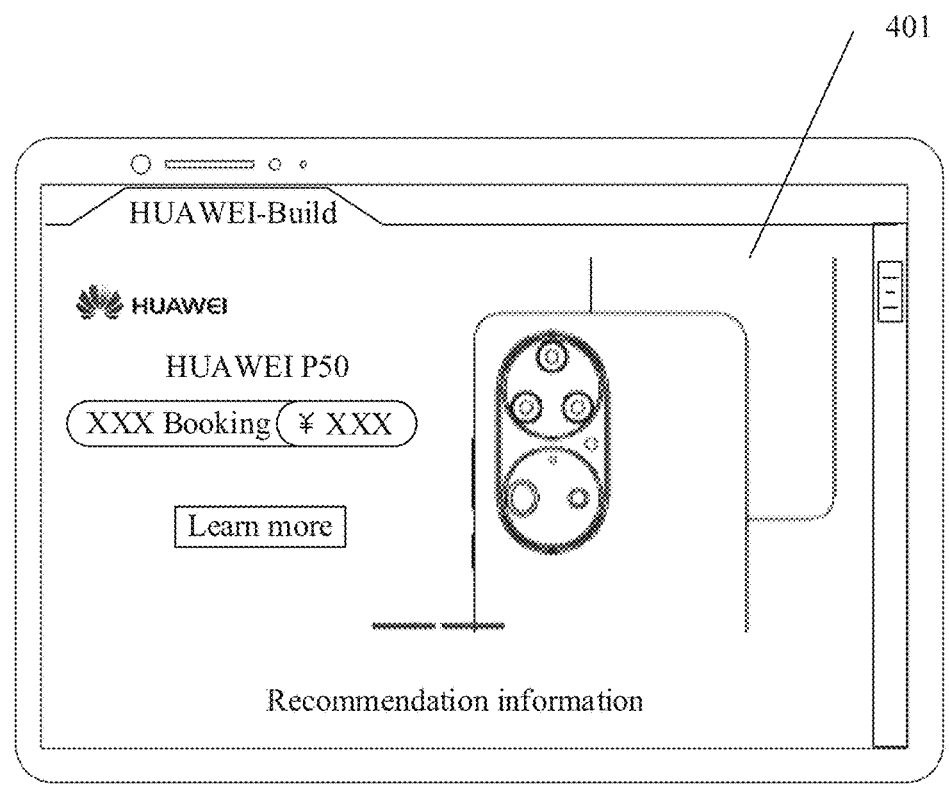
Figure 5B:
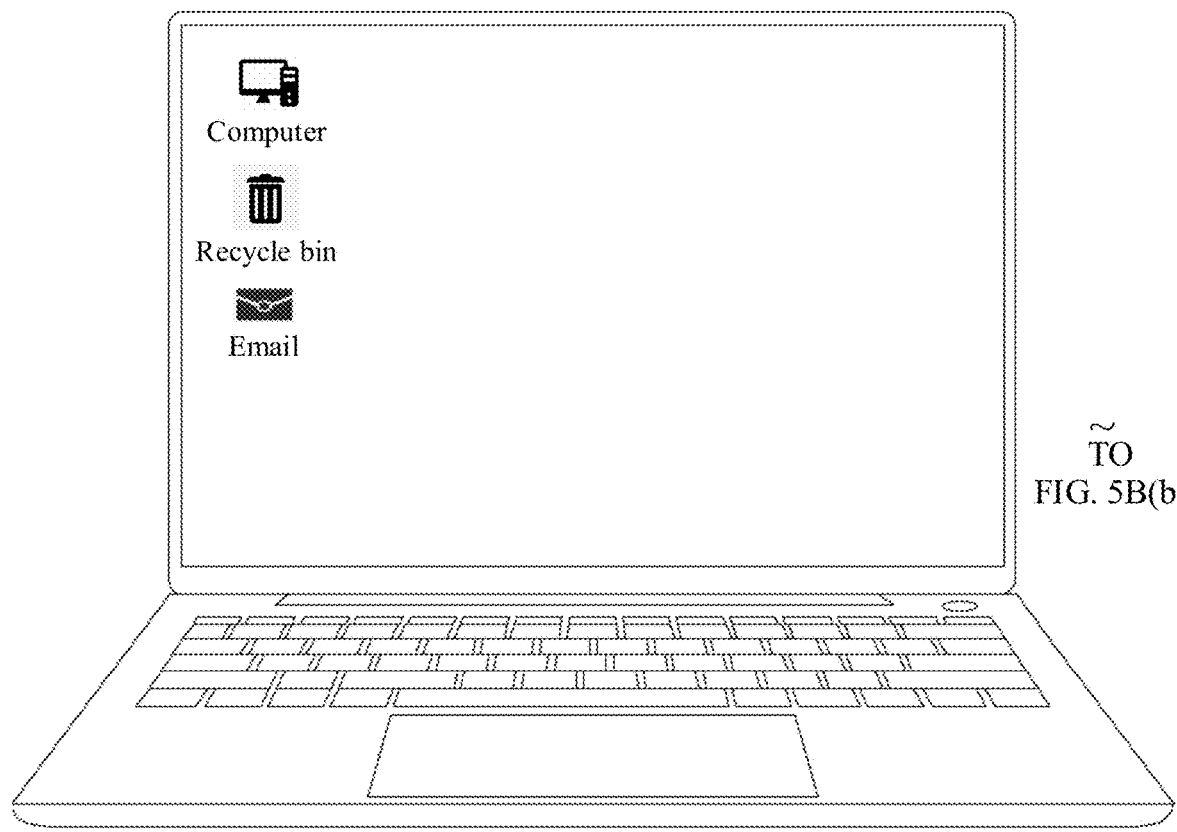
Figure 5B:
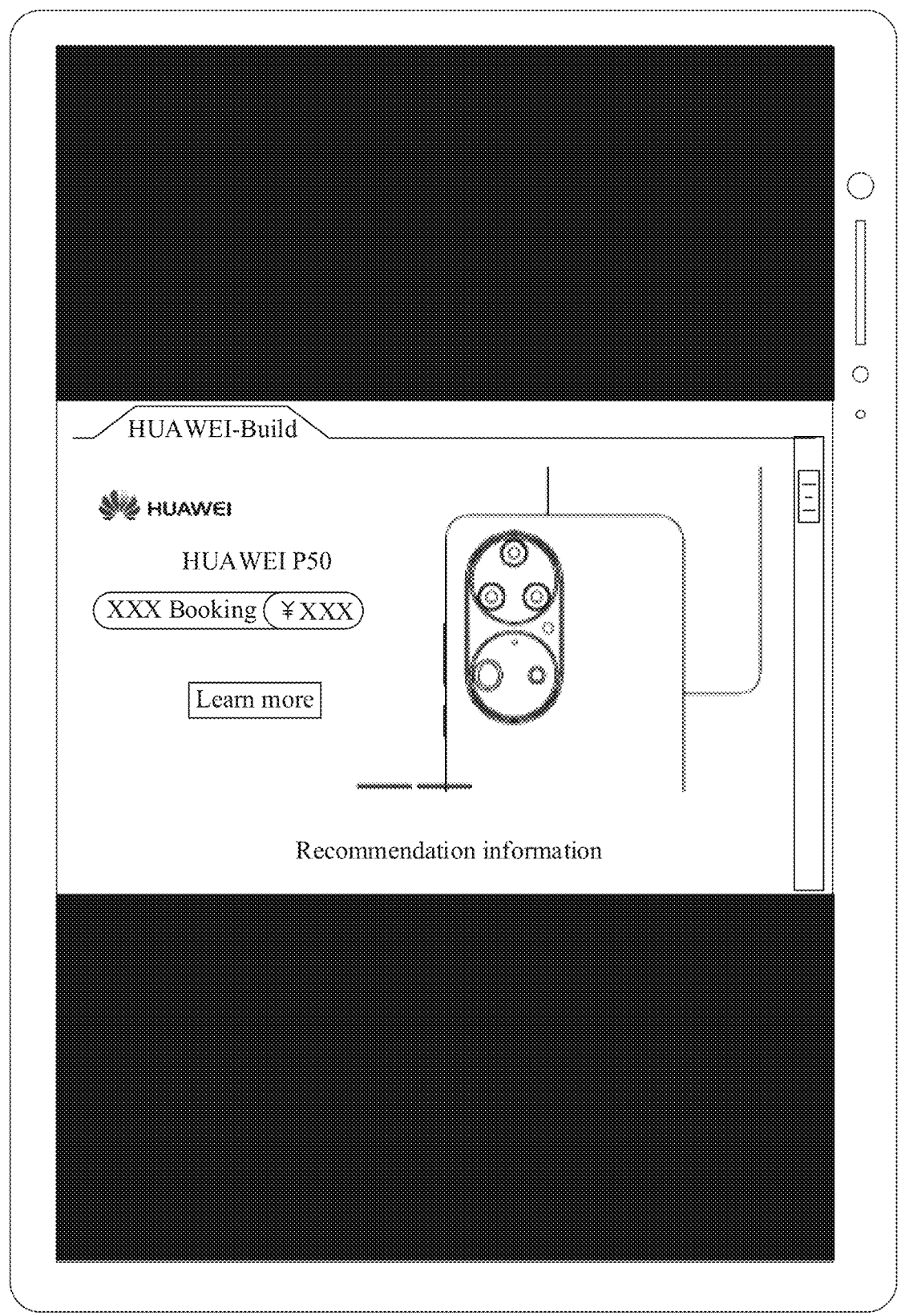
Figure 5B:
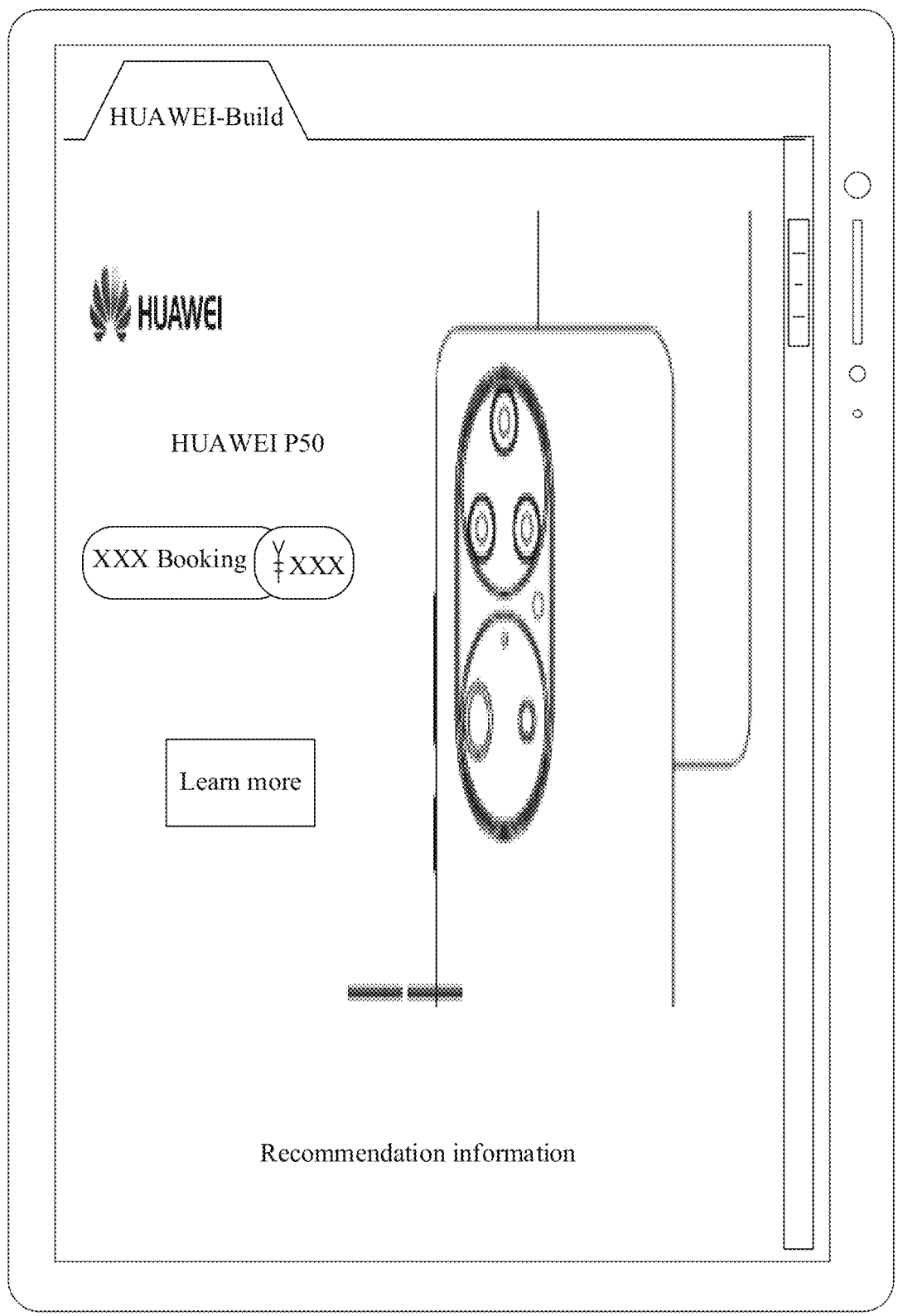

As shown in FIG. 5B(a), the laptop computer displays the interface 401. When detecting an operation of casting an application to the tablet computer (this is described below), the laptop computer sends the display information on the interface 401 to the tablet computer (it is assumed that the tablet computer is in the landscape state). The tablet computer displays the interface 401, as shown in FIG. 5B(b). After projecting the screen to the tablet computer, the laptop computer displays a desktop, as shown in FIG. 5B(c). When the tablet computer is switched from the landscape mode to the portrait mode, the size of the projected interface on the display screen of the tablet computer is adjusted. For example, in FIG. 5B(d), the tablet computer is switched from the landscape mode to the portrait mode, and the interface 401 projected to the tablet computer is zoomed out. This results in a black area on the tablet computer, and wastes the display resources. The projected interface is zoomed out and this makes it difficult for the user to view the interface. In another manner, when the tablet computer is switched from the landscape mode to the portrait mode, the projected interface on the tablet computer is stretched (or zoomed in), to fully cover the display screen of the tablet computer, as shown in FIG. 5B(e). In this manner, the projected interface is distorted. User experience is affected. Therefore, the current application casting technology has the similar problem. In other words, in a procedure of projecting the screen from the transmitter to the receiver, if the screen of the receiver rotates (for example, the receiver is switched from the landscape mode to the portrait mode), the black area appears, or the picture is stretched and distorted.

For both application casting and screen mirroring, a cause of the foregoing problem is that when the transmitter projects the screen to the receiver, the interface to be projected to the receiver is sent to the receiver as an image only for display. When the screen of the receiver rotates, the image is zoomed out or zoomed in. When the image is zoomed out, the area appears. When the image is zoomed in, the image is distorted.

To improve screen projection experience, embodiments of this application provide a display method. The display method is applicable to an application casting scenario. For details about application casting, refer to the foregoing description. Specifically, in a procedure in which a first electronic device casts an application to a second electronic device, if a screen of the second electronic device rotates, the first electronic device adjusts, in response to the screen rotation of the second electronic device, an interface (a projected interface for short) to be projected to the second electronic device is adjusted. This adjustment does not simply zoom in/out the projected interface as an image, but adjusts a layout of display information on the projected interface, and/or removes information from or add information to the display information on the projected interface. The first electronic device sends a projected interface obtained after adjustment to the second electronic device. When the second electronic device displays the projected interface obtained after adjustment, a picture is not distorted, and a black area does not appear. Screen projection experience is good.

The following describes an application scenario of this application.

That the transmitter may be in a landscape mode or a portrait mode, and the receiver may also be in a landscape mode or a portrait mode is considered. There are a plurality of cases. 1. The transmitter is in the landscape mode, and the receiver is in the landscape mode. 2. The transmitter is in the landscape mode, and the receiver is in the portrait mode. 3.

The transmitter is in the portrait mode, and the receiver is in the portrait mode. 4. The transmitter is in the portrait mode, and the receiver is in the landscape mode. Therefore, the following describes four application scenarios, which respectively correspond to the foregoing four cases.

First Application Scenario

In this application scenario, an example in which a laptop computer (in a landscape state) casts an application to a tablet computer currently in a landscape state is used. Corresponding to the case 1, the transmitter is in the landscape mode, and the receiver is in the landscape mode.

Figure 6A:
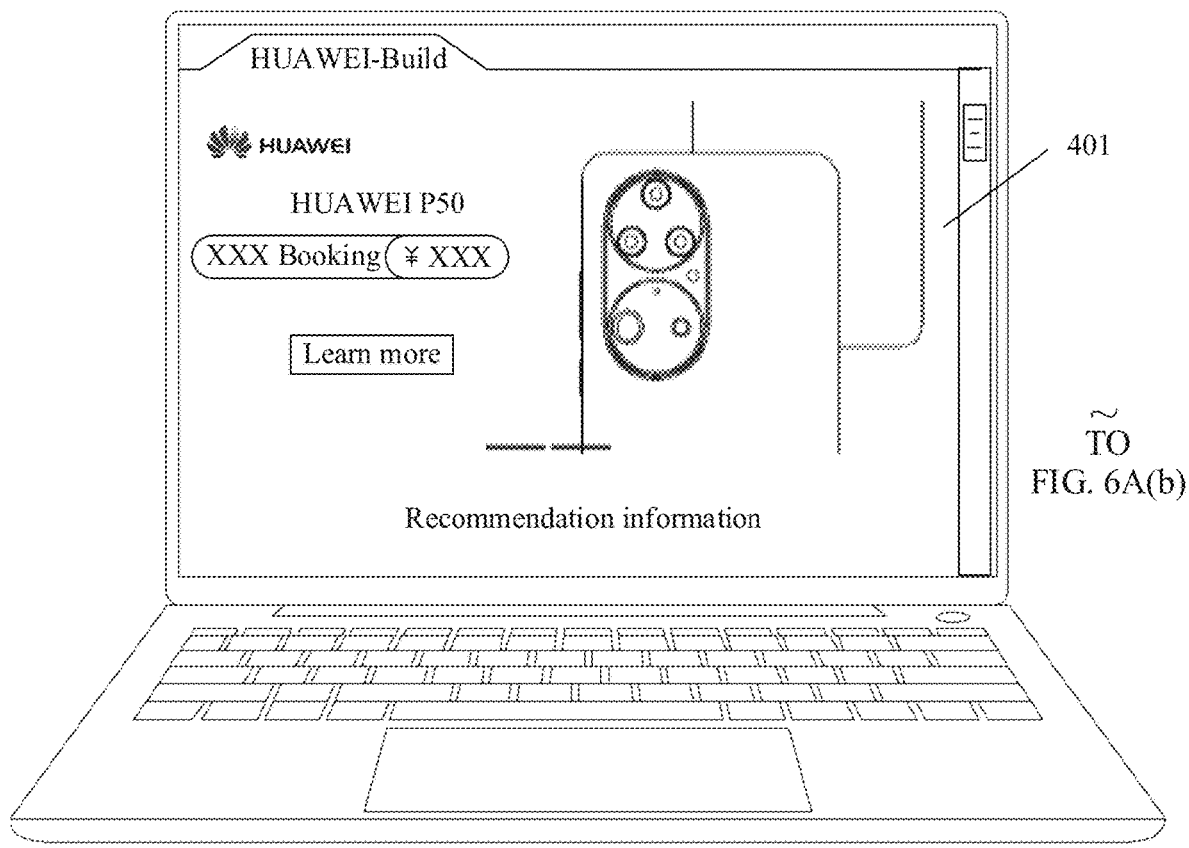
FIG. 6A(a) to FIG. 6A(e) and FIG. 6B(a) to FIG. 6B(e) are schematic diagrams of two application scenarios according to an embodiment of this application.
Figure 6A:
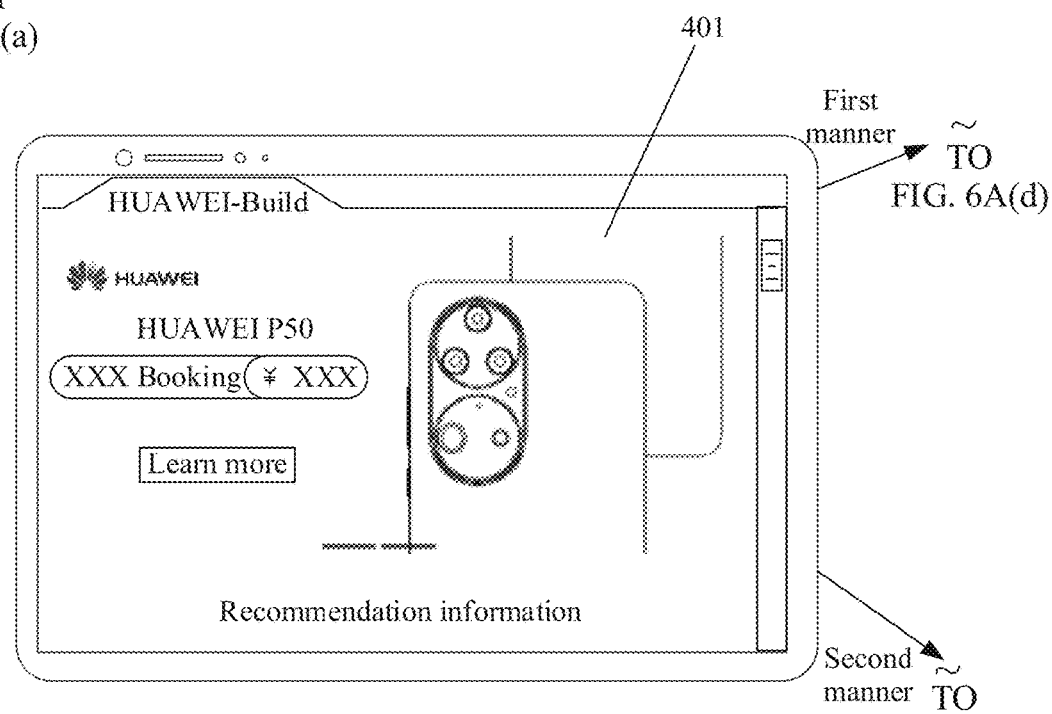
Figure 6A:
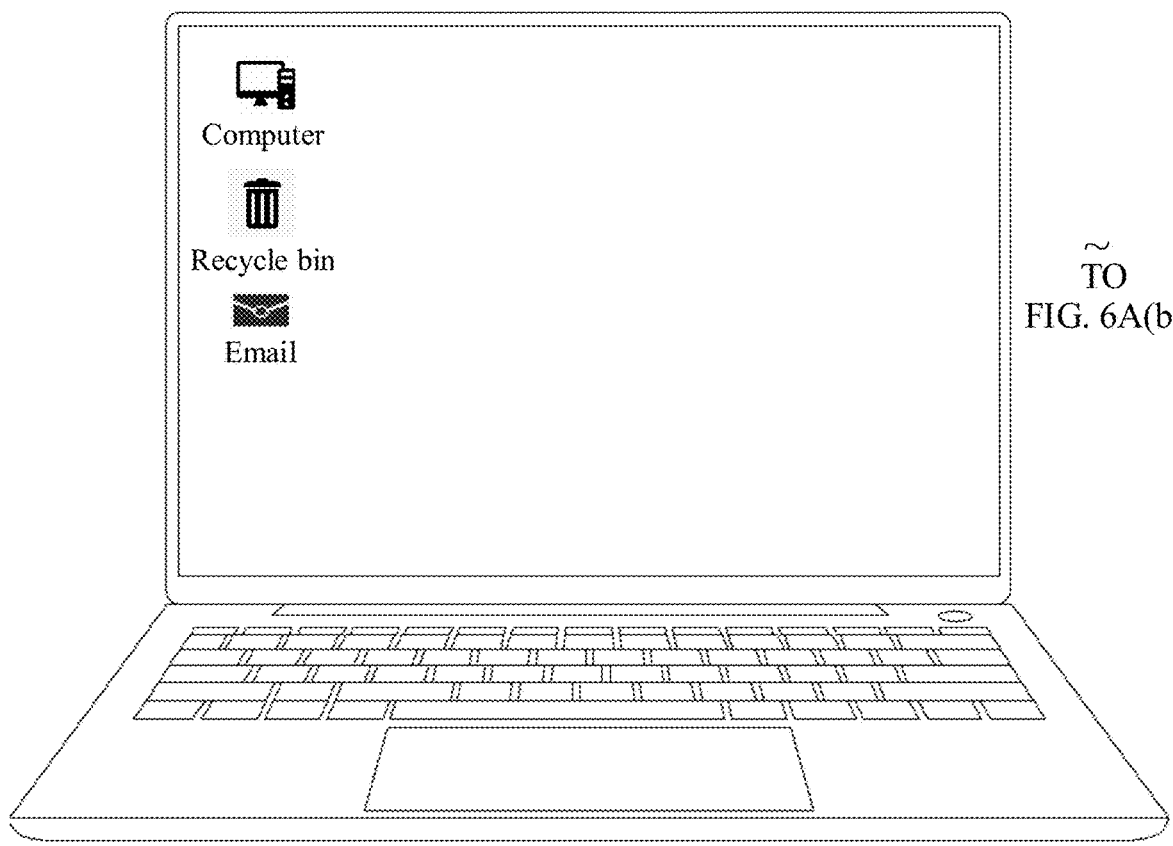
Figure 6A:
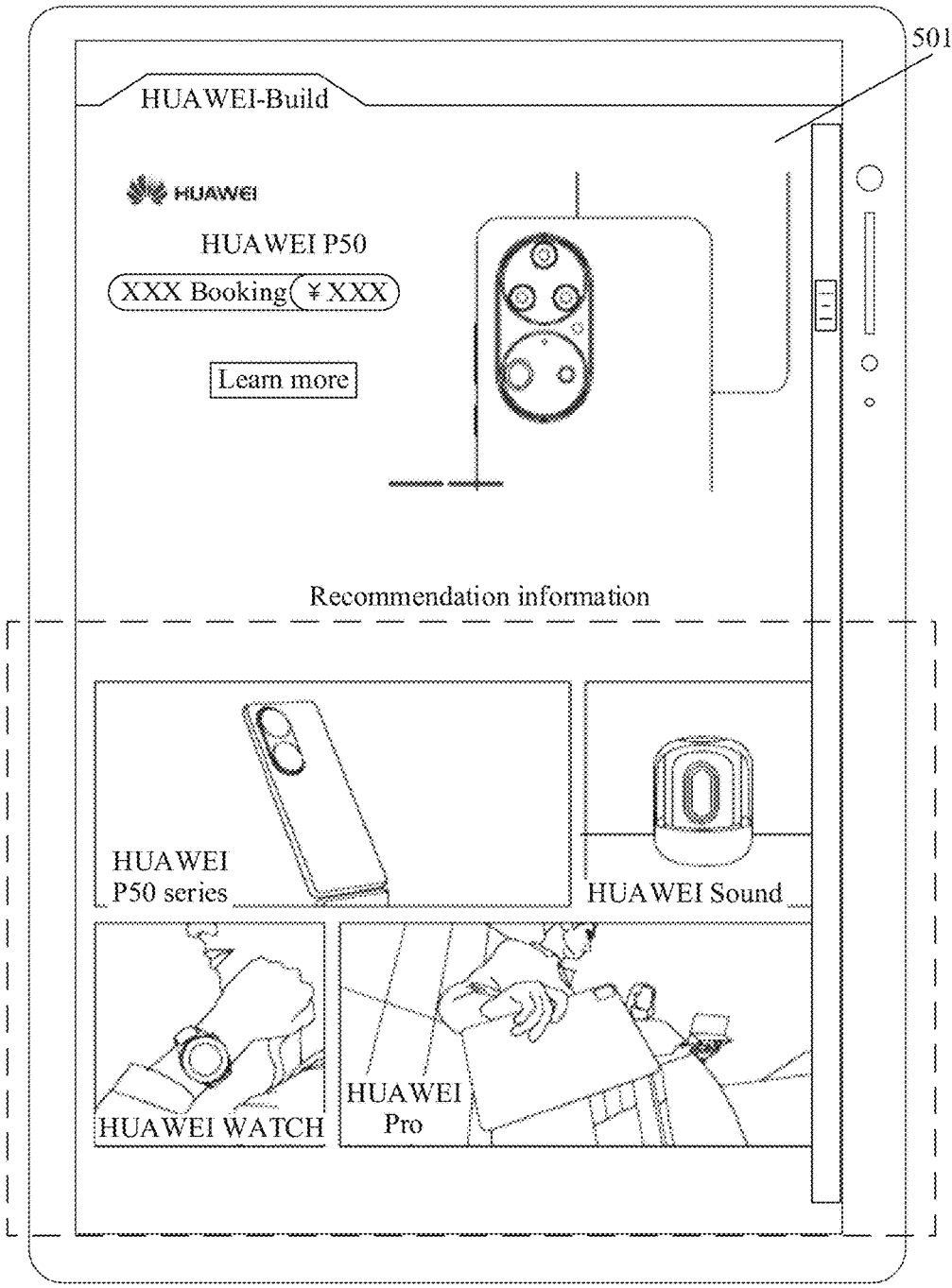
Figure 6A:
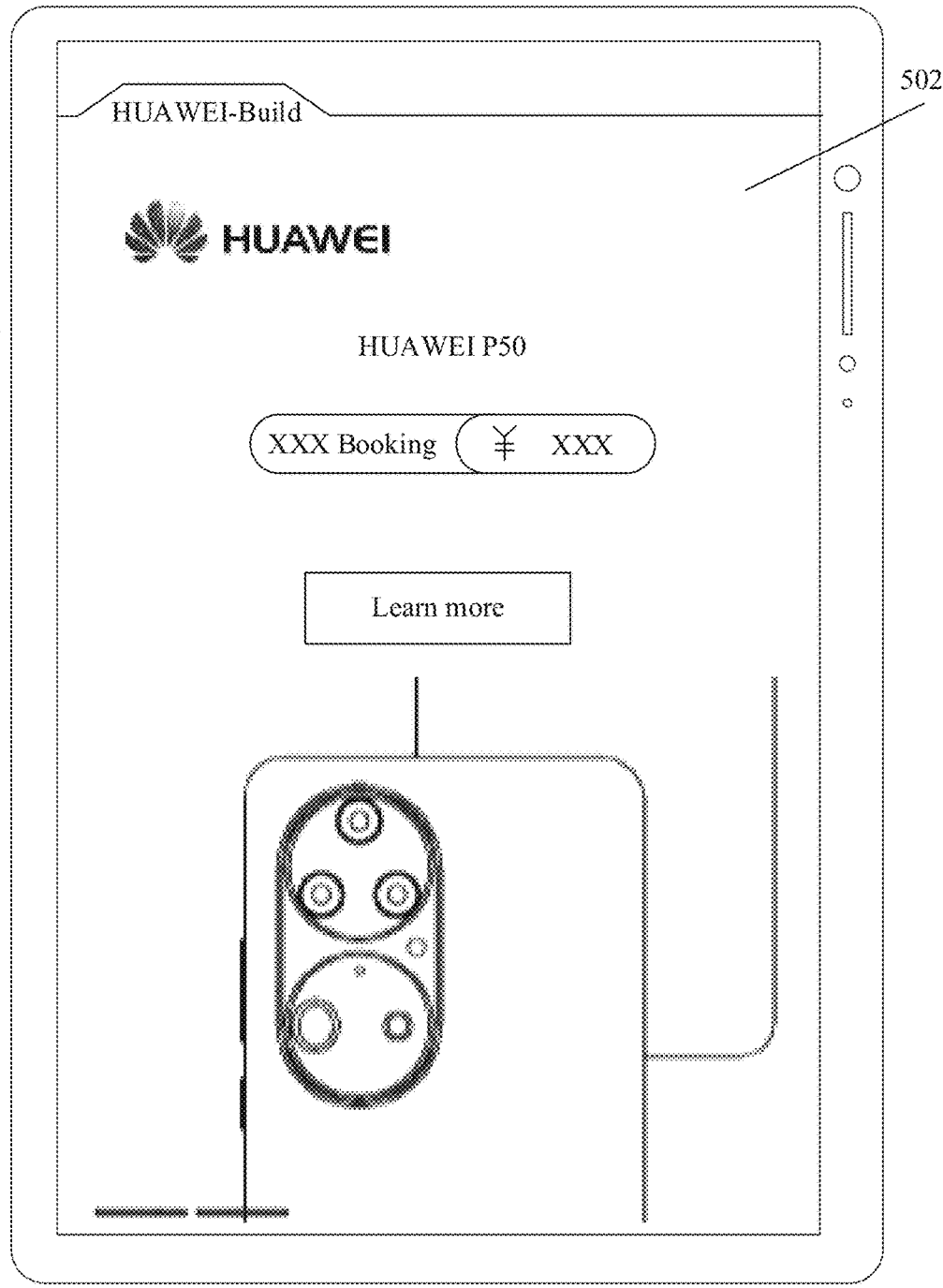

As shown in FIG. 6A(a), the laptop computer displays the interface 401. In this case, if detecting an operation of casting an application to the tablet computer (this is described below), the laptop computer sends, in response to the operation, the display information on the interface 401 to the tablet computer. The tablet computer displays the interface 401, as shown in FIG. 6A(b). After projecting the interface 401, the laptop computer displays the desktop, as shown in FIG. 6A(c).

It should be noted that, before sending the display information on the interface 401 to the tablet computer, the laptop computer determines whether a current screen display direction of the tablet computer is a landscape direction or a portrait direction, and determines, based on the screen display direction of the tablet computer, whether to adjust the interface (that is, the interface 401) that is about to be projected to the tablet computer. For example, when it is determined that the current screen display direction of the tablet computer is the landscape direction, the interface 401 does not need to be adjusted. Because the interface 401 is suitable for landscape display (because the laptop computer displays the interface 401 in the landscape mode), the laptop computer directly sends the display information on the interface 401 to the tablet computer. It should be noted that, in the current application casting technology, the transmitter directly sends, in response to an application casting operation, a display interface on a foreground of the transmitter to the receiver for display, without determining, based on the current screen display direction of the receiver, whether to adjust an interface that is about to be projected to the receiver. Therefore, in the current application casting technology, the interface projected to the receiver by the transmitter in response to the application casting operation may not adapt to the current screen display direction of the receiver. In this embodiment of this application, before projecting the screen to the transmitter, the transmitter may determine, based on the screen display direction of the receiver, whether to adjust the interface that is about to be projected to the tablet computer. Therefore, the interface projected to the receiver definitely adapts to the current screen display direction of the receiver.

Still refer to FIG. 6A(b). In a procedure in which the tablet computer displays the projected interface 401, the screen may rotate, for example, be switched from the landscape mode to the portrait mode.

In a manner, when the tablet computer is switched from the landscape mode to the portrait mode, there is more display information on the projected interface on the tablet computer. As shown in FIG. 6A(b) and FIG. 6A(d), when the tablet computer is switched from the landscape mode to the portrait mode, the projected interface changes from the interface 401 to the interface 501. The interface 501 includes more display information than the interface 401. The added display information may be display information on a previous interface of the interface 401 or a following interface of the interface 401, or display information on a default interface (for example, a home page of the web page) or a user-specified interface. For example, refer to FIG. 4(a) and FIG. 4(b). Display information (that is, display information in a dashed line area) that is an addition to the interface 501 compared with that on the interface 401 is display information on a following interface 403 (refer to FIG. 4(b)) of the interface 401. In this manner, when the tablet computer is switched from the landscape mode to the portrait mode, there is more display information on the projected interface, and display resources are not wasted. In addition, a user may obtain more projection information. Experience is good.

In another manner, when the tablet computer is switched from the landscape mode to the portrait mode, no display information is added to the projected interface, but a layout manner is adjusted. As shown in FIG. 6A(b) and FIG. 6A(e), when the tablet computer is switched from the landscape mode to the portrait mode, the projected interface on the tablet computer changes from the interface 401 to an interface 502. A layout manner of the display information on the interface 502 is different from that of the interface 401. For example, on the interface 401, the text (for example, HUAWEI P50) is on the left, and the image (for example, the image of the mobile phone) is on the right. However, on the interface 502, the text is above the image. In this manner, the projected interface is not zoomed in/out. Therefore, the black area does not appear, and the picture is not distorted.

Second Application Scenario

In the second application scenario, an example in which the laptop computer (in the landscape state) projects the screen to the tablet computer currently in the portrait state is used. Corresponding to the case 2, the transmitter is in the landscape mode, and the receiver is in the portrait mode.

Figure 6B:
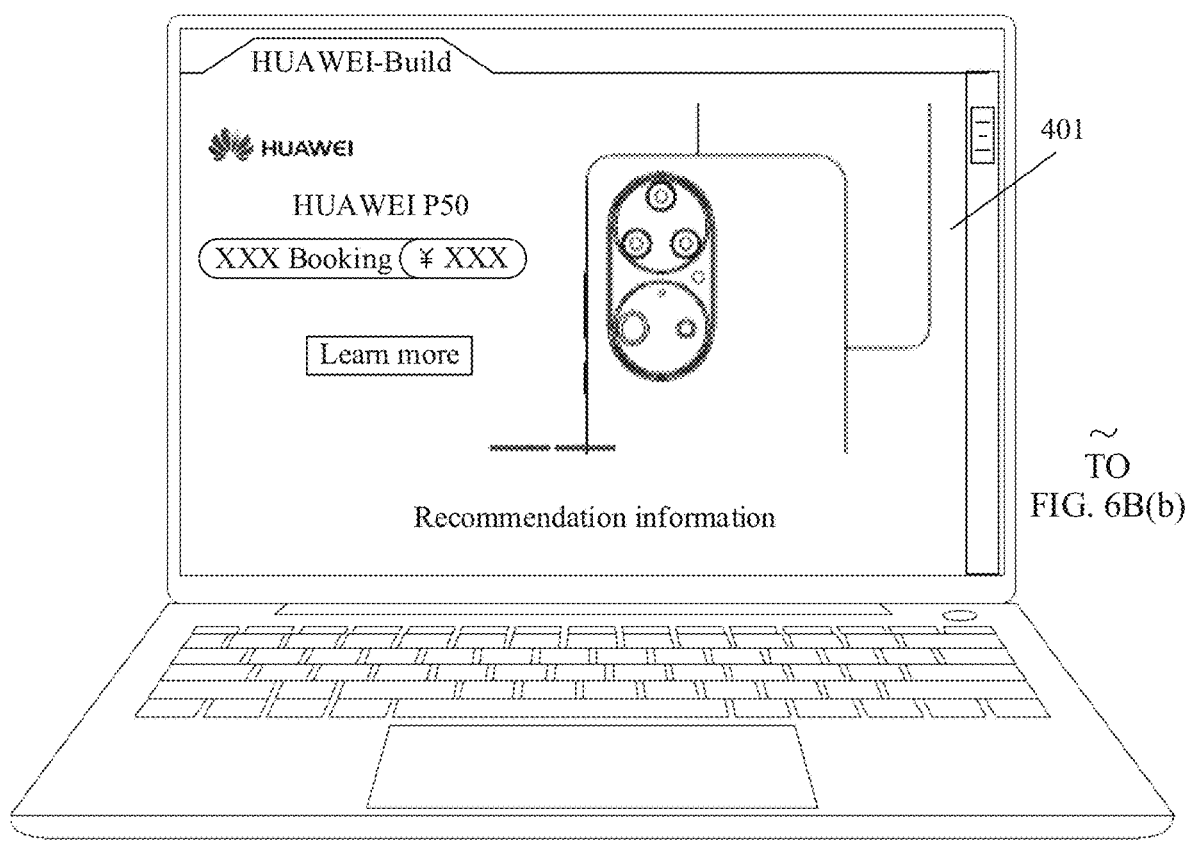
Figure 6B:
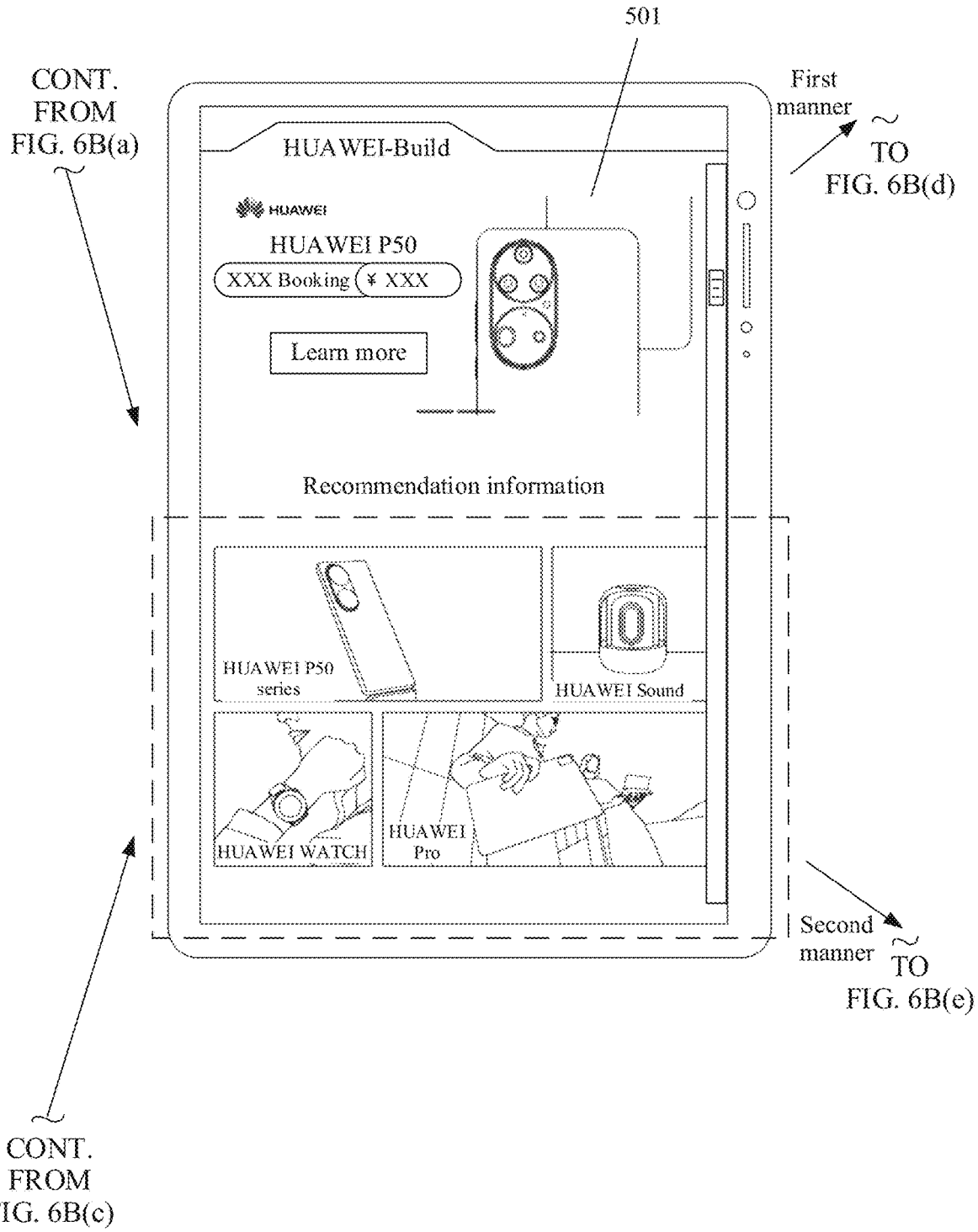
Figure 6B:
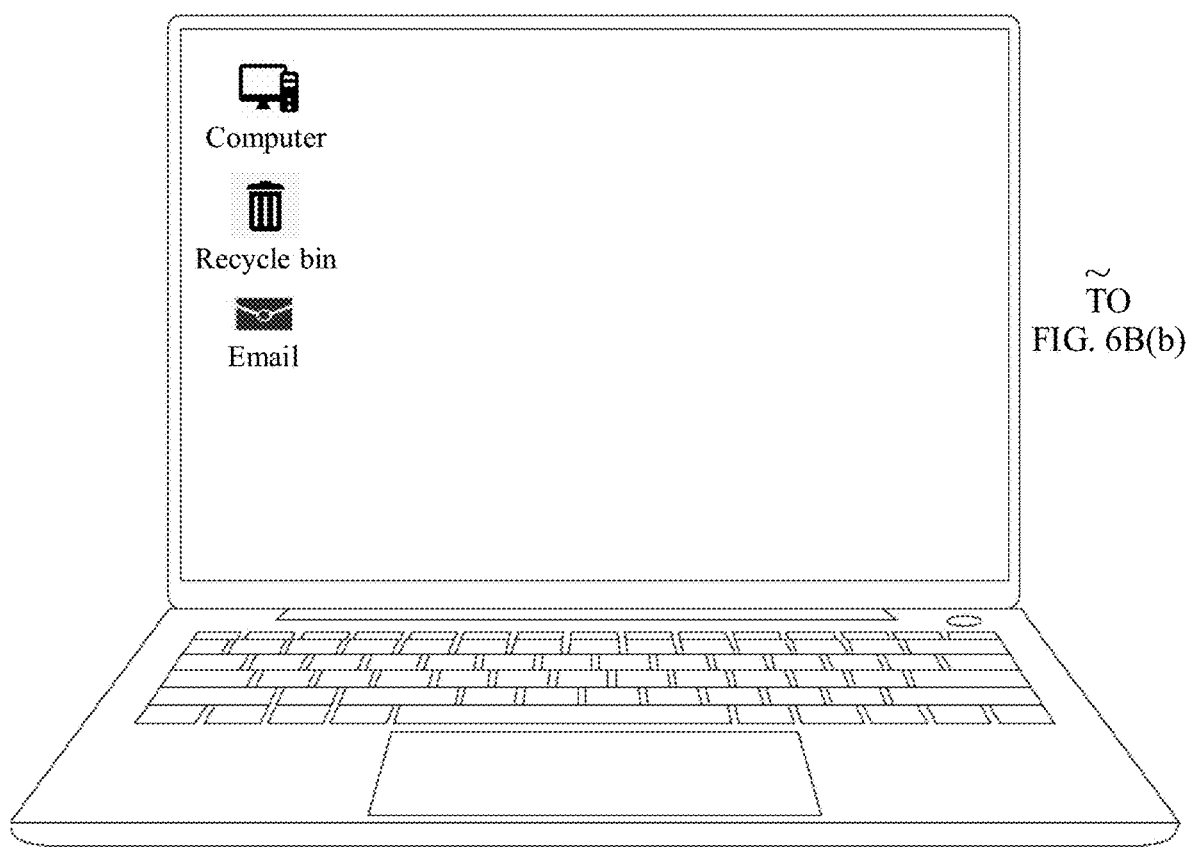
Figure 6B:
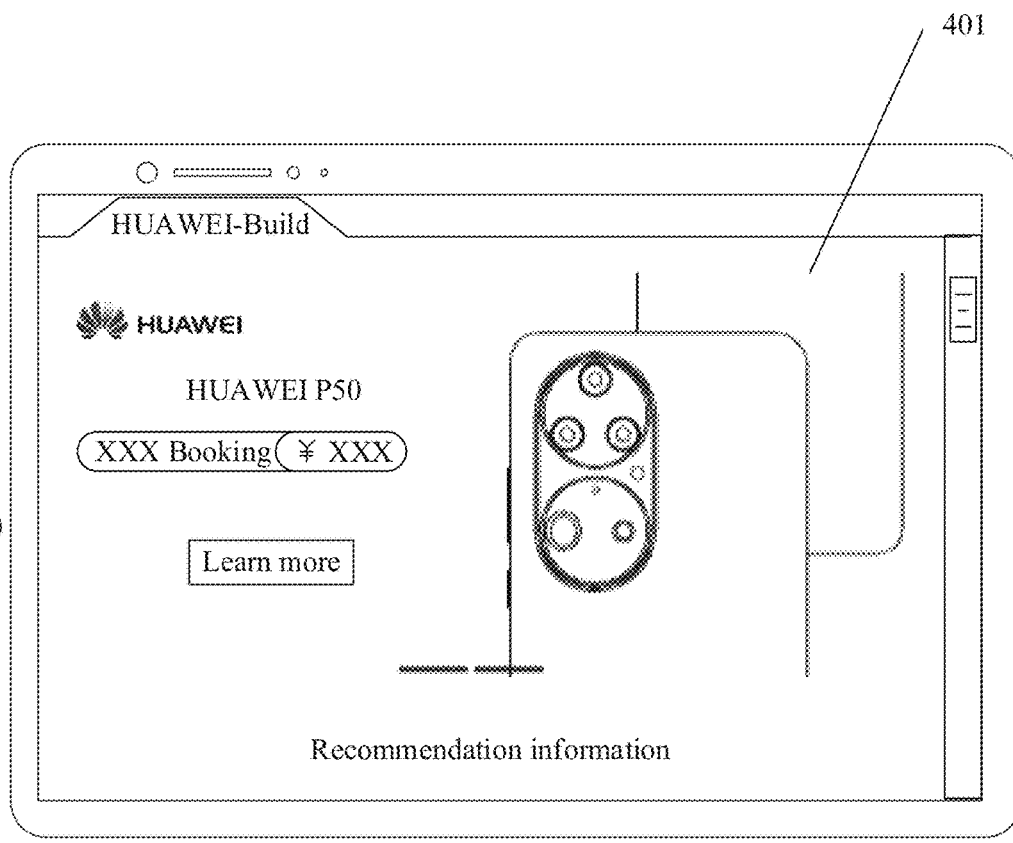
Figure 6B:
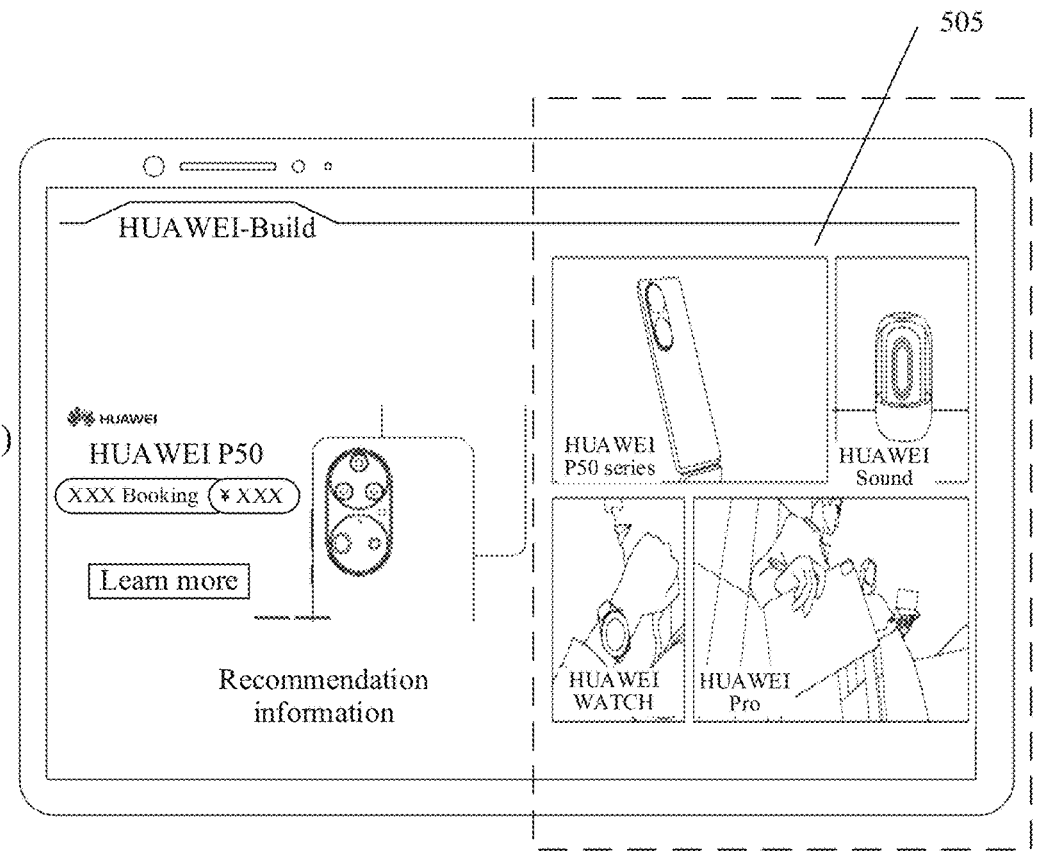

As shown in FIG. 6B(a), the laptop computer displays the interface 401. In this case, if detecting an operation of casting an application to the tablet computer (this is described below), the laptop computer sends, in response to the operation, the display information on the interface 501 to the tablet computer. The tablet computer displays the interface 501, as shown in FIG. 6B(b). After projecting the screen, the laptop computer displays the desktop, as shown in FIG. 6B(c). The interface 501 has more display information than the interface 401. For example, the display information (that is, the display information in the dashed line area) that is an addition to the interface 501 compared with that on the interface 401 is display information on the following interface 403 (the interface 403 in FIG. 4(b)) of the interface 401.

Refer to FIG. 6A(a) to FIG. 6A(e) and FIG. 6B(a) to FIG. 6B(e). It should be understood that in FIG. 6A(a) to FIG. 6A(e) and FIG. 6B(a) to FIG. 6B(e), when projecting the screen to the tablet computer currently in the landscape mode, the laptop computer sends the display information on the interface 401, and in FIG. 6B(a) to FIG. 6B(e), when projecting the screen to the tablet computer currently in the portrait mode, the laptop computer sends the display information on the interface 501. In FIG. 6A(a) to FIG. 6A(e), before sending the display information on the interface 401, the laptop computer determines that the tablet computer is currently in the landscape mode, and the interface 401 is suitable for landscape display. Therefore, the display information on the interface 401 is directly sent to the tablet computer. However, in FIG. 6B(a) to FIG. 6B(e), before sending the display information on the interface 501 to the tablet computer, the laptop computer determines that the tablet computer is currently in the portrait mode. Therefore, the interface 401 needs to be adjusted. The interface 401 is suitable for landscape display but not for portrait display. Therefore, the laptop computer adjusts the interface 401 to be the interface 501, and sends the interface 501 to the tablet computer. It can be learned that in this embodiment of this application, before projecting the screen to the receiver, the transmitter may determine whether the receiver is in the landscape mode or the portrait mode. If the screen display direction of the receiver is consistent with that of the transmitter (for example, both the transmitter and the receiver are in the landscape mode), the transmitter directly sends the display information on the foreground display interface to the receiver, without adjusting the foreground display interface. If the screen display direction of the receiver is inconsistent with that of the transmitter, for example, the transmitter is in the landscape mode and the receiver is in the portrait mode, the transmitter needs to adjust the foreground display interface, and sends an interface obtained through adjustment to the receiver for display. Therefore, in this embodiment of this application, the transmitter adjusts, based on the screen display direction of the receiver, the interface that is about to be projected to the receiver, so that the interface obtained through adjustment may adapt to the screen display direction of the receiver when projected to the receiver.

Still refer to FIG. 6B(b). In a procedure in which the tablet computer displays the projected interface 501, the screen may rotate, for example, be switched from the portrait mode to the landscape mode.

In a manner, when the tablet computer is switched from the portrait mode to the landscape mode, there is less display information on the projected interface on the tablet computer. As shown in FIG. 6B(b) and FIG. 6B(d), when the tablet computer is switched from the portrait mode to the landscape mode, the projected interface on the tablet computer changes from the interface 501 to the interface 401. The interface 401 has less display information than the interface 501. Removed display information is the display information in a dashed line area on the interface 501.

In another manner, when the tablet computer is switched from the portrait mode to the landscape mode, no display information is removed from the projected interface, but a layout manner is adjusted. As shown in FIG. 6B(b) and FIG. 6B(e), the tablet computer is switched from the portrait mode to the landscape mode, and the projected interface on the tablet computer changes from the interface 501 to an interface 505. A layout manner of the display information on the interface 505 is different from that of the interface 501. For example, on the interface 501, the display information in the dashed line area is on the lower side of the display screen. However, on the interface 505, the display information in the dashed line area is on the right of the display screen.

Third Application Scenario

This application scenario corresponds to the case 3. The transmitter is in the portrait mode, and the receiver is in the portrait mode. It may be understood that in the foregoing examples, the transmitter is a laptop computer. A laptop computer is generally used in the landscape mode, and cannot be used in the portrait mode for display. Therefore, in this application scenario, an example in which the transmitter is a mobile phone is used. For example, an example in which a mobile phone in a portrait state projects a screen to a tablet computer currently in a portrait state is used.

Figure 7A:
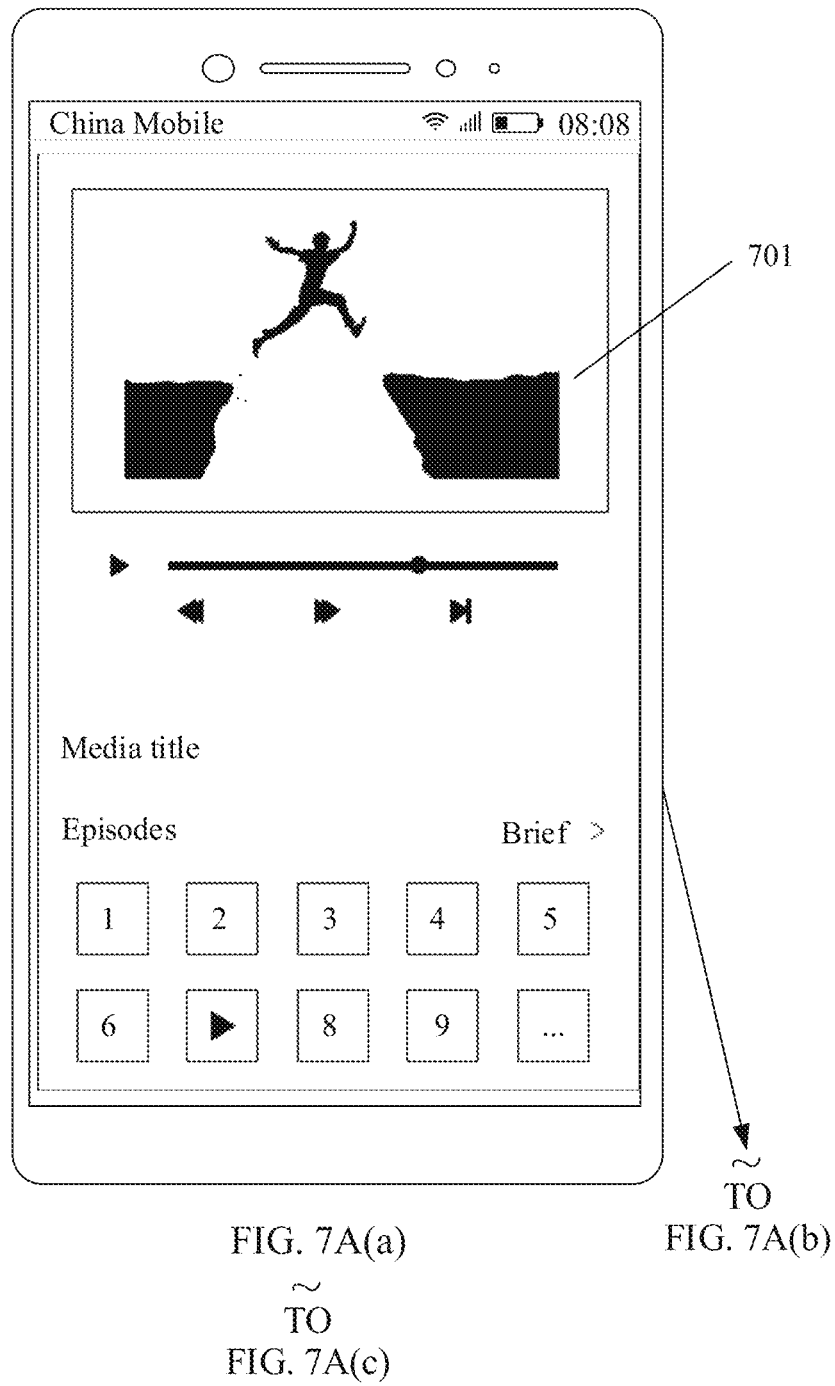
FIG. 7A(a) to FIG. 7A(e) and FIG. 7B(a) to FIG. 7B(d) are schematic diagrams of other two application scenarios according to an embodiment of this application.
Figure 7A:
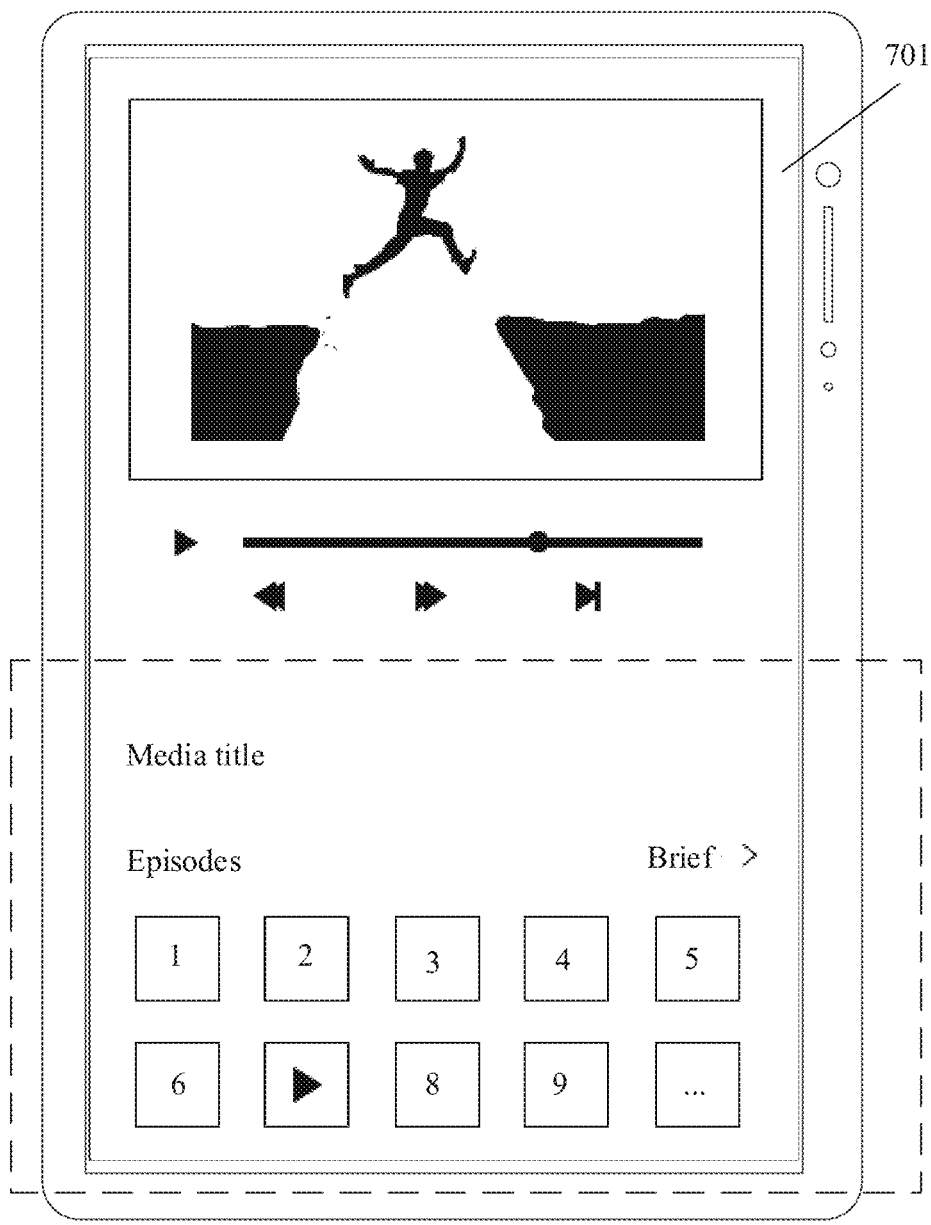
Figure 7A:
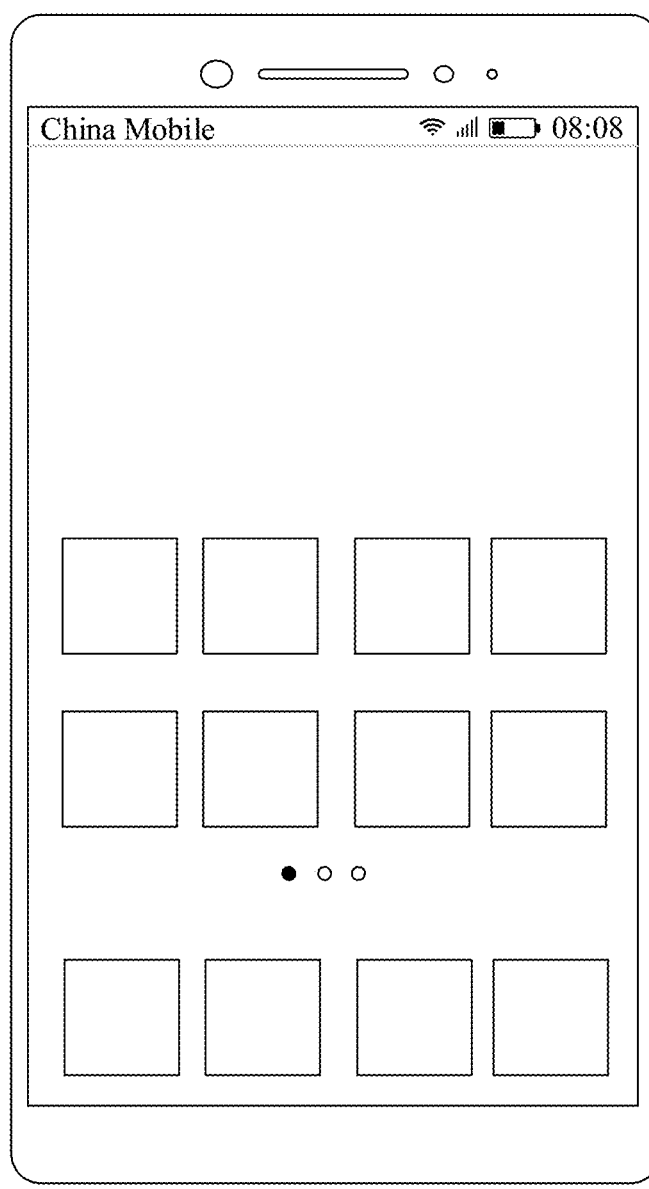
Figure 7A:
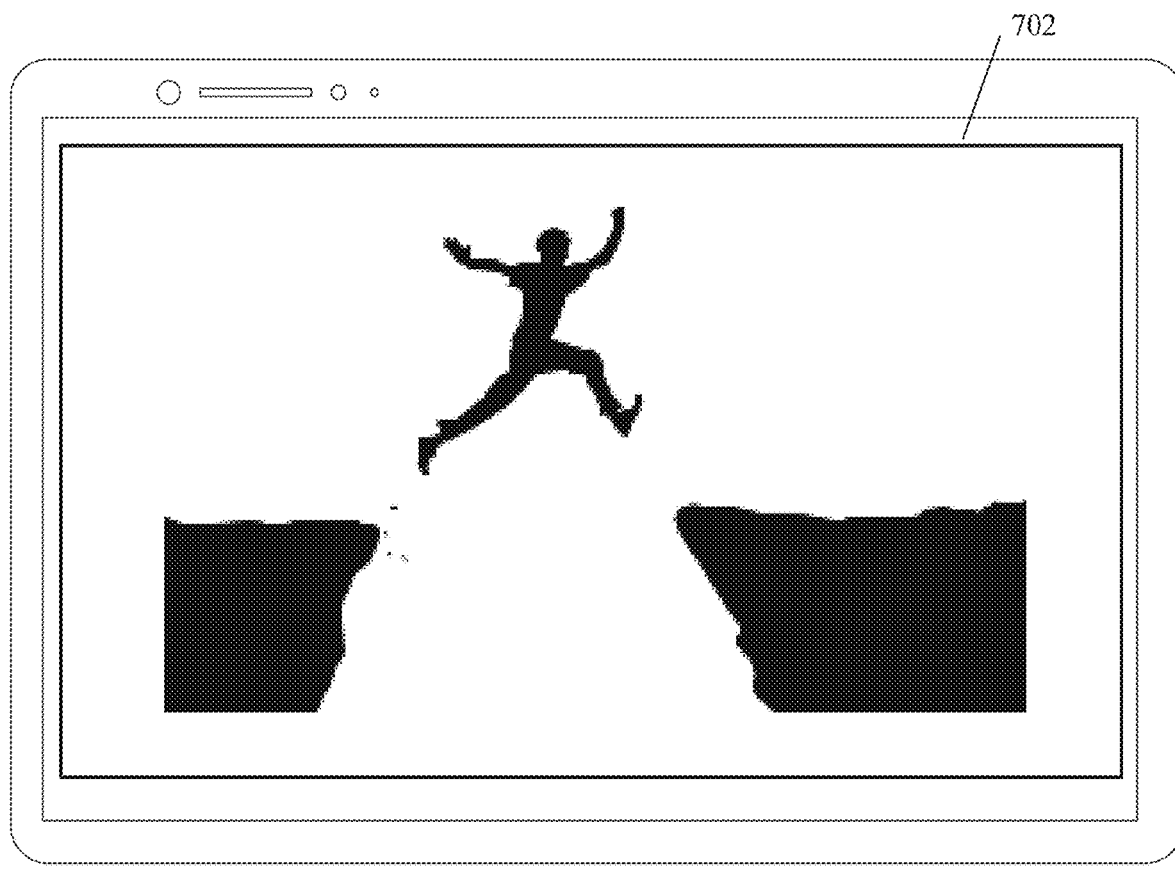
Figure 7A:
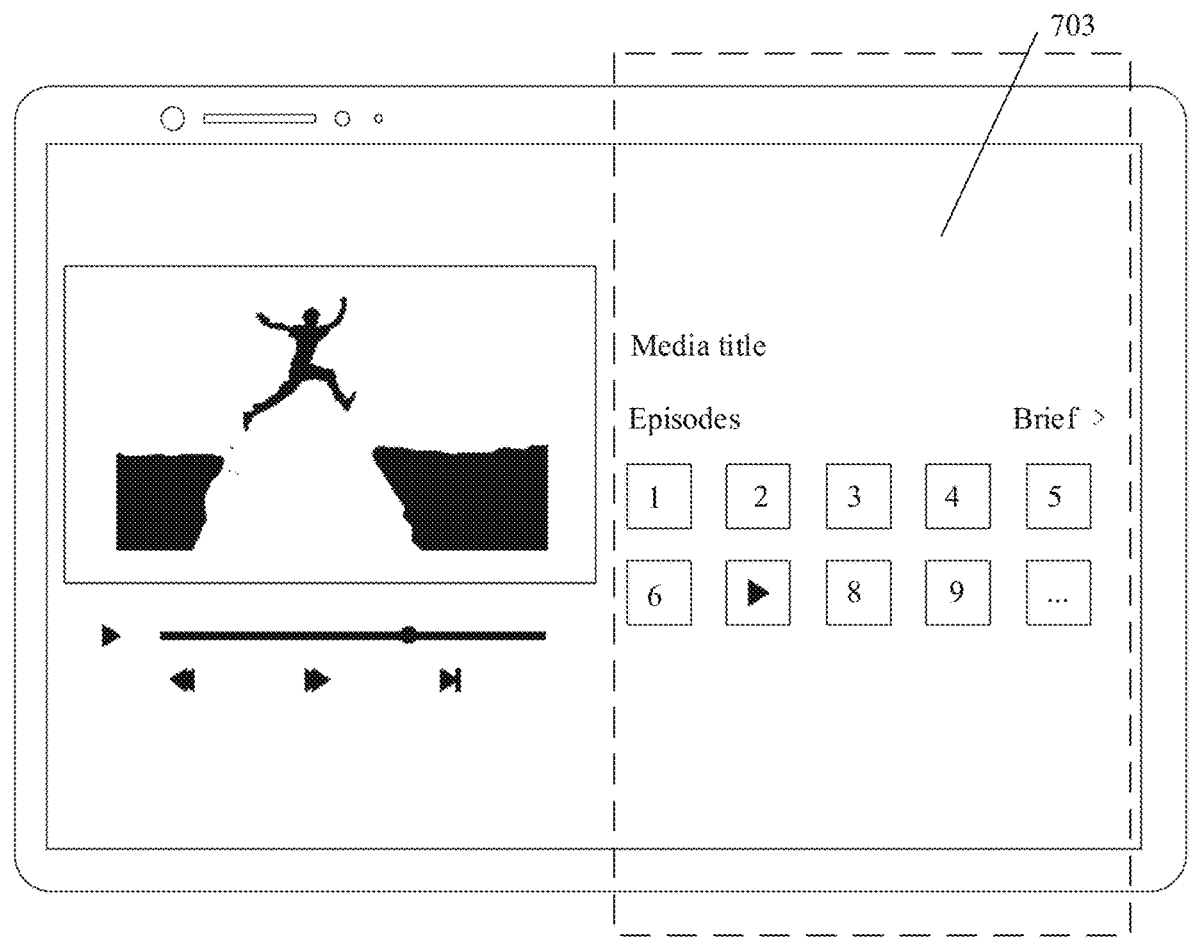

As shown in FIG. 7A(a), the mobile phone is in the portrait state and displays an interface 701. The interface 701 is, for example, an interface of a video play application on the mobile phone. The mobile phone detects an operation of casting an application to the tablet computer (this is described below), and sends, in response to the operation, display information on the interface 701 to the tablet computer. The tablet computer displays the interface 701, as shown in FIG. 7A(b). After projecting the interface 701, the mobile phone displays a home screen, as shown in FIG. 7A(c). It should be noted that, before sending the display information on the interface 701 to the tablet computer, the mobile phone determines whether a current screen display direction of the tablet computer is a landscape direction or a portrait direction, and determines, based on the current screen display direction of the tablet computer, whether to adjust the interface (that is, the interface 701) that is about to be projected to the tablet computer. For example, when it is determined that the tablet computer is in the portrait mode, the interface 701 does not need to be adjusted. Because the interface 701 is suitable for portrait display (because the mobile phone displays the interface 701 in the portrait mode), the mobile phone directly sends the display information on the interface 701 to the tablet computer.

Still as shown in FIG. 7A(b). When the tablet computer displays the projected interface 701, the screen may rotate, for example, be switched from the portrait mode to the landscape mode.

In a manner, when the tablet computer is switched from the portrait mode to the landscape mode, there is less display information on the projected interface. As shown in FIG. 7A(b) and FIG. 7A(d), when the tablet computer is switched from the portrait mode to the landscape mode, the projected interface on the tablet computer changes from the interface 701 to the interface 702. The interface 702 has less display information than the interface 701. Removed display information is display information in a dashed line area on the interface 701.

In another manner, when the tablet computer is switched from the portrait mode to the landscape mode, no display information is removed from the projected interface, but a layout manner is adjusted. For example, as shown in FIG. 7A(b) and FIG. 7A(e), when the tablet computer is switched from the portrait mode to the landscape mode, the projected interface on the tablet computer changes from the interface 701 to an interface 703. A layout manner of the display information on the interface 703 is different from that of the interface 701. For example, the display information (MEDIA TITLE, Episode keys, and the like) in the dashed line area on the interface 701 is on a lower side. The display information in the dashed line area is on the right of the interface 703.

Fourth Application Scenario

In this application scenario, an example in which a mobile phone in a portrait state projects a screen to a tablet computer currently in a landscape state is used. Corresponding to the case 4, the transmitter is in the portrait mode, and the receiver is in the landscape mode.

Figure 7B:
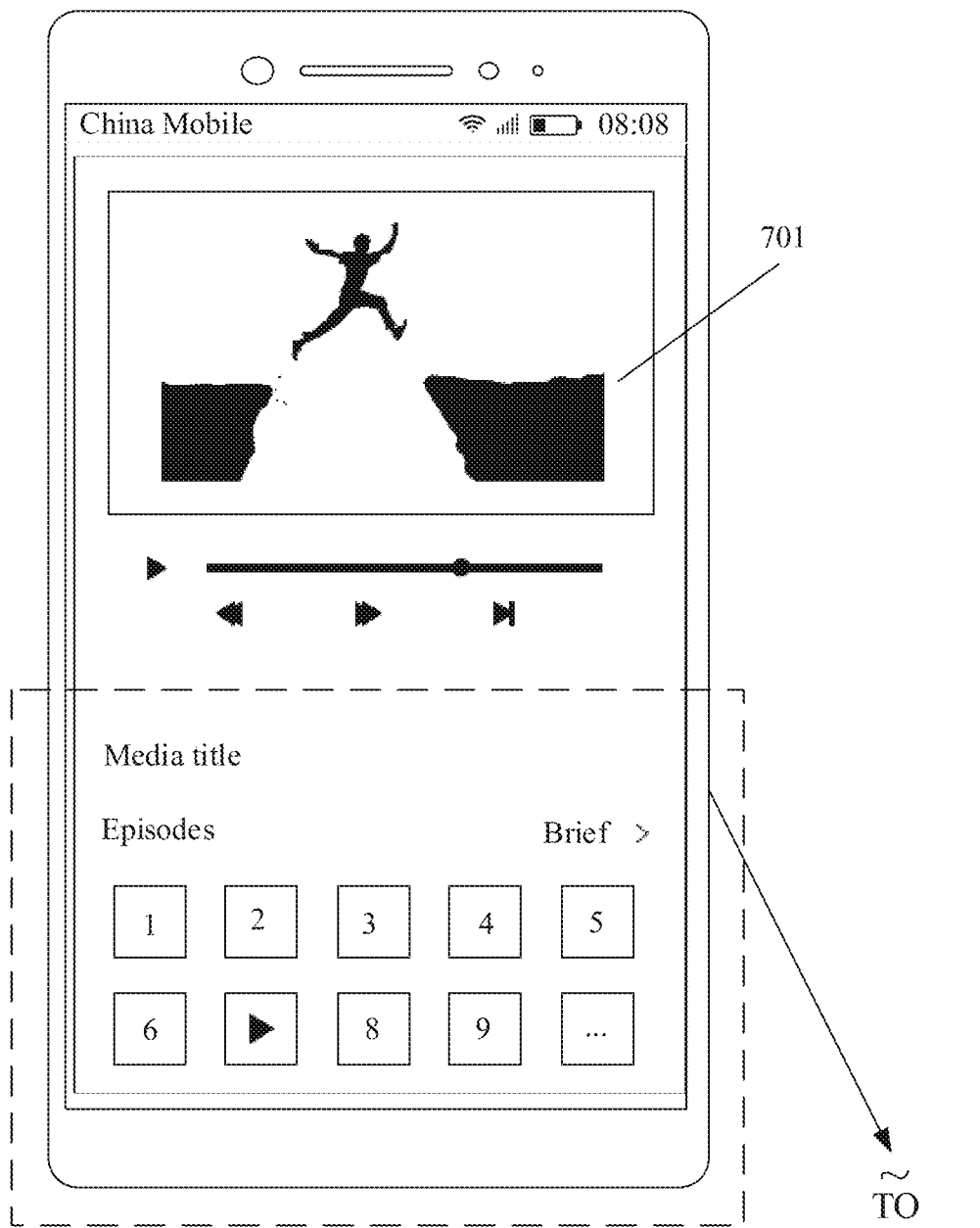
Figure 7B:
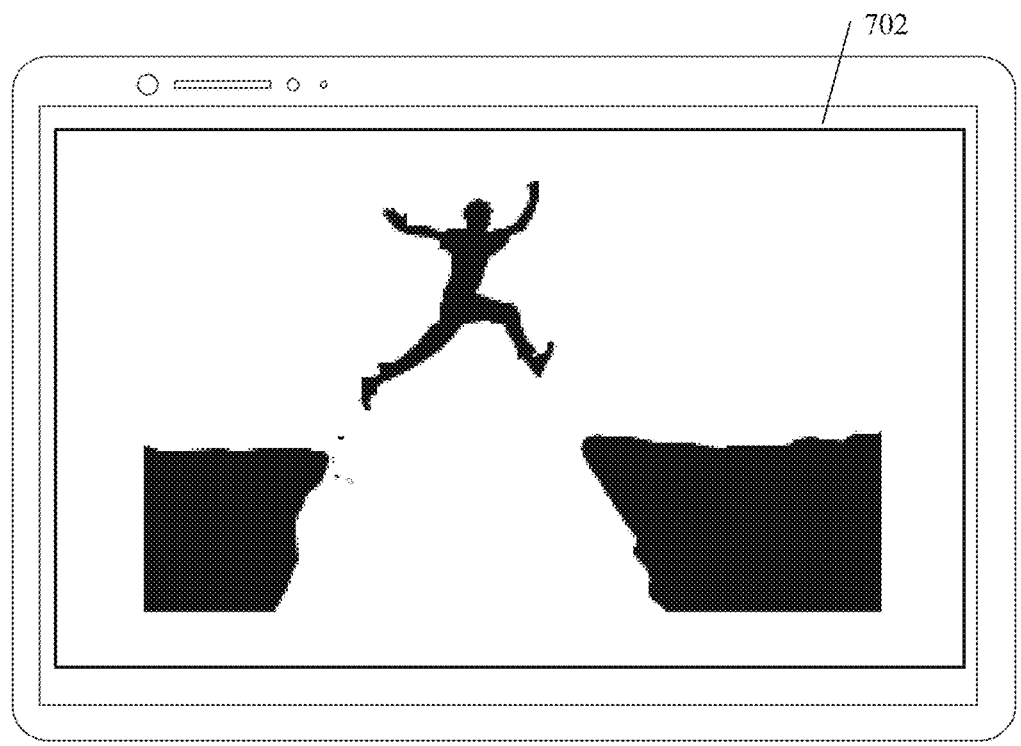
Figure 7B:
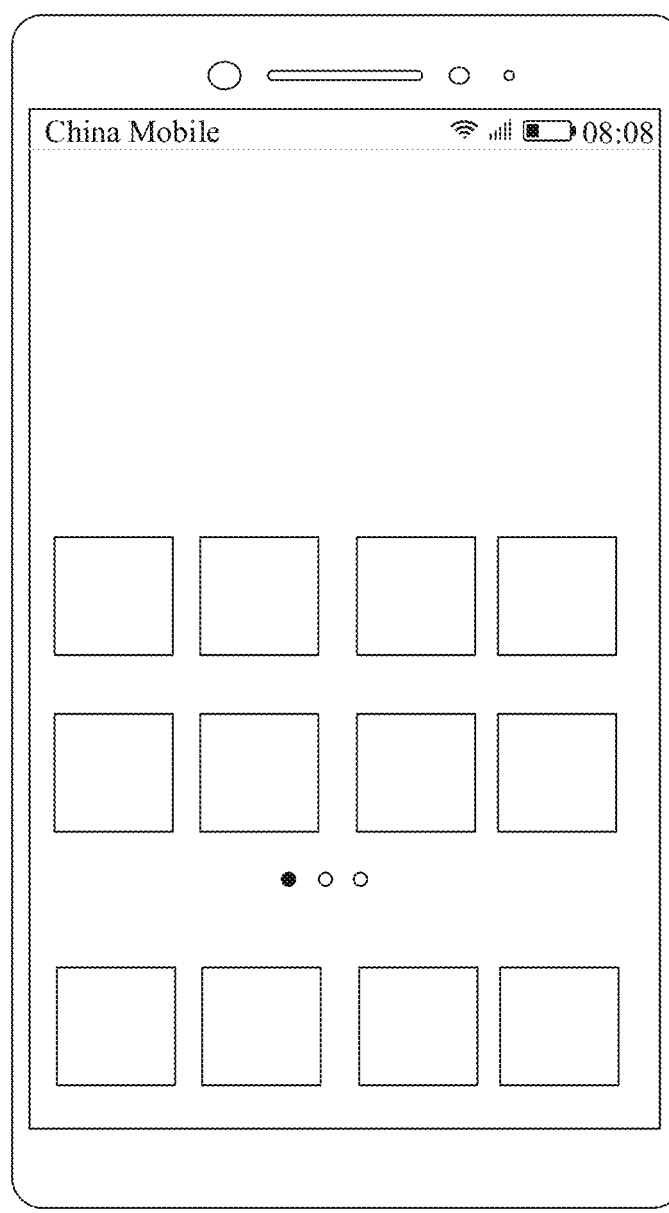
Figure 7B:
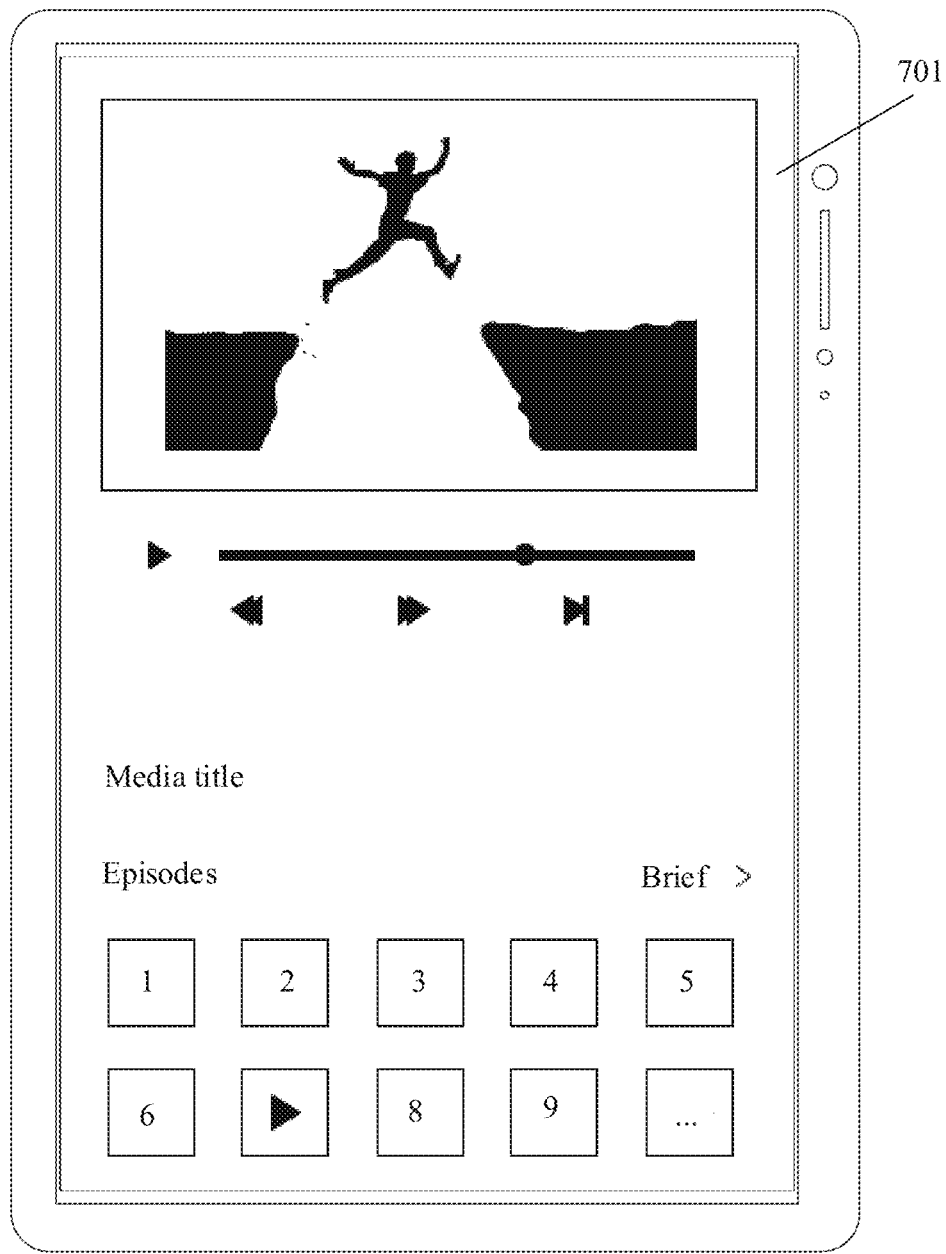

As shown in FIG. 7B(a), the mobile phone is in the portrait state and displays the interface 701. The mobile phone detects an operation of casting an application to the tablet computer, and sends, in response to the operation, the display information on the interface 702 to the tablet computer. As shown in FIG. 7B(b), the tablet computer displays the interface 702. After projecting the interface 702, the mobile phone displays the home screen, as shown in FIG. 7B(c). The interface 702 has less display information than the interface 701. For example, removed display information is the display information (MEDIA TITLE, Episode keys, and the like) in the dashed line area on the interface 701. It should be noted that, before sending the display information on the interface 702 to the tablet computer, the mobile phone determines that the current screen display direction of the tablet computer is the landscape direction. Therefore, the interface 701 needs to be adjusted. Because the interface 701 is not suitable for landscape display, the interface 701 is adjusted to be the interface 702. The interface 702 is sent to the tablet computer. As shown in FIG. 7B(b) and FIG. 7B(c), when the tablet computer is switched from the landscape mode to the portrait mode, the projected interface on the tablet computer changes from the interface 702 to the interface 701, and has more display information.

The following describes related devices in this application.

Figure 8:
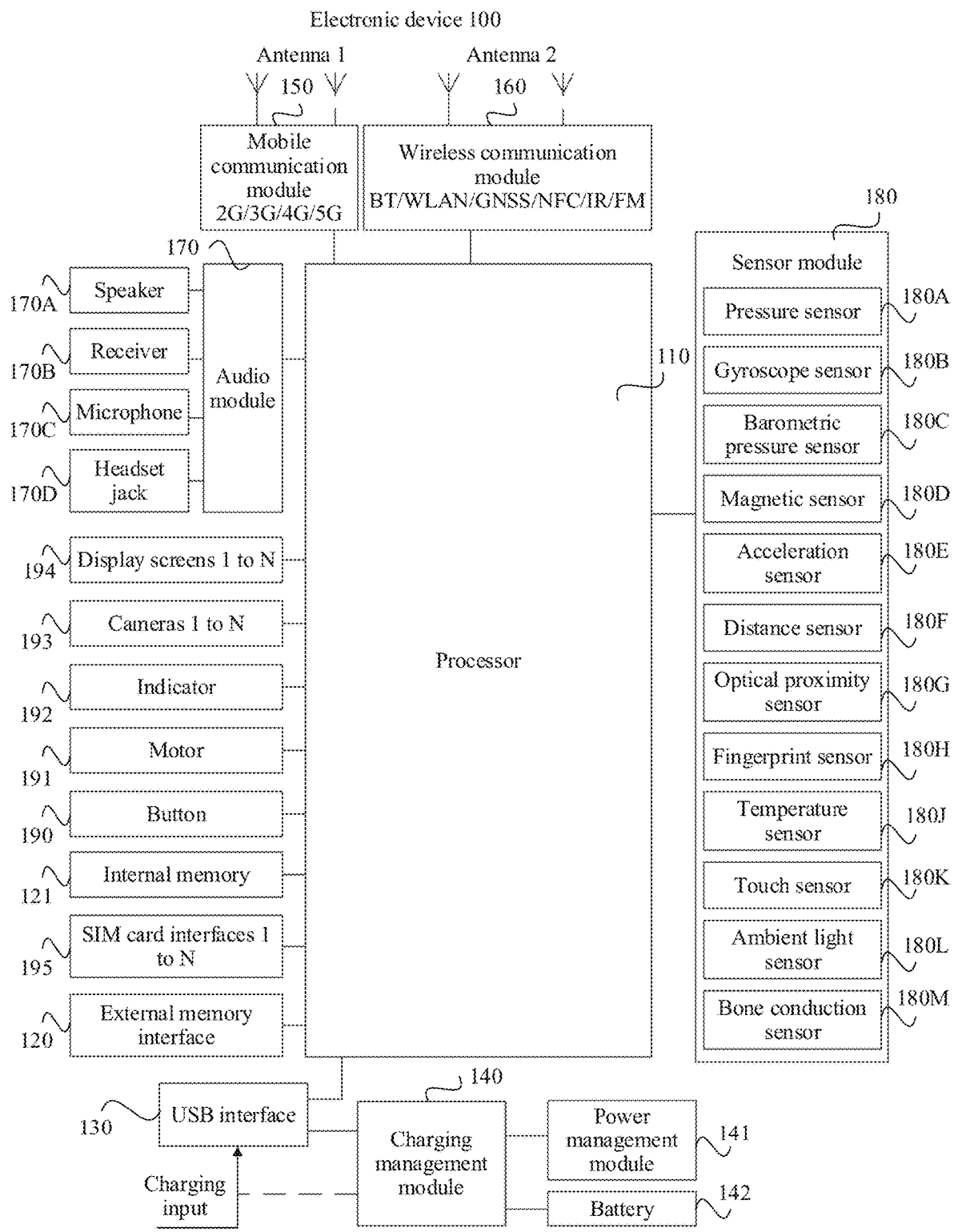
FIG. 8 is a schematic diagram of an electronic device according to an embodiment of this application.

FIG. 8 is a schematic diagram of a structure of an electronic device. The electronic device may be the foregoing receiver or transmitter. As shown in FIG. 8, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that complies with a USB standard specification, and may be specifically a Mini USB interface, a Micro USB interface, a USB Type C interface, or the like. The USB interface 130 may be configured to connect to a charger to charge the electronic device, or may be configured to transmit data between the electronic device and a peripheral device. The charging management module 140 is configured to receive charging input from a charger. The power management module 141 is configured to connect to the battery 142, the charging management module 140, and the processor 110. The power management module 141 receives input of the battery 142 and/or the charging management module 140, to supply power to the processor 110, the internal memory 121, an external memory, the display screen 194, the camera 193, the wireless communication module 160, and the like.

A wireless communication function of the electronic device may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna of the electronic device may be configured to cover one or more communication frequency bands. Different antennas may also be multiplexed to improve antenna utilization. For example, the antenna 1 may be multiplexed as a diversity antenna of a wireless local area network. In some other embodiments, the antennas may be used in conjunction with a tuning switch.

The mobile communication module 150 may provide a solution that includes wireless communication such as 2G/3G/4G/5G and that is applied to the electronic device. The mobile communication module 150 may include at least a filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device. The wireless communication module 160 may be one or more components that integrate at least one communication processing module. The wireless communication module 160 receives the electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into the electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a beidou navigation satellite system (BeiDou navigation satellite system, BDS), a quasi-zenith satellite system (quasi-zenith satellite system, QZSS) and/or a satellite based augmentation system (satellite based augmentation systems, SBAS).

The display screen 194 is configured to display a display interface of an application, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light-emitting diodes, QLED), or the like. In some embodiments, the electronic device may include one or N display screens 194, where N is a positive integer greater than 1.

The electronic device 100 may implement a photographing function through the ISP, the camera 193, the video codec, the GPU, the display screen 194, the application processor, or the like.

The ISP is configured to process data fed back by the camera 193. For example, during photographing, a shutter is pressed, light is transmitted to a camera photosensitive element through a lens, an optical signal is converted into an electrical signal, and the camera photosensitive element transmits the electrical signal to an ISP for processing, to convert the electrical signal into an image visible to naked eyes. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The internal memory 121 may be configured to store computer-executable program code, and the executable program code includes instructions. The processor 110 runs the instructions stored in the internal memory 121, to perform various function applications and data processing of the electronic device. The internal memory 121 may include a program storage area and a data storage area. The program storage area may store an operating system, software code of at least one application (for example, iQIYI or WeChat), and the like. The data storage area may store data (for example, an image or a video) generated in a process of using the electronic device, and the like. In addition, the internal memory 121 may include a high-speed random access memory, and may further include a nonvolatile memory, for example, at least one magnetic disk storage device, a flash storage device, or a universal flash storage (universal flash storage, UFS).

The external memory interface 120 may be configured to connect to an external storage card, for example, a micro SD card, to extend a storage capability of the electronic device. The external memory card communicates with the processor 110 through the external memory interface 120, to implement a data storage function. For example, files such as pictures or videos are stored in the external storage card.

The electronic device may implement audio functions by using the audio module 170, the speaker 170A, the receiver 170B, the microphone 170C, the headset jack 170D, the application processor, and the like. For example, music playing and recording may be implemented.

The pressure sensor 180A is configured to sense a pressure signal, and can convert the pressure signal into an electrical signal. In some embodiments, the pressure sensor 180A may be disposed on the display screen 194. The gyro sensor 180B may be configured to determine a motion posture of the electronic device. In some embodiments, an angular velocity of the electronic device around three axes (that is, axes x, y, and z) may be determined through the gyroscope sensor 180B.

The gyroscope sensor 180B may be configured to implement image stabilization during photographing. The barometric pressure sensor 180C is configured to measure barometric pressure. In some embodiments, the electronic device calculates an altitude based on a value of the barometric pressure measured by the barometric pressure sensor 180C, to assist in positioning and navigation. The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover by using the magnetic sensor 180D, and further set, based on a detected opening or closing state of the flip cover, a feature such as automatic unlocking of the flip cover. The acceleration sensor 180E may detect magnitudes of accelerations of the electronic device in all directions (usually on three axes), and may detect magnitude and a direction of gravity when the electronic device is static. The acceleration sensor 180E may be further configured to identify a posture of the electronic device, and be used in screen switching between a landscape mode and a portrait mode, and an application such as a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing. The optical proximity sensor 180G may include, for example, a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode. When detecting plenty of reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display screen 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, to avoid an unintentional touch. The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to measure temperature. In some embodiments, the electronic device executes a temperature processing policy by using the temperature measured by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display screen 194, and a touchscreen, also referred to as a "touchscreen", is formed by the touch sensor 180K and the display screen 194. The touch sensor 180K is configured to detect a touch operation performed on or near the touch sensor 180K. The touch sensor may transfer the detected touch operation to the application processor, to determine a touch event type. A visual output related to the touch operation may be provided through the display screen 194. In some other embodiments, the touch sensor 180K may alternatively be disposed on a surface of the electronic device, and be located at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The electronic device may receive button input, and generate button signal input related to user settings and function control of the electronic device. The motor 191 may generate a vibration prompt. The motor 191 may be configured to provide an incoming call vibration prompt, or may be configured to provide a touch vibration feedback. For example, touch operations performed on different applications (for example, photographing and audio playing) may correspond to different vibration feedback effects. The indicator 192 may be an indicator light, may be configured to indicate a charging status and a battery level change, and may also be configured to indicate a message, a missed call, a notification, and the like. The SIM card interface 195 is configured to connect to a SIM card. The SIM card may be inserted into the SIM card interface 195 or removed from the SIM card interface 195, to implement contact with and separation from the electronic device.

It may be understood that components shown in FIG. 8 do not constitute a specific limitation on the electronic device. The electronic device in this embodiment of the present invention may include more or fewer components than those in FIG. 8. In addition, a combination/connection relationship between the components in FIG. 8 may also be adjusted and modified.

The following describes technical solutions according to embodiments of this application with reference to the accompanying drawings.

Embodiment 1

An objective of Embodiment 1 is to describe implementation principles of the foregoing four application scenarios. That the implementation principles of the foregoing four application scenarios are the same is considered. For brevity of this specification, the implementation principles of the application scenarios are not described in detail one by one. This specification mainly describes the implementation principles of the first and second application scenarios. For the implementation principles of the third and fourth application scenarios, refer to the implementation principles of the first and second application scenarios.

For example, as shown in FIG. 9A(a), a laptop computer displays a first interface of a first application. The first interface includes display information A1 and display information A2. The first application may be any application. This is not limited. For example, the first application is a browser application, and the first interface may be the interface 401 of the browser application in the first application scenario (that is, in FIG. 6A(a) to FIG. 6A(e)). In this case, the display information A1 includes the text information (for example, HUAWEI), and the display information A2 includes the image of the mobile phone. In addition, the display information A1 and the display information A2 are displayed in tiles in a horizontal direction. For example, the display information A1 is on the left of the display information A2. As shown in FIG. 9A(b), a tablet computer is in a landscape mode and displays a desktop. The laptop computer establishes, in response to an operation of connecting to the tablet computer, a connection to the tablet computer. The connection may be a wired or wireless connection. The laptop computer may recognize whether a current screen display direction of the tablet computer is a landscape direction or a portrait direction. For example, after the tablet computer is connected to the laptop computer, the tablet computer may actively report the current screen display direction of the tablet computer to the laptop computer. Alternatively, the laptop computer sends, to the tablet computer, a request for the current screen display direction of the tablet computer, and the tablet computer returns, in response to the request, the current screen display direction.

When the laptop computer detects an operation of casting an application to the tablet computer, (for example, a hold and drag operation on the first interface), the first interface of the first application is moved out of a display screen of the laptop computer in response to the operation, as shown in FIG. 9A(c). At the same time, the first interface of the first application appears on a display screen of the tablet computer, as shown in FIG. 9A(d). When it is detected that the hold and drag operation ends, the first interface of the first application is transferred to the tablet computer for display, as shown in FIG. 9A(f). The laptop computer displays an interface of a second application, as shown in FIG. 9A(e). It should be noted that, when displaying the first interface, the laptop computer sends, in response to the screen projection operation, the first interface to the tablet computer. Before the foregoing step, the laptop computer determines that the tablet computer is in a landscape state, and the first interface is suitable for landscape display. Therefore, the first interface is sent to the tablet computer. In FIG. 9A(a) to FIG. 9A(h), the example in which the application casting operation is the hold and drag operation on the first interface is used. It may be understood that the application casting operation may alternatively be another type of operation. Examples are not described one by one in this application.

Still refer to FIG. 9A(f). When the tablet computer displays the projected first interface, the screen may rotate, for example, be switched from the landscape mode to the portrait mode. When the tablet computer is switched from the landscape mode to the portrait mode, there are two display manners.

First Manner

As shown in FIG. 9A(g), when the tablet computer is switched from the landscape mode to the portrait mode, the projected interface on the tablet computer changes from the first interface of the first application to a third interface of the first application. The third interface has more display information than the first interface. The third interface includes the display information A1 and the display information A2, and further includes display information B. The display information A1 and the display information A2 are display information on the first interface. Therefore, it may be understood that the third interface includes all display information on the first interface, and further includes display information on another interface. The another interface may be display information on a previous interface of the first interface or a following interface of the first interface, or display information on a default interface, or a user-specified interface. For example, if the foregoing FIG. 6A(a) to FIG. 6A(e) are used as an example, the first interface is the interface 401, and the third interface is the interface 501. The display information B is an addition to the interface 501 compared with that on the interface 401, that is, the display information on the interface 501 in the dashed line area, in other words, the display information on the following interface (the interface 403 in FIG. 4(b)) of the first interface (the interface 401).

Second Manner

As shown in FIG. 9A(h), when the tablet computer is switched from the landscape mode to the portrait mode, the projected interface on the tablet computer changes from the first interface of the first application to a fourth interface of the first application. A layout of the display information on the fourth interface is different from that of the first interface. On the first interface, the display information A1 and the display information A2 are displayed in tiles in a horizontal direction. On the fourth interface, the display information A1 and the display information A2 are displayed in tiles in a vertical direction. For example, the display information A1 is located above the display information A2. For example, if the foregoing FIG. 6A(a) to FIG. 6A(e) are used as an example, the first interface is the interface 401, and the fourth interface is the interface 502. The layout of the display information on the interface 502 is different from that of the interface 401.

FIG. 9B(a) to FIG. 9B(d) are a background processing procedure corresponding to FIG. 9A(a) to FIG. 9A(h).

As shown in FIG. 9B(a), a primary device (that is, the laptop computer in FIG. 9A(a) to FIG. 9A(h)) includes a local display monitor. The local display monitor is in the landscape mode. The local display monitor displays the first interface of the first application, corresponding to FIG. 9A(a). As shown in FIG. 9B(b), the laptop computer creates a first virtual display (virtual display, VD). The first VD is configured to project display information on the first VD to a target device (that is, the tablet computer in FIG. 9A(a) to FIG. 9A(h)) for display. In other words, the projected information displayed on the target device is the display information on the first VD. A display parameter of the first VD matches a display parameter of the target device (that is, the tablet computer). For example, a screen display direction of the first VD is consistent with a current screen display direction of the target device, and/or an aspect ratio of the first VD is equal to an aspect ratio of the target device. It is assumed that when the primary device determines that the current screen display direction of the target device is the landscape direction, the first VD is in the landscape mode. In this case, both the local display monitor and the first VD are in the landscape mode, as shown in FIG. 9B(b). As may be understood, that the primary device creates a first VD may include: The first VD is created when it is detected that the primary device is connected to the target device, the first VD is created when it is detected that the primary device casts an application to the target device, or the first VD may exist by default (for example, the first VD is set by default after delivery). This is not limited in this embodiment of this application.

The primary device transfers, in response to the operation of casting the application to the target device, the first application from the local display monitor to the first VD for running. It may be understood that the first application is originally displayed on the local display monitor, and is transferred to the first VD for display. As shown in FIG. 9B(b), the first interface of the first application is originally displayed on the local display monitor. When the first application is transferred to the first VD, the first interface is still displayed. Both the first VD and the local display monitor are in the landscape mode, and the first interface adapts to landscape display. Therefore, when the first application is transferred to the first VD, the first interface does not need to be adjusted. Then, the first VD sends the first interface to the target device, and the target device displays the first interface. Still refer to FIG. 9B(b). After the first application is transferred from the local display monitor to the first VD, the interface of the second application is displayed on the local display monitor.

After the first interface on the first VD is projected to the target device, a screen of the target device may rotate, for example, be switched from the landscape mode to the portrait mode. As shown in FIG. 9B(a), when the target device is switched from the landscape mode to the portrait mode, the target device sends a screen rotation instruction to the primary device, where the instruction indicates that the target device is switched to the portrait mode.

First Manner

As shown in FIG. 9B(c), the primary device adjusts, according to the instruction, a screen display direction of the first VD to be the portrait direction. When the first VD is adjusted to be in the portrait mode for display, the first application adjusts the first interface to the third interface. For example, the third interface has more display information than the first interface. In other words, display information B is added, to adapt to portrait display on the first VD. The first VD sends the third interface to the target device, and the target device displays the third interface.

Second Manner

As shown in FIG. 9B(d), the primary device adjusts, according to the instruction, a screen display direction of the first VD to be the portrait direction. When the first VD is adjusted to be in the portrait mode for display, the first application adjusts the first interface to the fourth interface. For example, the layout of the display information on the fourth interface is different from that of the first interface. For example, on the first interface, the display information A1 and the display information A2 are displayed in tiles in a horizontal direction. On the fourth interface, the display information A1 and the display information A2 are displayed in tiles in a vertical direction, to adapt to portrait display on the first VD. The first VD sends the fourth interface to the target device.

It should be noted that, FIG. 9A(a) to FIG. 9A(h) and FIG. 9B(a) to FIG. 9B(d) are applicable to the foregoing first application scenario, corresponding to the case 1, in other words, the transmitter is in the landscape mode, and the receiver is in the landscape mode. It may be understood that, for the third application scenario, (corresponding to the case 3, in other words, the transmitter is in the portrait mode, and the receiver is in the portrait mode), the same principle is used. Therefore, for brevity, details are not described herein again.

For example, as shown in FIG. 10A(a), a laptop computer displays a first interface of a first application. The first interface includes display information A. The first application may be any application. This is not limited. For example, the first application is a browser application, and the first interface may be the interface 401 of the browser application in the second application scenario, that is, in FIG. 6A(a) to FIG. 6A(e). In this case, the display information A includes the text information (for example, HUAWEI), and the image of the mobile phone on the interface 401. As shown in FIG. 10A(b), a tablet computer is in a portrait state and displays a desktop. The laptop computer is connected to the tablet computer. The laptop computer determines that a current screen display direction of the tablet computer is a landscape direction or a portrait direction. When the laptop computer detects an operation of casting an application to the tablet computer, (for example, a hold and drag operation on the first interface), the interface of the first application is moved out of a display screen of the laptop computer in response to the operation, as shown in FIG. 10A(c). At the same time, the interface of the first application appears on a display screen of the tablet computer, as shown in FIG. 10A(d). When it is detected that the hold and drag operation ends, the laptop computer displays an interface of a second application, as shown in FIG. 10A(e), and the tablet computer displays a second interface of the first application, as shown in FIG. 10A(f). The second interface is different from the first interface. The second interface has more display information than the first interface. For example, display information B is an addition to the second interface compared with that on the first interface. The display information A is on the first interface. Therefore, it may be understood that the second interface includes all display information on the first interface, and further includes display information on another interface. The another interface may be a following interface of the first interface, a previous interface of the first interface, a default interface of the first application, or a user-specified interface. For example, if the foregoing FIG. 6B(a) to FIG. 6B(e) are used as an example, the first interface is the interface 401, and the second interface is the interface 501. The display information in the dashed line area is an addition to the interface 501 compared with that on the interface 401. This display information is the display information on the following interface (the interface 403 in FIG. 4(b)) of the interface 401. It should be noted that, in FIG. 10A(a) to FIG. 10A(h), the laptop computer sends, in response to the operation of projecting the screen to the tablet computer, the display information on the second interface to the tablet computer. The laptop computer determines that the tablet computer is currently in the portrait mode, and the first interface is not suitable for portrait display. Therefore, the laptop computer sends the second interface to the tablet computer, to adapt to portrait display on the tablet computer.

Still refer to FIG. 10A(f). When the tablet computer displays the projected second interface, the screen may rotate, for example, be switched from the portrait mode to the landscape mode.

First Manner

As shown in FIG. 10A(f) and FIG. 10A(g), when the tablet computer is switched from the portrait mode to the landscape mode, the projected interface on the tablet computer changes from the second interface of the first application to a third interface of the first application. The third interface includes the display information A, and has less display information than the second interface. For example, if the foregoing FIG. 6B(a) to FIG. 6B(e) is used as an example, the second interface is the interface 501, and the third interface is the interface 401. The interface 401 has less display information than the interface 501.

Second Manner

As shown in FIG. 10A(f) and FIG. 10A(h), when the tablet computer is switched from the portrait mode to the landscape mode, the projected interface on the tablet computer changes from the second interface of the first application to a fourth interface of the first application. A layout manner of the display information on the fourth interface is different from that of the second interface. On the second interface, the display information A and the display information B are displayed in tiles in a vertical direction. On the fourth interface, the display information A and the display information B are displayed in tiles in a horizontal direction. For example, the display information A is on the left, and the display information B is on the right. For example, if the foregoing FIG. 6B(a) to FIG. 6B(e) is used as an example, the fourth interface is the interface 505, and the second interface is the interface 501. The layout of the display information on the interface 505 is different from that of the interface 501.

FIG. 10B(a) to FIG. 10B(d) are a background processing procedure corresponding to FIG. 10A(a) to FIG. 10A(h).

As shown in FIG. 10B(a), a primary device (that is, the laptop computer in FIG. 10A(a) to FIG. 10A(h)) includes a local display monitor. The local display monitor is in the landscape mode. The local display monitor displays the first interface of the first application. The first interface includes the display information A, corresponding to FIG. 10A(a). The laptop computer creates a first VD, as shown in FIG. 10B(b). The first VD is configured to project display information on the first VD to a target device (that is, the tablet computer in FIG. 10A(a) to FIG. 10A(h)) for display. A display parameter of the first VD matches a display parameter of the target device (that is, the tablet computer). For example, a screen display direction of the first VD is consistent with a current screen display direction of the target device, and/or an aspect ratio of the first VD is equal to an aspect ratio of the target device. It is assumed that when the primary device determines that the current screen display direction of the target device is the portrait direction, the first VD is in the portrait mode. In this case, the local display monitor is in the landscape mode, and the first VD is in the portrait mode, as shown in FIG. 10B(b).

The primary device transfers, in response to the operation of casting the application to the target device, the first application to the first VD for running. It may be understood that the first application is originally displayed on the local display monitor, and is transferred to the first VD for display.

As shown in FIG. 10B(b), the first interface of the first application is originally displayed on the local display monitor. The first interface includes the display information A, to adapt to a landscape state of the local display monitor. When the first application is transferred to the first VD, because the first VD is in the portrait mode, the first application displays the second interface on the first VD. The second interface includes the display information A and the display information B, and the display information A and the display information B are arranged in tiles in a vertical direction, to adapt to a portrait state of the first VD. In other words, the local display monitor is in the landscape mode, and the first VD is in the portrait mode. The first interface of the first application originally displayed on the local display monitor adapts to landscape display instead of portrait display. Therefore, when the first application is transferred to the first VD, the first interface is adjusted to be the second interface. The second interface adapts to portrait display on the first VD. The first VD sends the second interface to the target device. After the first application is transferred from the local display monitor to the first VD, the interface of the second application is displayed on the local display monitor.

After the second interface on the first VD is projected to the target device, a screen of the target device may rotate, for example, be switched from the portrait mode to the landscape mode. As shown in FIG. 10B(b), when the target device is switched from the portrait mode to the landscape mode, the target device sends a screen rotation instruction to the primary device, where the instruction indicates that the target device is switched to the landscape mode.

First Manner

As shown in FIG. 10B(c), the primary device adjusts, according to the instruction, a screen display direction of the first VD to be the landscape direction. When the first VD is adjusted to be in the landscape mode for display, the first application adjusts the second interface to the third interface, to adapt to landscape display on the first VD. The third interface has less display information than the second interface. The first VD sends the third interface to the target device.

Second Manner

As shown in FIG. 10B(c), the primary device adjusts, according to the instruction, a screen display direction of the first VD to be the landscape direction. When the first VD is adjusted to be in the landscape mode for display, the first application adjusts the second interface to the fourth interface. A layout of the display information on the fourth interface is different from that of the second interface. On the second interface, the display information A and the display information B are displayed in tiles in a vertical direction. On the fourth interface, the display information A and the display information B are displayed in tiles in a horizontal direction, to adapt to landscape display on the first VD. The first VD sends the fourth interface to the target device.

FIG. 10A(a) to FIG. 10A(h) and FIG. 10B(a) to FIG. 10B(d) are applicable to the foregoing second application scenario, corresponding to the case 2, in other words, the transmitter is in the landscape mode, and the receiver is in the portrait mode. It may be understood that, for the fourth application scenario, (corresponding to the case 4, in other words, the transmitter is in the portrait mode, and the receiver is in the landscape mode), the same principle is used. Therefore, for brevity, details are not described herein again.

Figure 11:
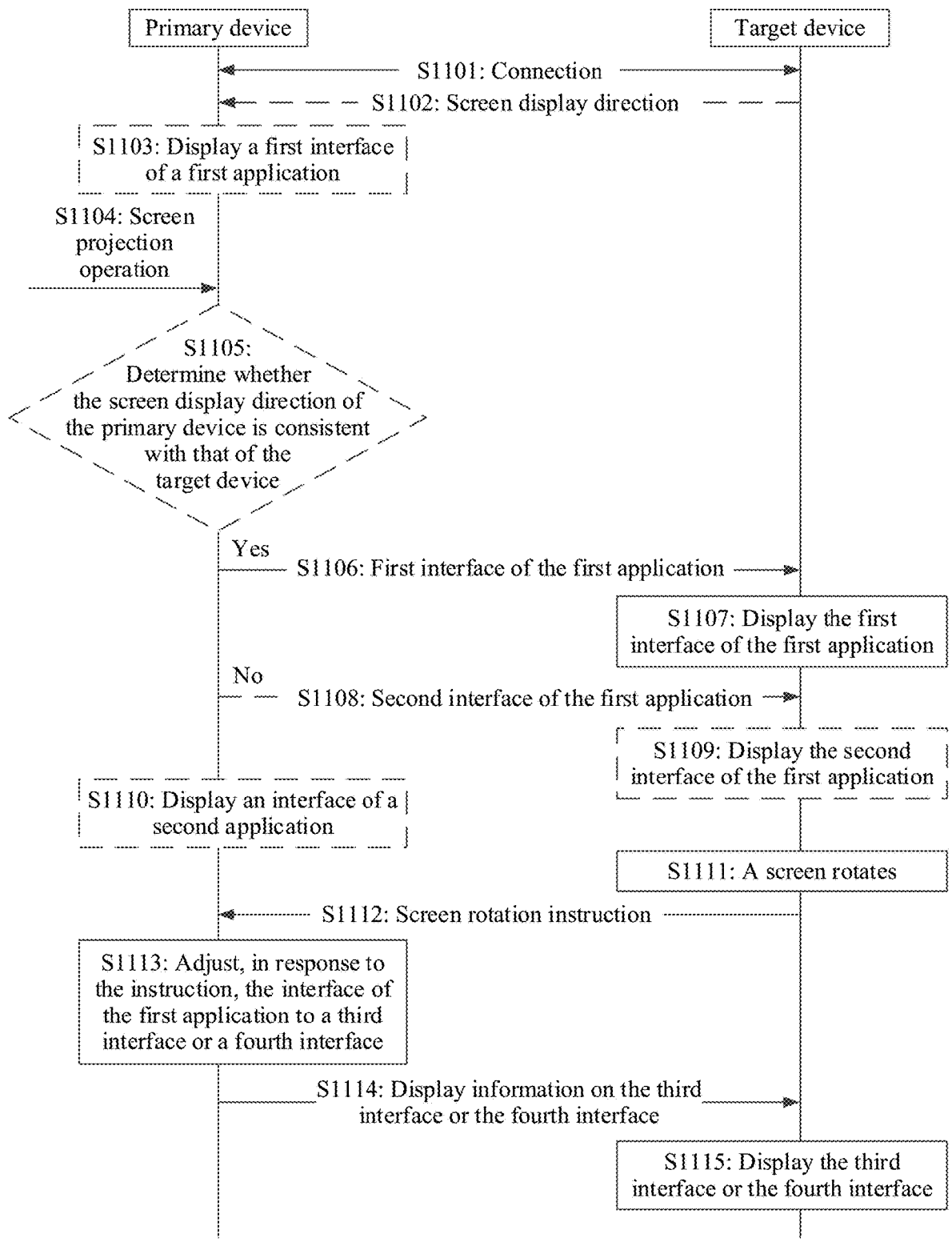
FIG. 11, FIG. 12A, and FIG. 12B are schematic flowcharts of a screen projection method according to an embodiment of this application.

FIG. 11 is a schematic flowchart of a display method according to an embodiment of this application. As shown in FIG. 11, the procedure includes the following steps.

S1101: A primary device is connected to a target device.

There are a plurality of manners for connecting the primary device to the target device, including a wired connection and a wireless connection, for example, connection manners such as Bluetooth, wireless fidelity (wireless fidelity, Wi-Fi), or near field communication (near field communication, NFC).

S1102: The target device sends a screen display direction to the primary device.

In some embodiments, the target device may actively send the screen display direction to the primary device. For example, after detecting that the target device is connected to the primary device, the target device automatically sends the screen display direction to the primary device. It may be understood that before the foregoing step, the target device may detect the screen display direction of the target device. There are a plurality of specific detection manners. For example, a motion sensor (for example, a gyroscope) is used to collect sensor data to detect the screen display direction. This is not limited in this embodiment of this application.

In some other embodiments, after receiving a request sent by the primary device for the screen display direction, the target device sends the screen display direction to the primary device. In other words, after detecting that the target device is connected to the primary device, the target device does not send the screen display direction of the target device to the primary device immediately, and sends the screen display direction to the primary device after receiving the request from the primary device.

For example, that the target device sends a screen display direction to the primary device may include: The target device sends an instruction to the primary device, where the instruction carries one piece of indication information. The indication information may occupy 1 bit. For example, when the indication information is 1, this indicates that the screen display direction is the landscape direction, and when the indication information is o, this indicates that the screen display direction is the portrait direction.

For example, the target device may send the screen display direction to the primary device in various manners. For example, if the primary device is connected to the target device in a wired manner, the screen display direction is sent in a wired manner. If the primary device is connected to the target device in a wireless mode, the screen display direction is sent in a wireless mode, for example, is sent in a wireless mode such as Bluetooth, Wi-Fi, or NFC.

Optionally, S1102 may not be performed. Therefore, S1102 is represented by using a dashed line in the figure.

S1103: The primary device displays a first interface of a first application.

In some embodiments, S1103 may or may not be performed. Therefore, S1103 is represented by using a dashed line in the figure. For example, the primary device currently displays a home screen, and the primary device may project, in response to an application casting operation, the first interface of the first application to the target device. In other words, the interface projected by the primary device may be an interface currently displayed on the primary device, or may not be the interface currently displayed on the primary device.

It should be noted that, an execution sequence of S1101 to S1103 is not limited in this application.

S1104: The primary device receives an operation of projecting a screen to the target device.

For example, the operation of projecting the screen to the target device may be a drag operation on the first interface. The drag operation may be an operation of moving the first interface from a display screen of the primary device to a display screen of the target device (refer to FIG. 9A(a) to FIG. 9A(h)).

S1105: The primary device determines whether the screen display direction of the primary device is consistent with that of the target device. If the screen display directions are consistent, S1106 and S1107 are performed. If the screen display directions are inconsistent, S1108 and S1109 are performed.

S1106: The primary device sends the first interface of the first application to the target device.

S1107: The target device displays the first interface.

The first interface adapts to the screen display direction of the primary device. If the screen display direction of the primary device is consistent with that of the target device, the first interface also adapts to the screen display direction of the target device. Therefore, the primary device sends the first interface to the target device, without adjusting the first interface. For example, as shown in FIG. 9A(a) to FIG. 9A(h), both the laptop computer and the tablet computer are in the landscape mode (the screen display directions are consistent). When displaying the first interface, the laptop computer projects, in response to the screen projection operation, the first interface to the tablet computer.

S1108: The primary device sends a second interface of the first application to the target device.

S1109: The target device displays the second interface.

The first interface adapts to the screen display direction of the primary device, and the screen display direction of the primary device is inconsistent with that of the target device. Therefore, the first interface does not adapt to the screen display direction of the target device, and the primary device may adjust the first interface to the second interface, and send the second interface to the target device. For example, as shown in FIG. 10A(a) to FIG. 10A(h), the laptop computer is in the landscape mode, and the tablet computer is in the portrait mode (the screen display directions are inconsistent). When displaying the first interface, the laptop computer projects, in response to the screen projection operation, the second interface to the tablet computer.

S1110: The primary device displays an interface of a second application.

To be specific, after the primary device casts the first application to the target device, the interface of the second application is displayed on a foreground of the primary device, in other words, the first application is switched to a background of the primary device for running.

In some embodiments, S1110 is an optional step, and may or may not be performed. Therefore, S1110 is represented by using a dashed line in the figure. For example, after projecting the first interface of the first application, the primary device may still display the first interface of the first application. When detecting an operation of switching the first application to the background, the primary device displays the interface of the second application.

S1111: The target device detects a screen rotation operation. The screen rotation operation is used to switch the target device from the landscape mode to the portrait mode, or from the portrait mode to the landscape mode.

S1112: The target device sends a screen rotation instruction to the primary device.

For example, the screen rotation instruction indicates that the target device is switched from the landscape mode to the portrait mode, or from the portrait mode to the landscape mode. In some embodiments, that the target device sends a screen rotation instruction to the primary device may include: The target device sends an instruction to the primary device, where the instruction carries one piece of indication information. The indication information may occupy 1 bit. For example, when the target device is switched from the portrait mode to the landscape mode, the indication information is 1, indicating that a current screen display direction is the landscape direction (in other words, switching from the portrait mode to the landscape mode). When the target device is switched from the landscape mode to the portrait mode, the indication information is o, indicating that a current screen display direction is the portrait direction (in other words, switching from the landscape mode to the portrait mode).

For example, the target device may send the screen rotation instruction to the primary device in various manners. For example, if the primary device is connected to the target device in a wired manner, the screen rotation instruction is sent in a wired manner. If the primary device is connected to the target device in a wireless mode, the screen rotation instruction is sent in a wireless mode, for example, is sent in a wireless mode such as Bluetooth, Wi-Fi, or NFC.

S1113: The primary device adjusts, according to the screen rotation instruction, the interface of the first application to be a third interface or a fourth interface.

It may be understood that as shown in the figure, S1106 and S1107 are performed previously, in other words, the first application currently displays the first interface, and the first interface is adjusted to be the third interface or the fourth interface. For details, refer to FIG. 9A(a) to FIG. 9A(h). If S1108 and S1109 are performed previously, in other words, the first application currently displays the second interface, the second interface is adjusted to be the third interface or the fourth interface. For details, refer to FIG. 10A(a) to FIG. 10A(h).

S1114: The primary device sends display information on the third interface or the fourth interface to the target device.

S1115: The target device displays the third interface or the fourth interface.

For example, as shown in FIG. 9A(a) to FIG. 9A(h), when the target device is switched from the landscape mode to the portrait mode, the projected interface on the target device changes from the first interface to the third interface or the fourth interface, to adapt to portrait display on the target device. Alternatively, as shown in FIG. 10A(a) to FIG. 10A(h), when the target device is switched from the portrait mode to the landscape mode, the projected interface on the target device changes from the second interface to the third interface or the fourth interface, to adapt to landscape display on the target device.

It should be noted that, the optional steps in FIG. 11 are represented by using dashed lines. When none of the optional steps is performed, the display method according to this application includes: The primary device detects a screen projection operation (S1104), and sends, in response to the operation, display information on the first interface of the first application in the primary device to the target device (S1106). The target device displays the first interface (S1107). The target device detects a screen rotation operation (S1111). The target device sends a screen rotation instruction to the primary device (S1112). The primary device adjusts, in response to the instruction, the interface of the first application to be a third interface or a fourth interface (S1113). The primary device sends display information on the third interface or the fourth interface to the target device (S1114). The target device displays the third interface or the fourth interface (S1115).

Figure 12A:
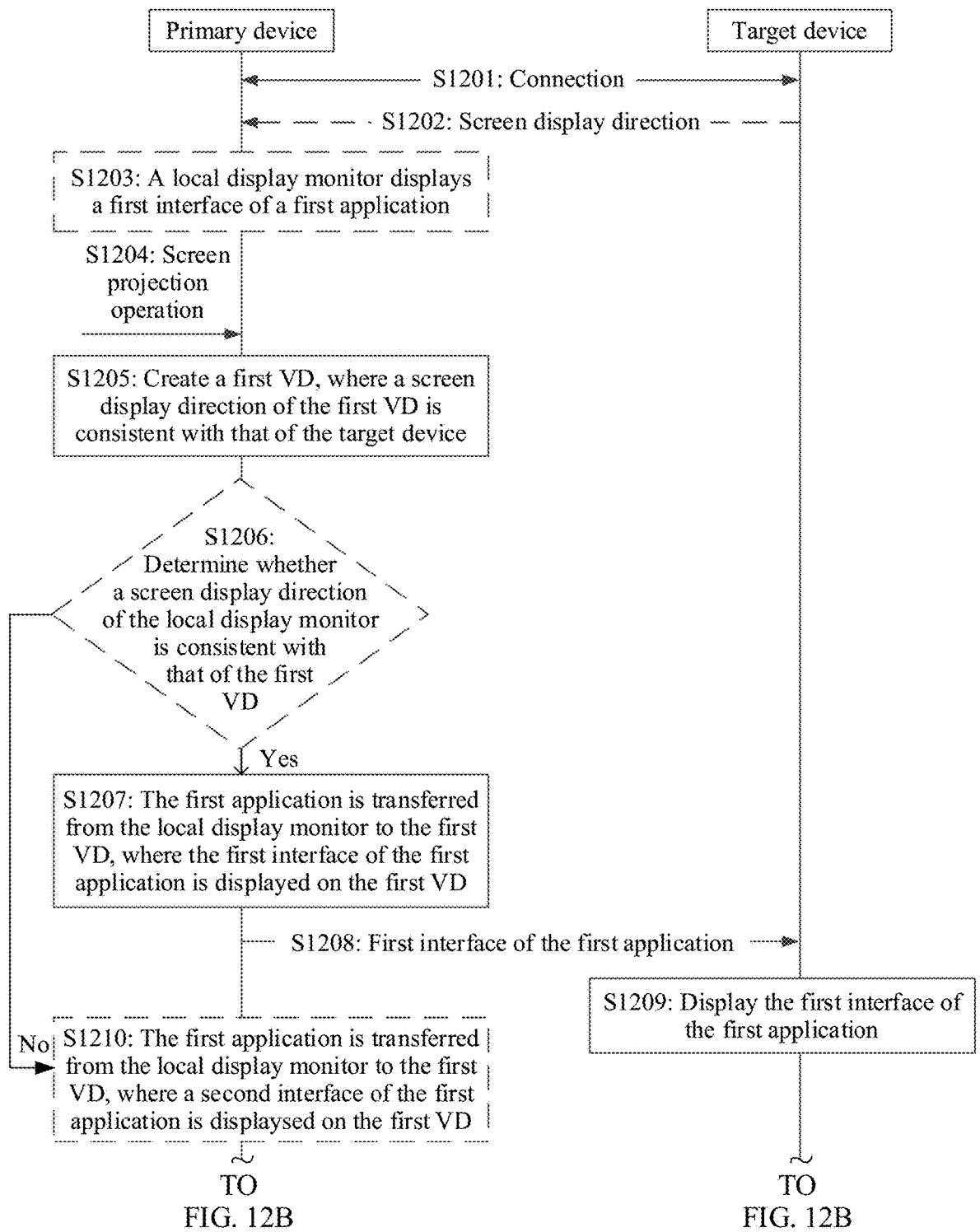
Figure 12B:
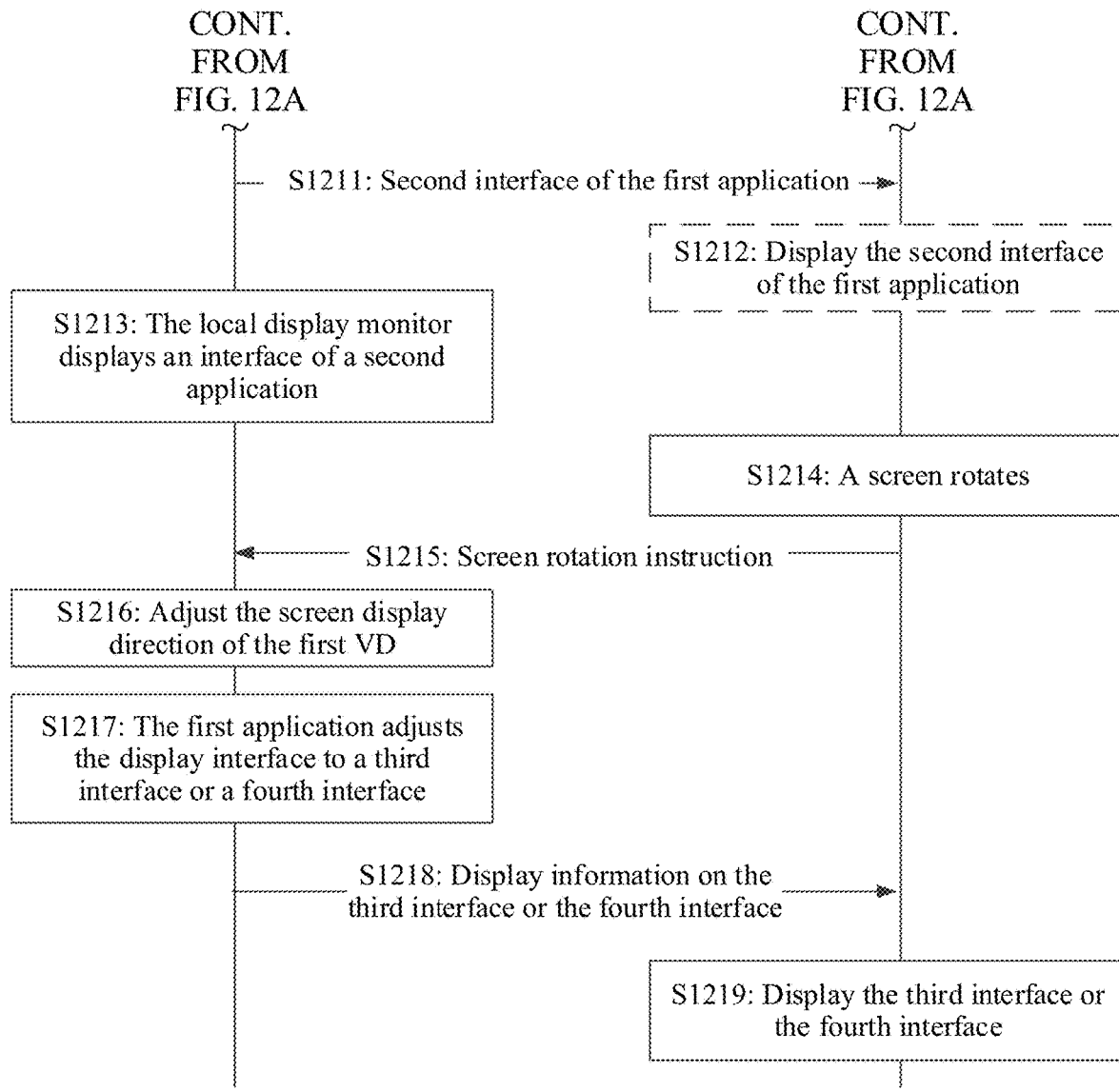

FIG. 12A and FIG. 12B are another schematic flowchart of a display method according to an embodiment of this application. The procedure shown in FIG. 12A and FIG. 12B may also be understood as a refinement of the procedure shown in FIG. 11. As shown in FIG. 12A and FIG. 12B, the procedure includes the following steps.

S1201: A primary device is connected to a target device.

S1202: The target device sends a screen display direction to the primary device.

S1203: A local display monitor of the primary device displays a first interface of a first application.

S1204: The primary device receives an operation of projecting a screen to the target device.

For implementation principles of S1201 to S1204, refer to the implementation principles of S1101 to S1104 in FIG. 11. Details are not described again.

S1205: The primary device creates a first VD, where a screen display direction of the first VD is consistent with a screen display direction of the target device.

For example, as shown in FIG. 9B(b), the target device is in the landscape mode, and the first VD created by the primary device is in the landscape mode. Alternatively, as shown in FIG. 10B(b), the target device is in the portrait mode, and the first VD created by the primary device is in the portrait mode.

S1206: The primary device determines whether a screen display direction of the local display monitor is consistent with that of the first VD. If the screen display directions are consistent, S1207 to S1209 are performed. If the screen display directions are inconsistent, S1210 to S1212 are performed.

S1207: The first application is transferred from the local display monitor to the first VD, where the first application displays the first interface on the first VD.

S1208: The first VD sends the first interface of the first application to the target device.

S1209: The target device displays the first interface.

The first interface adapts to the screen display direction of the local display monitor. If the screen display direction of the local display monitor is consistent with that of the first VD, the first interface also adapts to the screen display direction of the first VD. Therefore, when the first application is transferred to the first VD, the first interface is still displayed, and the first interface does not need to be adjusted. For example, as shown in FIG. 9B(b), when the first application is transferred from the local display monitor to the first VD, the first interface is displayed. The first VD projects the first interface to the target device for display. The screen display direction of the first VD is consistent with that of the target device. Therefore, the first interface projected by the first VD adapts to the screen display direction of the target device.

S1210: The first application is transferred from the local display monitor to the first VD, where the first application displays a second interface on the first VD.

S1211: The first VD sends a second interface of the first application to the target device.

S1212: The target device displays the second interface.

The first interface adapts to the screen display direction of the local display monitor. If the screen display direction of the local display monitor is inconsistent with that of the first VD, the first interface does not adapt to the screen display direction of the first VD. Therefore, when the first application is transferred to the first VD, the second interface is displayed, to adapt to the screen display direction of the first VD. For example, as shown in FIG. 10B(b), when the first application is transferred from the local display monitor to the first VD, the second interface is displayed. The first VD projects the second interface to the target device for display. The screen display direction of the first VD is consistent with that of the target device. Therefore, the second interface projected by the first VD adapts to the screen display direction of the target device.

S1213: The local display monitor of the primary device displays an interface of a second application.

In some embodiments, S1213 is an optional step, and may or may not be performed. Therefore, S1213 is represented by using a dashed line in the figure. For example, after the primary device projects the first interface of the first application, the local display monitor may still display the first interface of the first application. When detecting an operation of switching the first application to the background, the local display monitor displays the interface of the second application.

S1214: The target device detects screen rotation.

S1215: The target device sends a screen rotation instruction to the primary device.

For example, for implementation principles of S1214 and S1215, refer to the implementation principles of S1111 and S1112 in FIG. 11. Details are not described again.

S1216: The primary device adjusts, according to the screen rotation instruction, the screen display direction of the first VD.

S1217: The first application adjusts the display interface of the first application in the first VD to be a third interface or a fourth interface.

When the screen display direction of the first VD changes, the first application running in the first VD adaptively adjusts the display interface of the first application. For example, as shown in FIG. 9B(a) to FIG. 9B(d), when the first VD is switched from the portrait mode to the landscape mode, the interface of the first application in the first VD changes to the third interface or the fourth interface.

S1218: The first VD sends the third interface or the fourth interface to the target device.

S1219: The target device displays the third interface or the fourth interface.

It should be noted that, the optional steps in FIG. 12A and FIG. 12B are represented by using dashed lines. When none of the optional steps is performed, the display method according to this application includes: The primary device detects a screen projection operation (S1204). The primary device creates a first VD in response to the operation, where a screen display direction of the first VD is consistent with that of the target device (S1205). The primary device transfers the first application to the first VD for running, and the first application displays the first interface on the first VD (S1207). The first VD sends display information on the first interface to the target device (S1208). The target device displays the first interface (S1209). The target device detects a screen rotation operation (S1214). The target device sends a screen rotation instruction to the primary device (S1215). The primary device adjusts, in response to the instruction, the screen display direction of the first VD to be consistent with a screen display direction of the target device after the target device is rotated (S1216). The first application adjusts, in response to the adjustment for the screen display direction of the first VD, the display interface of the first application to be a third interface or a fourth interface (S1217). The first VD sends display information on the third interface or the fourth interface to the target device (S1218). The target device displays the third interface or the fourth interface (S1219).

Embodiment 2

In Embodiment 2, screen mirroring is used as an example. The following describes an application scenario of screen mirroring.

That a transmitter may be in a landscape mode or a portrait mode, and a receiver may also be in a landscape mode or a portrait mode is considered. There are a plurality of cases in screen mirroring. 1. The transmitter is in the landscape mode, and the receiver is in the landscape mode. 2. The transmitter is in the landscape mode, and the receiver is in the portrait mode. 3. The transmitter is in the portrait mode, and the receiver is in the portrait mode. 4. The transmitter is in the portrait mode, and the receiver is in the landscape mode. Therefore, the following includes four application scenarios, which respectively correspond to the foregoing four cases.

First Application Scenario

This application scenario corresponds to the case 1. The transmitter is in the landscape mode, and the receiver is in the landscape mode.

Figure 13A:
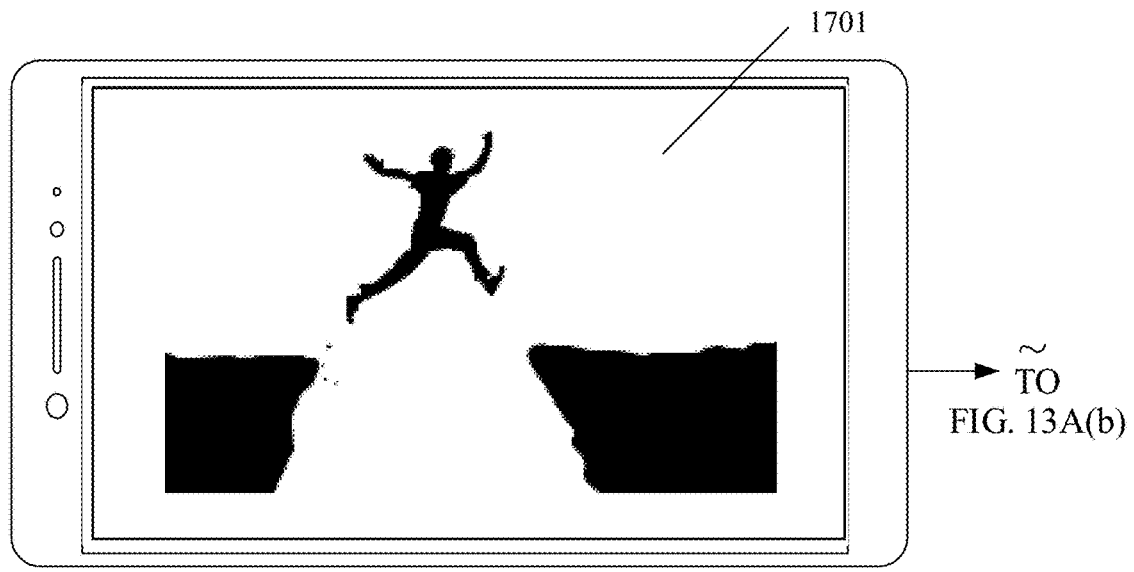
FIG. 13A(a) to FIG. 13A(d), FIG. 13B(a) to FIG. 13B(e), FIG. 13C(a) to FIG. 13C(d), and FIG. 13D(a) to FIG. 13D(e) are schematic diagrams of application scenarios according to an embodiment of this application.
Figure 13A:
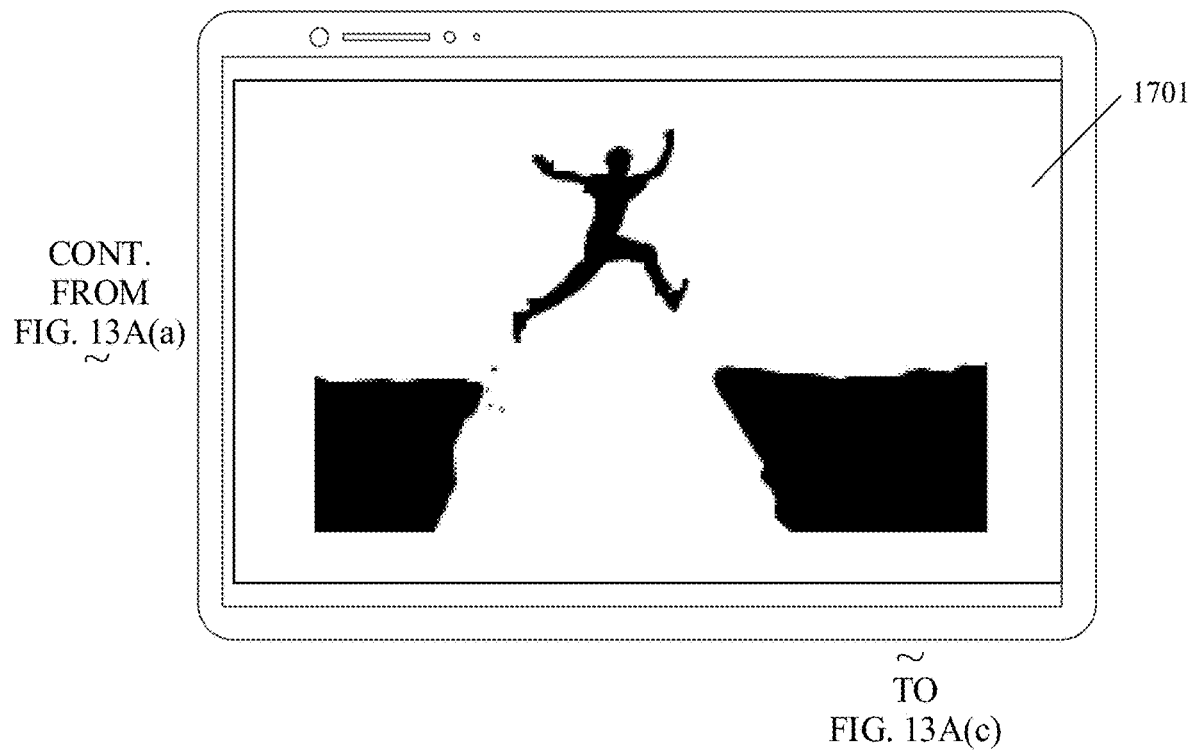
Figure 13A:
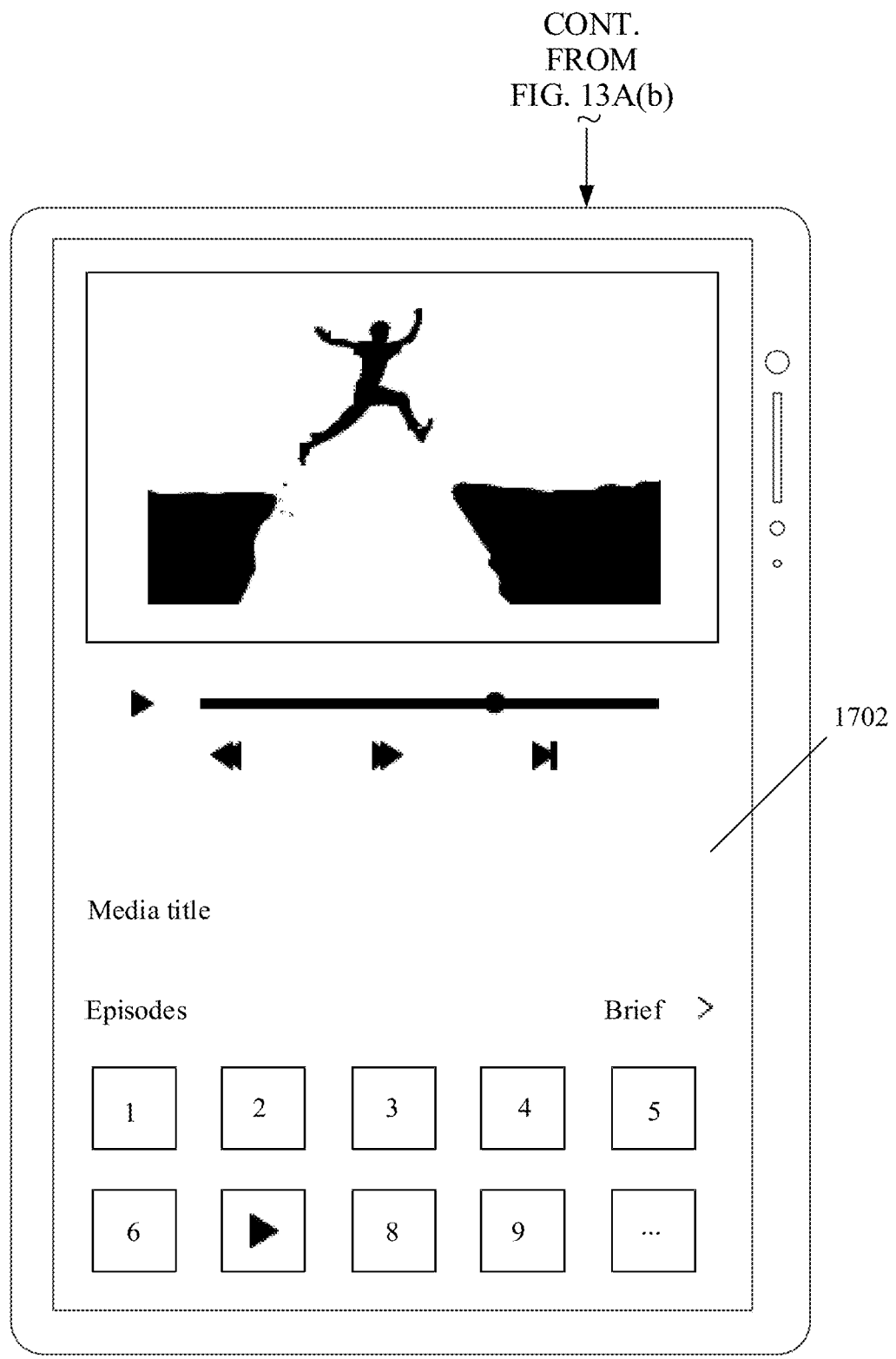
Figure 13A:
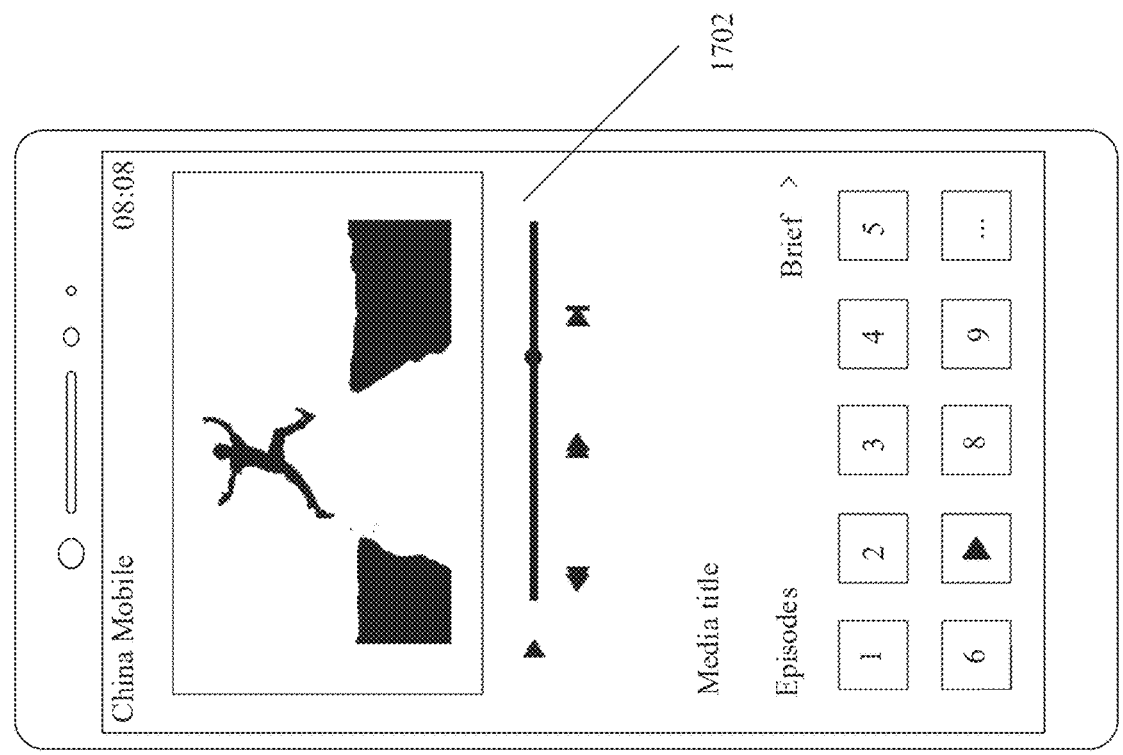

As shown in FIG. 13A(a), a mobile phone is currently in a landscape state and displays an interface 1701. The interface 1701 is, for example, an interface of a video play application. In this case, if detecting a screen mirroring operation, the mobile phone sends display information on the interface 1701 to a tablet computer. The tablet computer displays the interface 1701, as shown in FIG. 13A(b). It should be noted that, before sending the display information on the interface 1701 to the tablet computer, the mobile phone determines whether a screen display direction of the tablet computer is a landscape direction or a portrait direction, and determines, based on the screen display direction of the tablet computer, whether to adjust the interface (that is, the interface 1701) that is about to be projected to the tablet computer. When it is determined that the tablet computer is in the landscape mode, the interface 1701 does not need to be adjusted. Because the interface 1701 is suitable for landscape display (because the mobile phone is in landscape mode), the mobile phone directly sends the display information on the interface 1701 to the tablet computer. It should be noted that, in the current screen mirroring technology, the transmitter sends, in response to a screen projection operation, a display interface on a foreground of the transmitter to the receiver for display, without determining, based on the current screen display direction of the receiver, whether to adjust an interface that is about to be projected to the receiver. Therefore, in the current screen projection technology, the interface projected to the receiver by the transmitter in response to the screen mirroring operation may not adapt to the current screen display direction of the receiver.

As shown in FIG. 13A(c), when the tablet computer is switched from the landscape mode to the portrait mode, the projected interface changes from the interface 1701 to an interface 1702. Correspondingly, the interface on the mobile phone also changes to the interface 1702, as shown in FIG. 13A(d). In other words, although the mobile phone stays in a landscape posture (in landscape placement), the mobile phone also enters the portrait mode when the receiver (that is, the tablet computer) is switched from the landscape mode to the portrait mode.

Second Application Scenario

This application scenario corresponds to the case 2. The transmitter is in the landscape mode, and the receiver is in the portrait mode.

Figure 13B:
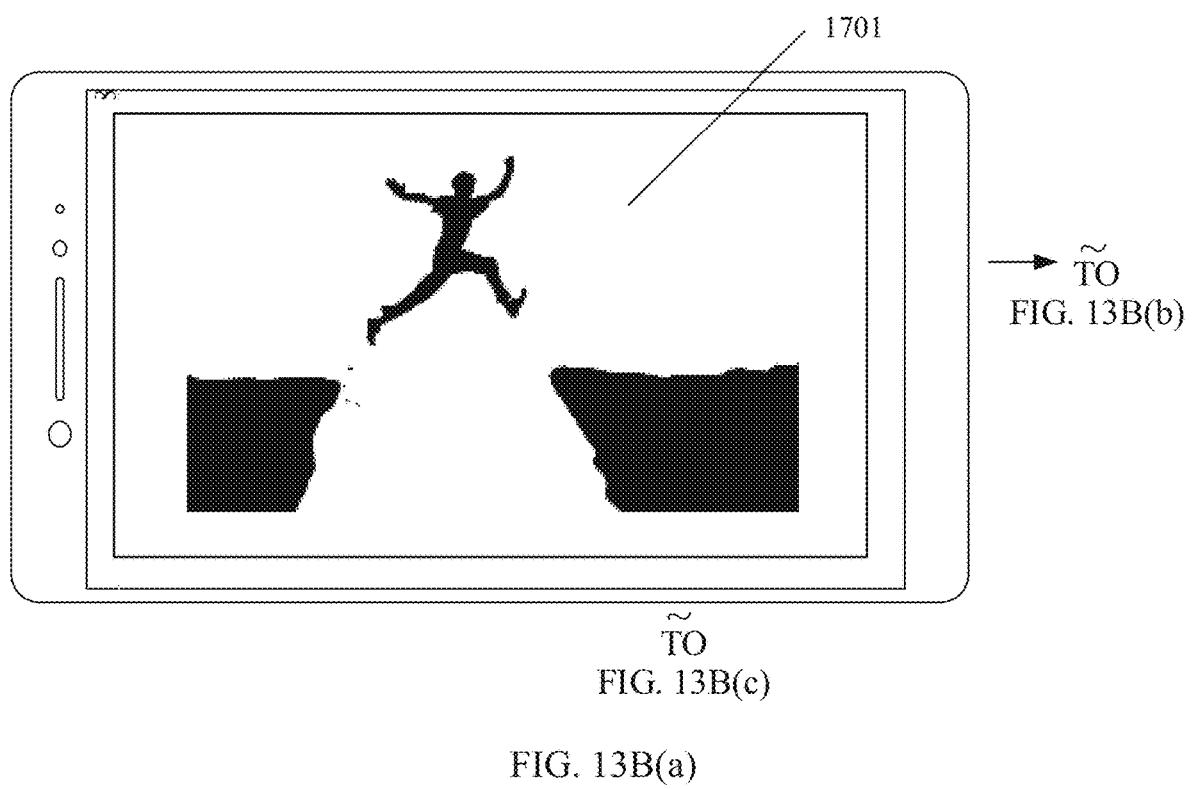
Figure 13B:
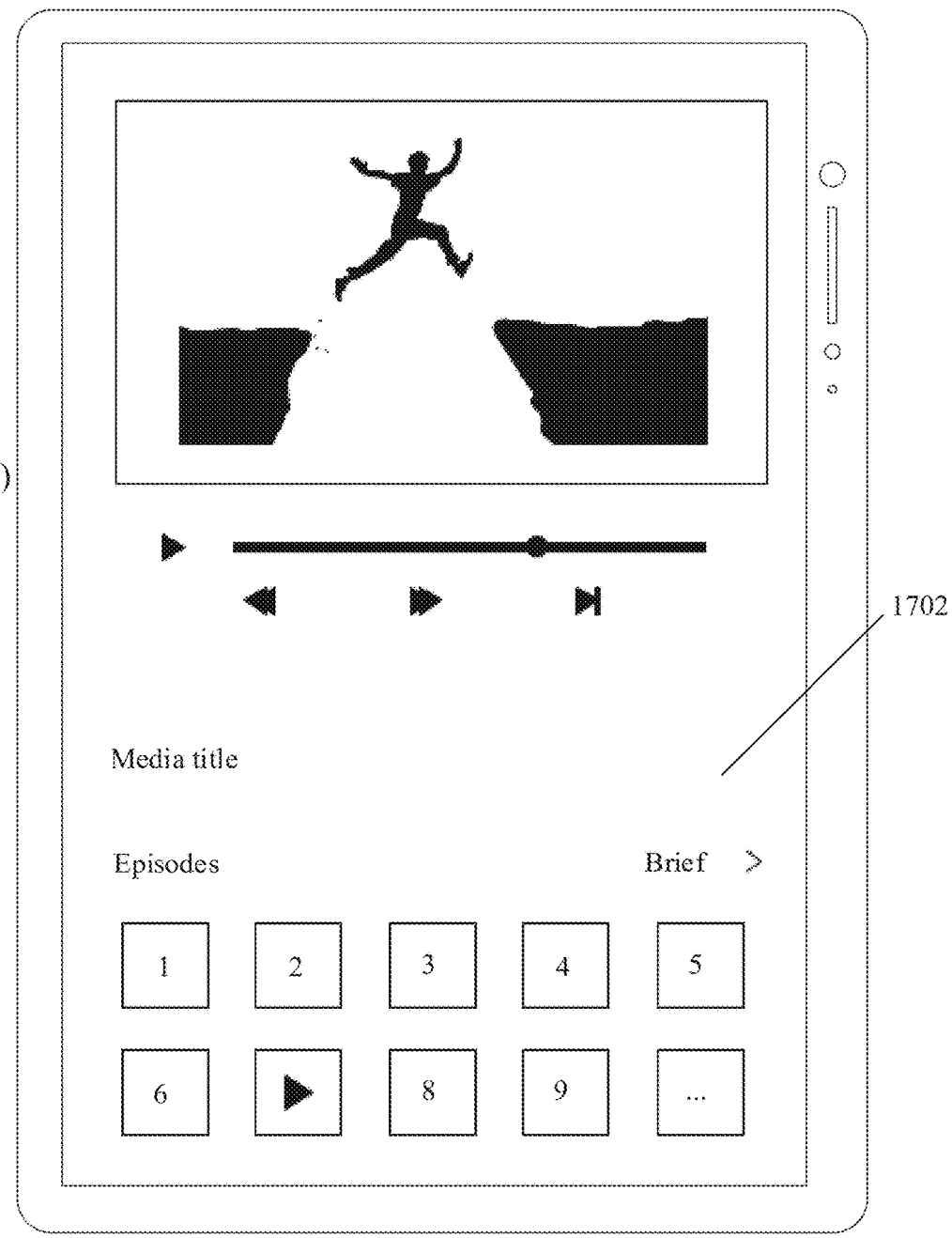
Figure 13B:
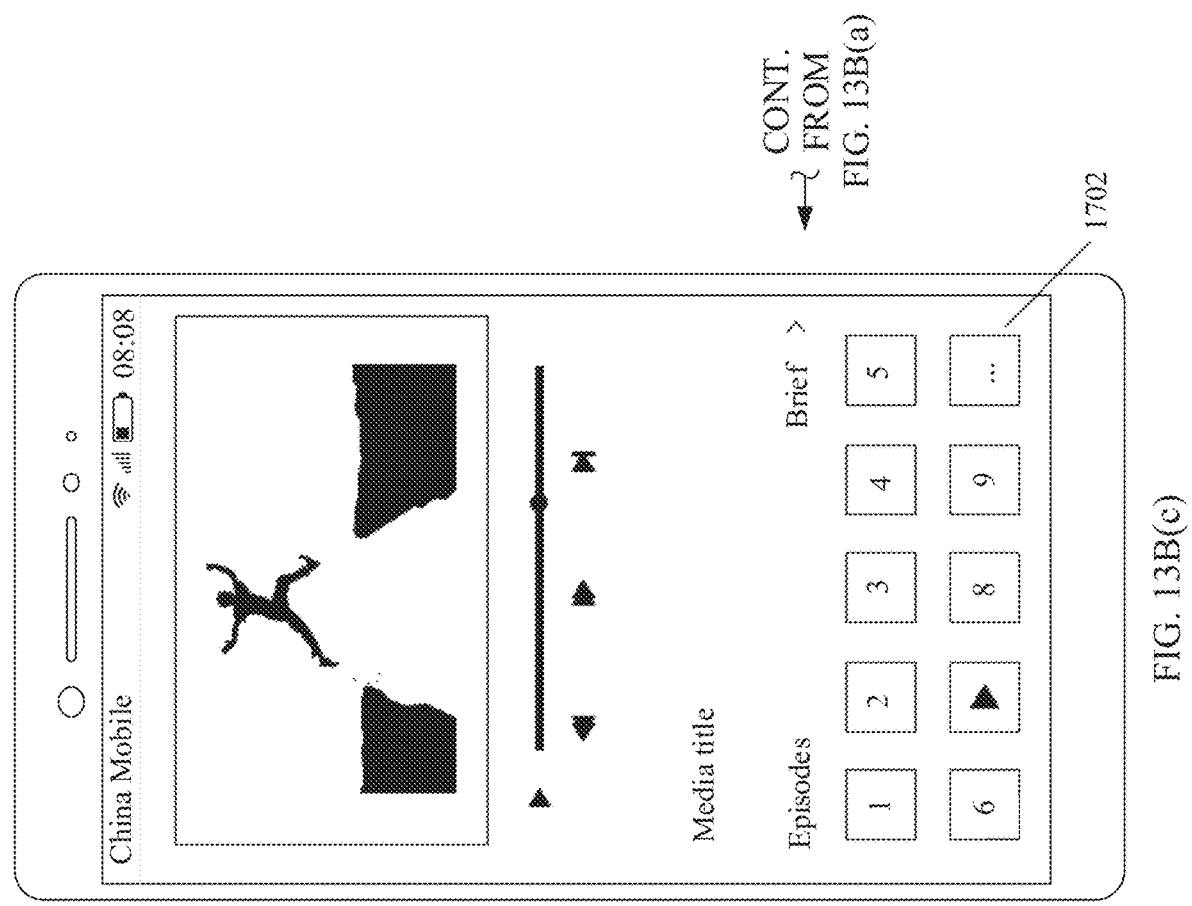
Figure 13B:
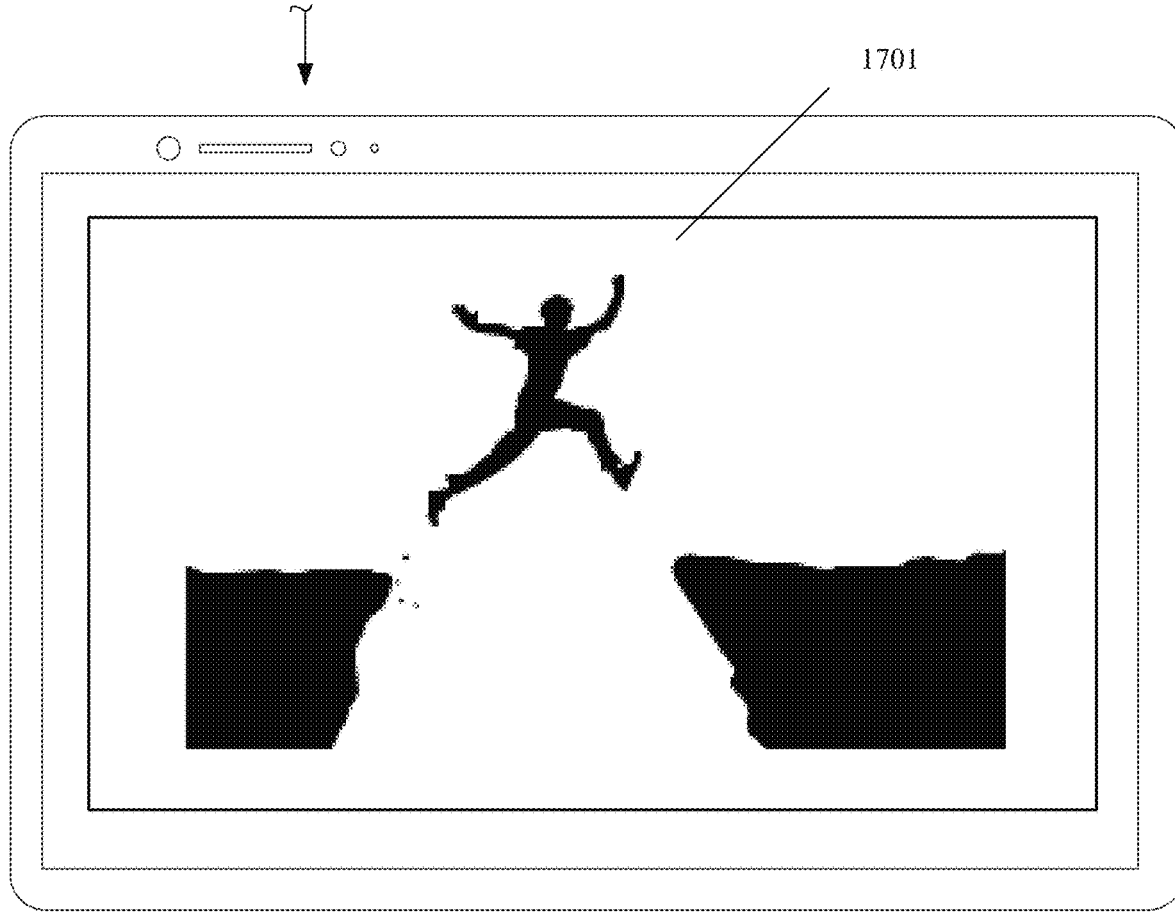
Figure 13B:
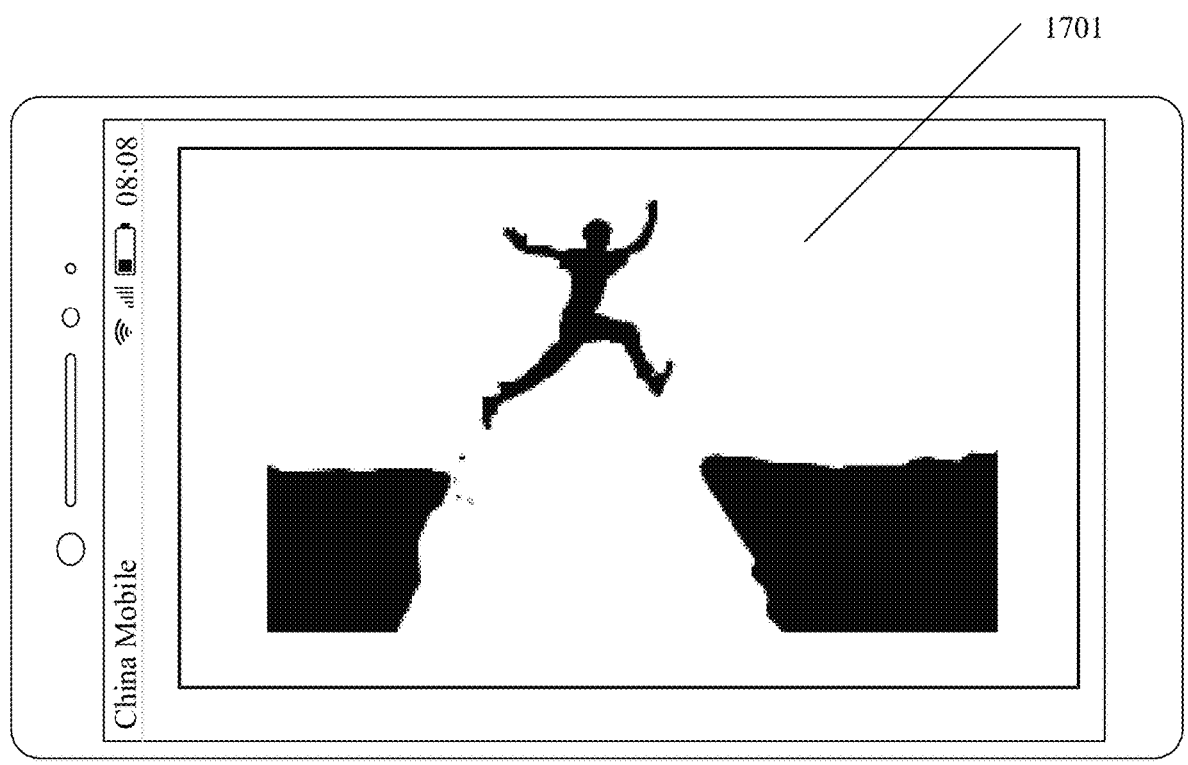

As shown in FIG. 13B(a), the mobile phone is currently in the landscape state and displays the interface 1701. In this case, if detecting a screen mirroring operation, the mobile phone sends display information on the interface 1702 to the tablet computer. The tablet computer displays the interface 1702, as shown in FIG. 13B(b). Refer to FIG. 13A(a) to FIG. 13A(d) and FIG. 13B(a) to FIG. 13B(e). In FIG. 13A(a) to FIG. 13A(d), the mobile phone sends, in response to the screen mirroring operation, the display information on the interface 1701 to the tablet computer. In FIG. 13B(a) to FIG. 13B(e), the mobile phone sends, in response to the screen mirroring operation, the display information on the interface 1702 to the tablet computer. In FIG. 13A(a) to FIG. 13A(d), before projecting the screen to the tablet computer, the mobile phone determines that the current screen display direction of the tablet computer is the landscape direction, and the interface 1701 currently displayed on the mobile phone adapts to landscape display. Therefore, the interface 1701 does not need to be adjusted, and the interface 1701 is directly projected to the tablet computer. However, in FIG.

13B(a) to FIG. 13B(e), before projecting the screen to the tablet computer, the mobile phone determines that the current screen display direction of the tablet computer is the portrait direction, and the interface 1701 currently displayed on the mobile phone is not suitable for portrait display. Therefore, the mobile phone adjusts the interface 1701 to be the interface 1702, and projects the interface 1702 to the tablet computer. After the mobile phone projects the interface 1702, the mobile phone also displays the interface 1702, as shown in FIG. 13B(c).

As shown in FIG. 13B(d), when the tablet computer is switched from the portrait mode to the landscape mode, the projected interface changes from the interface 1702 to the interface 1701. Correspondingly, the interface on the mobile phone also changes to the interface 1701, as shown in FIG. 13B(e). In other words, as the receiver (that is, the tablet computer) is switched from portrait mode to landscape mode, the mobile phone also is switched from portrait mode to landscape mode.

Third Application Scenario

This application scenario corresponds to the case 3. The transmitter is in the portrait mode, and the receiver is in the portrait mode.

Figure 13C:
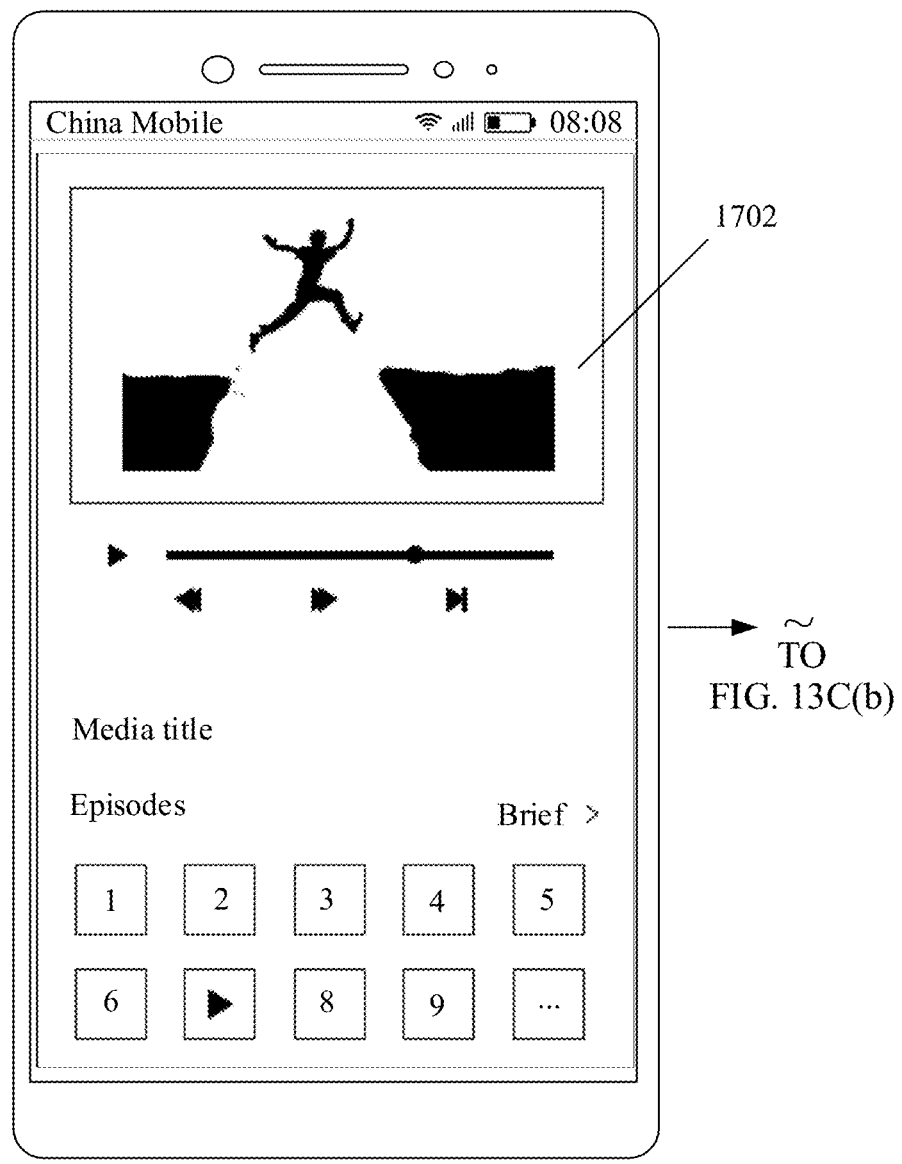
Figure 13C:
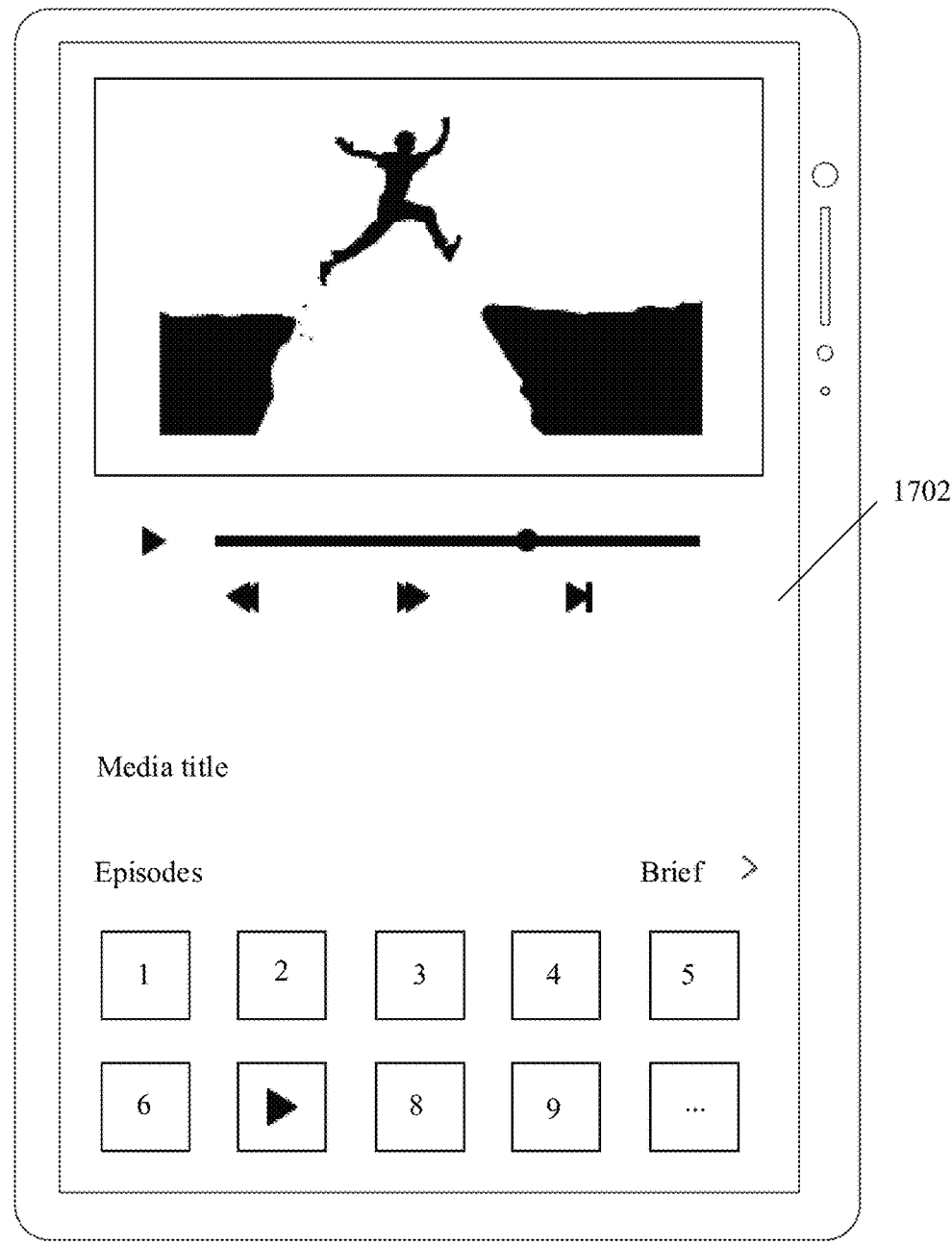
Figure 13C:
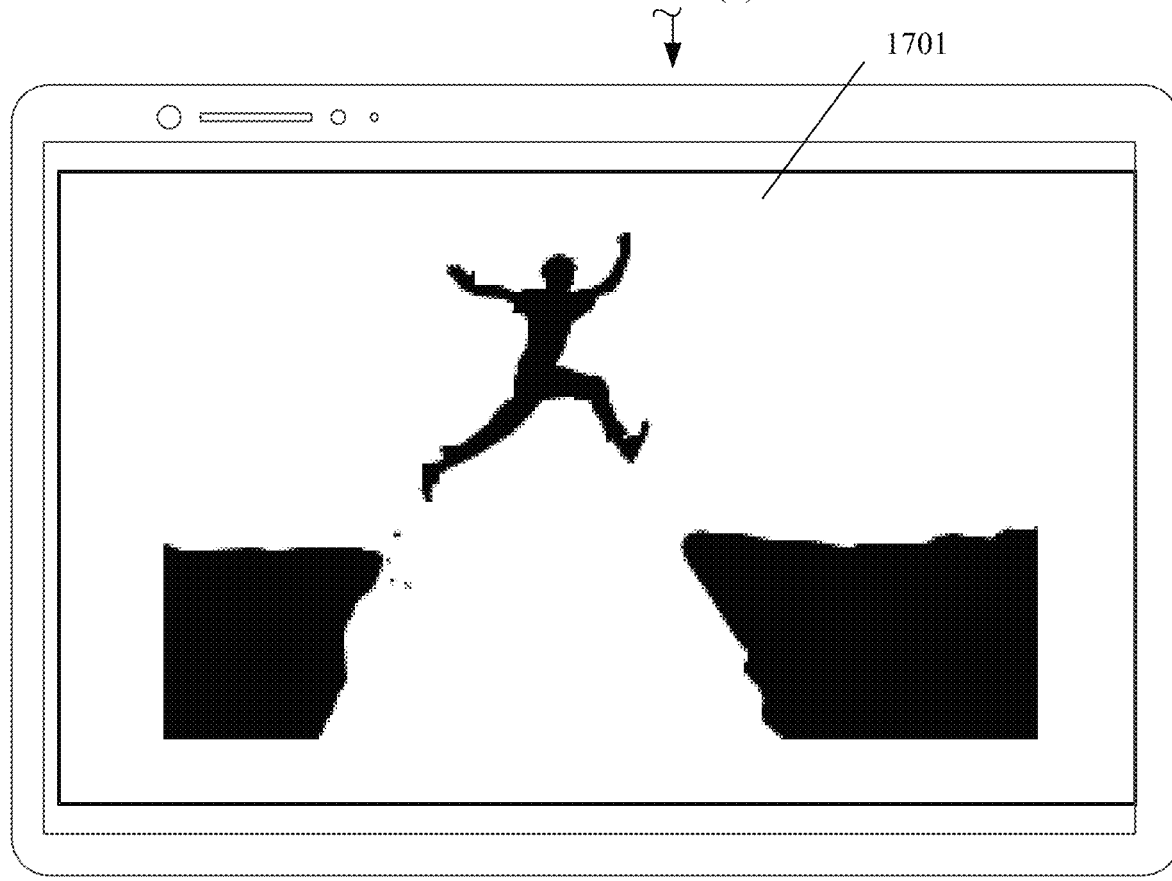
Figure 13C:
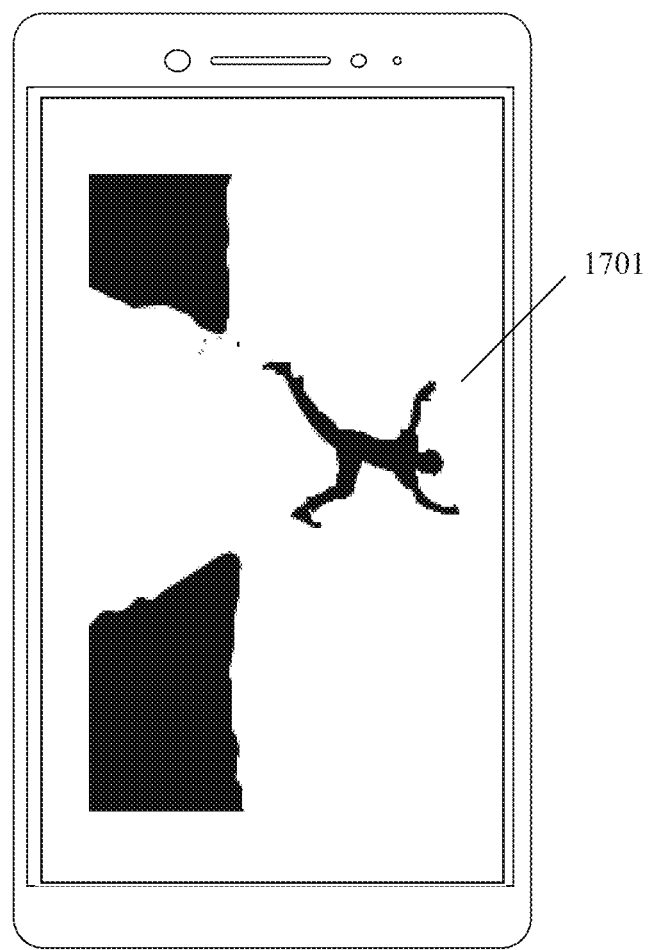

As shown in FIG. 13C(a), the mobile phone is currently in the portrait state and displays the interface 1702. In this case, if detecting a screen mirroring operation, the mobile phone sends the display information on the interface 1702 to the tablet computer. The tablet computer displays the interface 1702, as shown in FIG. 13C(b). It should be noted that, before sending the display information on the interface 1702 to the tablet computer, the mobile phone determines that the tablet computer is in the portrait mode. Therefore, the interface 1702 does not need to be adjusted. The display information on the interface 1702 is directly sent to the tablet computer, because the interface 1702 is suitable for portrait display (because the mobile phone displays the interface 1702 in the portrait mode).

As shown in FIG. 13C(c), when the tablet computer is switched from the portrait mode to the landscape mode, the projected interface changes from the interface 1702 to the interface 1701. Correspondingly, the interface on the mobile phone also changes to the interface 1701, as shown in FIG. 13C(d). In other words, although the mobile phone stays in a portrait posture, the mobile phone also enters the landscape mode when the receiver (that is, the tablet computer) is switched from the portrait mode to the landscape mode.

Fourth Application Scenario

This application scenario corresponds to the case 4. The transmitter is in the portrait mode, and the receiver is in the landscape mode.

Figure 13D:
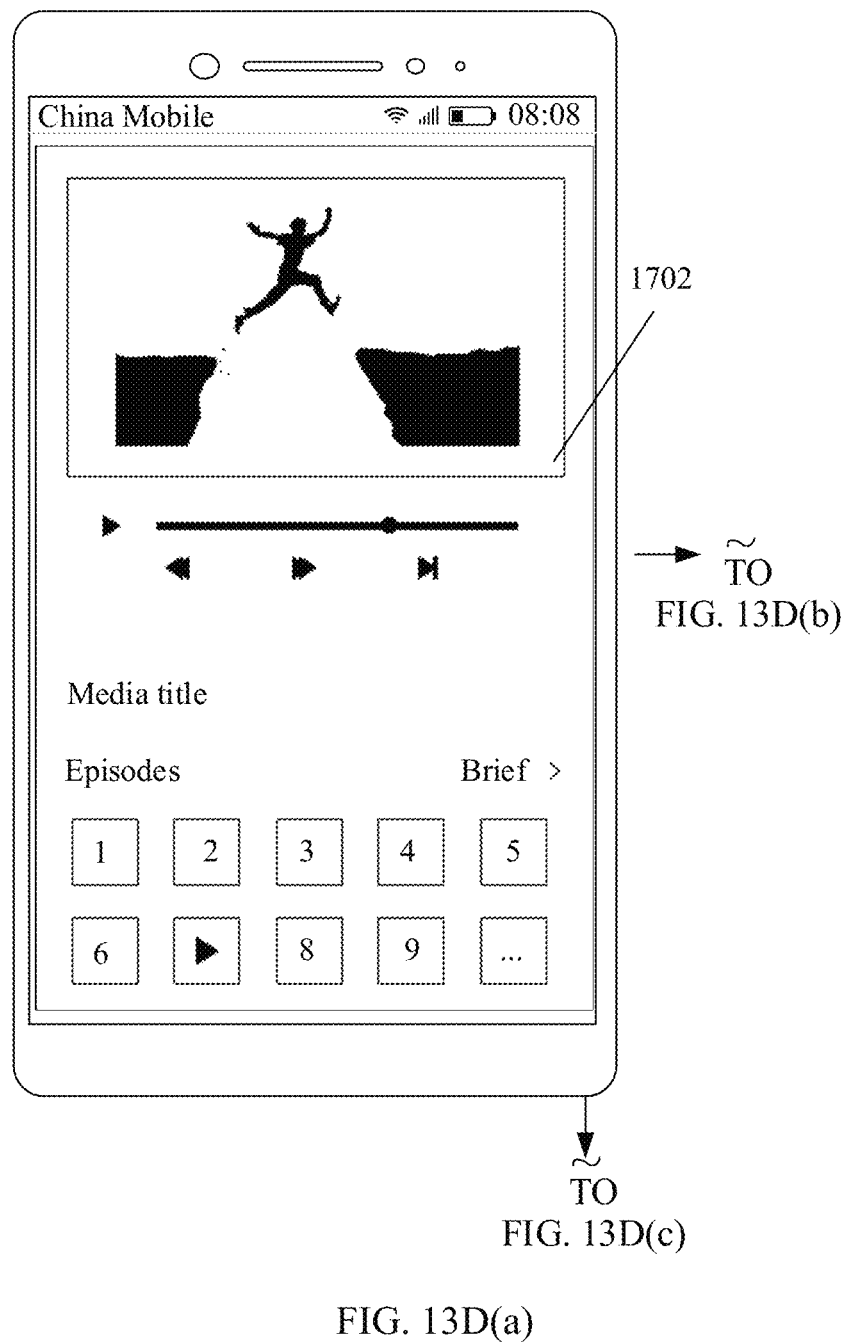
Figure 13D:
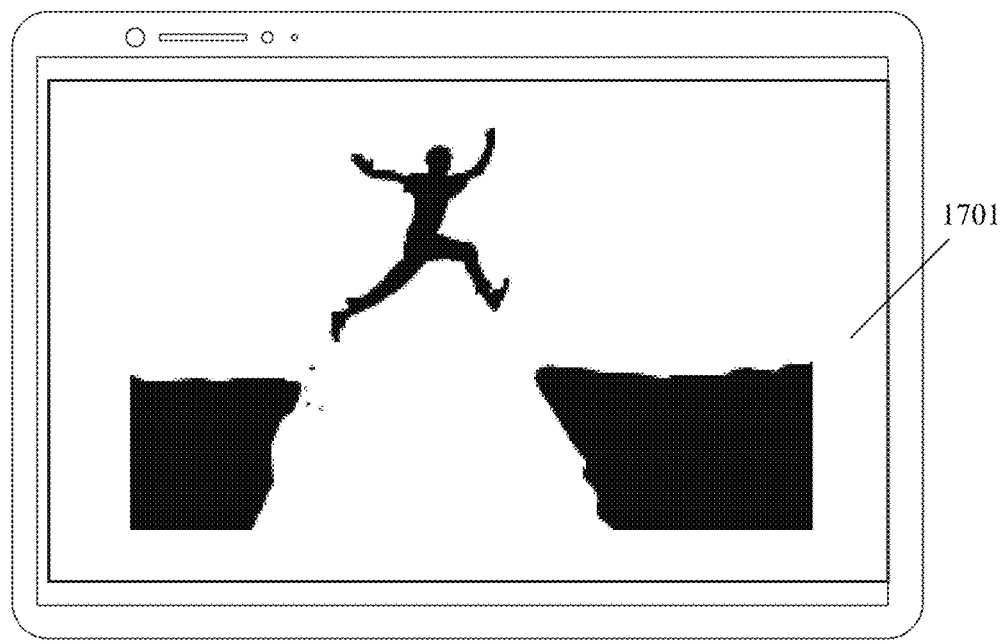
Figure 13D:
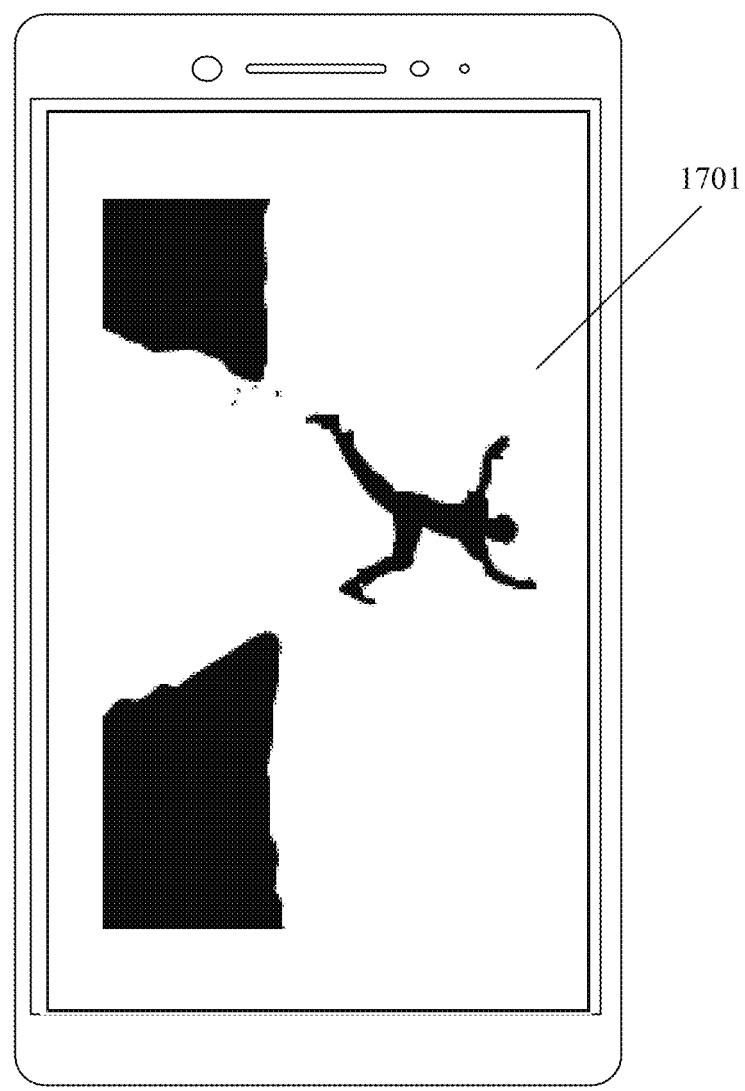
Figure 13D:
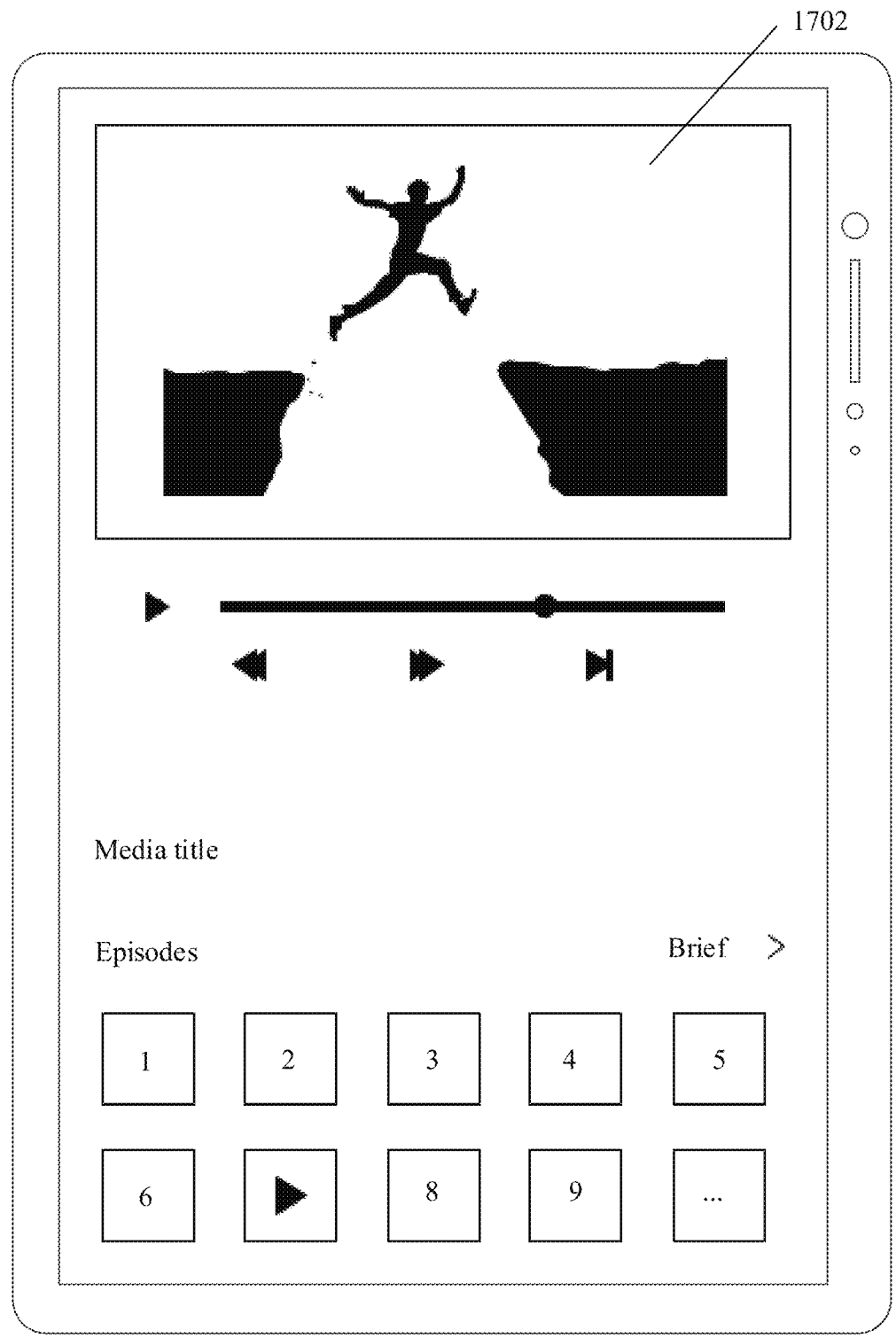
Figure 13D:
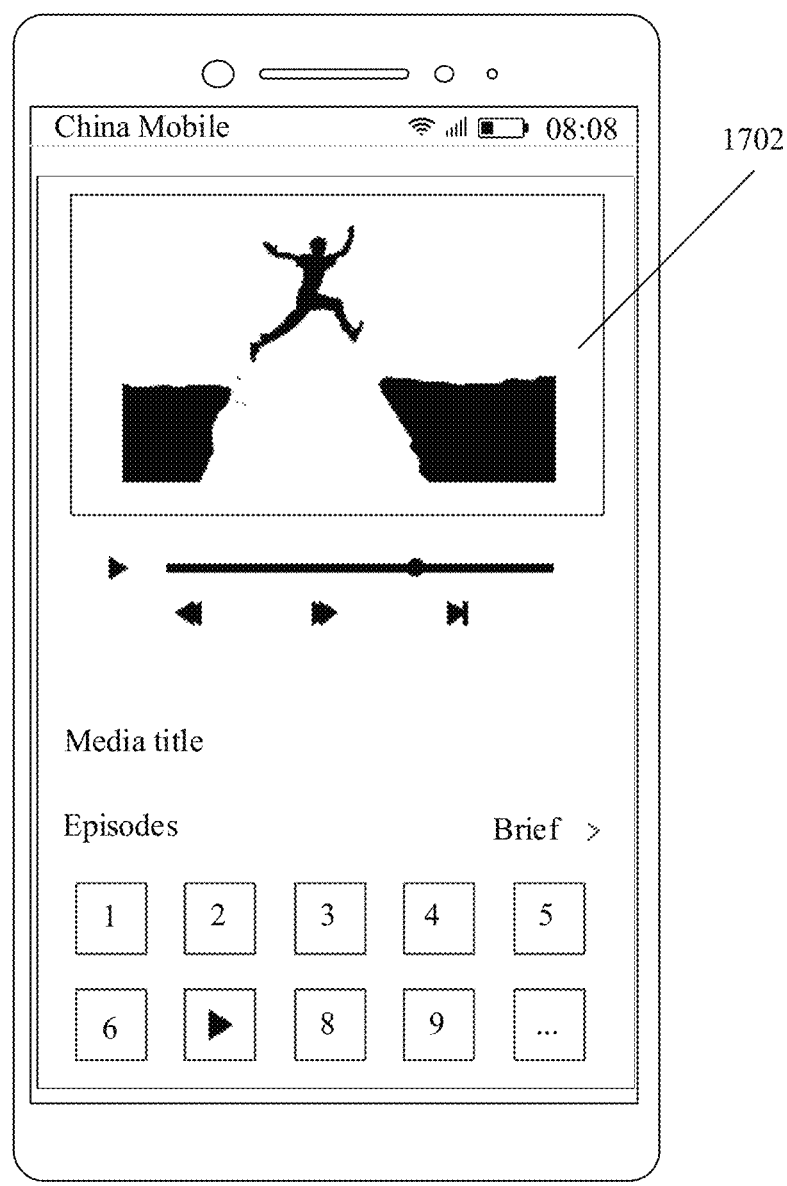

As shown in FIG. 13D(a), the mobile phone is currently in the portrait state and displays the interface 1702. In this case, if detecting a screen mirroring operation, the mobile phone sends the display information on the interface 1701 to the tablet computer. The tablet computer displays the interface 1701, as shown in FIG. 13D(b). Before projecting the screen to the tablet computer, the mobile phone determines that the current screen display direction of the tablet computer is the landscape direction, and the interface 1702 is not suitable for landscape display. Therefore, the interface 1702 is adjusted to be the interface 1701, and the interface 1701 is sent to the tablet computer. After the mobile phone projects the interface 1701, the mobile phone also displays the interface 1701, as shown in FIG. 13D(c).

As shown in FIG. 13D(d), when the tablet computer is switched from the landscape mode to the portrait mode, the projected interface changes from the interface 1701 to the interface 1702. Correspondingly, the interface on the mobile phone also changes to the interface 1702, as shown in FIG. 13D(e).

The following describes the implementation principles of the foregoing four application scenarios. It should be noted that, that the implementation principles of the foregoing four application scenarios are the same is considered. For brevity, the fourth application scenario is mainly used as an example for description.

In FIG. 14(a), the mobile phone displays a first interface. The first interface may be, for example, the interface 1702 in FIG. 13D(a), FIG. 13D(d), and FIG. 13D(e) or another interface. The first interface includes display information A and display information B. If the first interface is the interface 1702, the display information A may be a video playback window, and the display information B may be information about MEDIA TITLE and Episode keys. As shown in FIG. 14(b), the tablet computer displays a home screen. The mobile phone is connected to the tablet computer. The connection may be a wired or wireless connection. The mobile phone may recognize whether a current screen display direction of the tablet computer is a landscape direction or a portrait direction. For example, after the tablet computer is connected to the mobile phone, the tablet computer may actively report the current screen display direction of the tablet computer to the mobile phone. Alternatively, the mobile phone may send, to the tablet computer, a request for the current screen display direction of the tablet computer, and the tablet computer returns, in response to the request, the current screen display direction.

When detecting a screen mirroring operation (for example, an operation of tapping a screen projection key on a swipe-down notification bar interface or a swipe-up control center interface), the mobile phone displays an interface shown in FIG. 14(c). The interface includes an identifier of a nearby device. When an operation on the identifier of the tablet computer is detected, display information on a second interface is sent to the tablet computer. The tablet computer displays the second interface, as shown in FIG. 14(d). The mobile phone determines that the tablet computer is currently in a landscape state, and the first interface is not suitable for landscape display. Therefore, the mobile phone adjusts the first interface to the second interface and sends the second interface to the tablet computer. The second interface has less display information than the first interface. For example, the second interface includes only the video playback window, as shown in FIG. 13D(b). After the mobile phone sends the second interface to the tablet computer, the mobile phone also displays the second interface, as shown in FIG. 14(e). In other words, the mobile phone is originally in the portrait mode and displays the first interface. When the mobile phone needs to project the screen to the tablet computer in the landscape mode, the mobile phone adjusts the first interface to the second interface and projects the second interface to the tablet computer. In addition, the mobile phone also is switched from the portrait mode to the landscape mode to display the second interface.

As shown in FIG. 14(f), when the tablet computer is switched from the landscape mode to the portrait mode, the projected interface on the tablet computer changes from the second interface to the first interface, in other words, there is more display information. Moreover, the interface on the mobile phone correspondingly changes from the second interface to the first interface, as shown in FIG. 14(*g*). In this way, the mobile phone is originally in the landscape mode, and when a target device (that is, the tablet computer) is switched from the landscape mode to the portrait mode, the mobile phone is correspondingly adjusted to be in the portrait mode.

FIG. 15(*a*) to FIG. 15(*d*) are a background processing procedure corresponding to FIG. 14(*a*) to FIG. 14(*g*).

As shown in FIG. 15(*a*), a primary device (that is, the mobile phone in FIG. 14(*a*) to FIG. 14(*g*)) includes a local display monitor. The local display monitor is in a portrait mode and displays the first interface. The first interface includes the display information A and the display information B, corresponding to FIG. 14(*a*). As shown in FIG. 15(*b*), the primary device creates a first VD. The first VD is configured to project display information on the first VD to the target device. A display parameter of the first VD matches a display parameter of the target device. For example, a screen display direction of the first VD is consistent with a screen display direction of the target device, and/or an aspect ratio of the first VD matches an aspect ratio of the target device. For example, the target device is in the landscape mode, and the first VD is in the landscape mode.

After the first VD is created, the display information on the local display monitor needs to be mapped to the first VD, so that the first VD sends the display information on the first VD to the target device.

It should be noted that, in FIG. 15(*b*), the first VD is in the landscape mode (because the target device is in the landscape mode), and the local display monitor is in the portrait mode. Therefore, when the local display monitor maps the display information to the first VD, the first interface on the local display monitor may be adjusted to be the second interface, as shown in FIG. 15(*c*). The second interface adapts to landscape display. For example, the second interface includes the display information A. The local display monitor maps the second interface to the first VD. The first VD projects the second interface to the target device. In other words, in screen mirroring, the screen display direction of the first VD is consistent with the screen display direction of the target device. When the screen display direction of the local display monitor is inconsistent with that of the first VD, the interface on the local display monitor is adjusted, to adapt to the screen display direction of the first VD. In this way, the interface projected to the target device adapts to the screen display direction of the target device.

After the primary device projects the second interface to the target device, a screen of the target device may rotate, for example, be switched from the landscape mode to the portrait mode As shown in FIG. 15(*c*), when the target device is switched from the landscape mode to the portrait mode, the target device sends a screen rotation instruction to the primary device, to indicate that the target device is switched to the portrait mode.

As shown in FIG. 15(*d*), after receiving the screen rotation instruction from the target device, the primary device is switched the first VD from the landscape mode to the portrait mode according to the screen rotation instruction. As the first VD is switched to the portrait mode, the local display monitor also is switched to the portrait mode. Therefore, the interface on the local display monitor is switched from the second interface to a third interface. The third interface is mapped to the first VD. The first VD sends the third interface to the target device.

Figure 16:
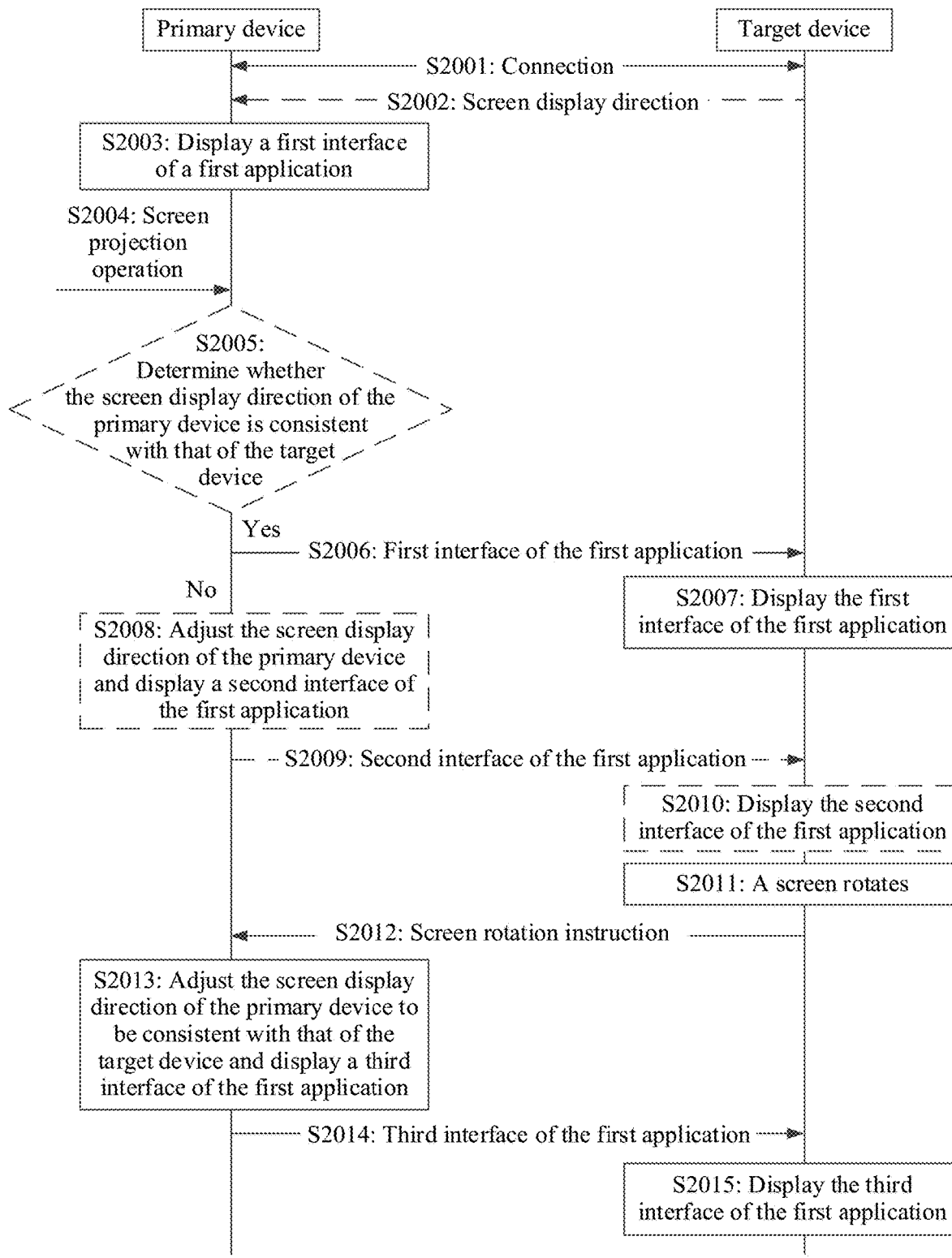
FIG. 16, FIG. 17A, and FIG. 17B are schematic flowcharts of a screen projection method according to an embodiment of this application.

FIG. 16 is a schematic flowchart of a display method according to an embodiment of this application. The method is applicable to screen mirroring. As shown in FIG. 16, the procedure includes the following steps.

S2001: A primary device is connected to a target device.

S2002: The target device sends a screen display direction to the primary device.

S2003: The primary device displays a first interface of a first application.

S2004: The primary device receives an operation of projecting a screen to the target device.

For example, for implementation principles of S2001 to S2003, refer to the implementation principles of S1101 to S1104 in FIG. 11. Details are not described again.

S2005: The primary device determines whether the screen display direction of the primary device is consistent with that of the target device. If the screen display directions are consistent, S2006 and S2007 are performed. If the screen display directions are inconsistent, S2008 and S2010 are performed.

S2006: The primary device sends the first interface of the first application to the target device.

S2007: The target device displays the first interface.

The first interface adapts to the screen display direction of the primary device. If the screen display direction of the primary device is consistent with that of the target device, the first interface also adapts to the screen display direction of the target device. Therefore, the primary device sends the first interface to the target device, without adjusting the first interface.

S2008: The primary device adjusts the screen display direction of the primary device and displays a second interface of the first application.

S2009: The primary device sends a second interface of the first application to the target device.

S2010: The target device displays the second interface.

The first interface adapts to the screen display direction of the primary device. If the screen display direction of the primary device is inconsistent with that of the target device, the first interface does not adapt to the screen display direction of the target device. Therefore, the primary device adjusts the screen display direction of the primary device to be consistent with that of the target device, adjusts the first interface to the second interface, and sends the second interface to the target device.

S2011: The target device detects screen rotation.

S2012: The target device sends a screen rotation instruction to the primary device.

For example, for implementation principles of S2011 and S2012, refer to the implementation principles of S1111 and S1112 in FIG. 11. Details are not described again.

S2013: The primary device adjusts the screen display direction of the primary device according to the screen rotation instruction and displays a third interface of the first application.

S2014: The primary device sends the third interface to the target device.

S2015: The target device displays the third interface.

It should be noted that, the optional steps in FIG. 16 are represented by using dashed lines. When none of the optional steps is performed, the display method according to this application includes: A local display monitor of the primary device displays a first interface of a first application (S2003). The primary device detects a screen projection operation (S2004). The primary device sends, in response to the operation, display information on the first interface of the first application to the target device (S2006). The target device displays the first interface (S2007). The target device detects a screen rotation operation (S2011). The target device sends a screen rotation instruction to the primary device (S2012). The primary device adjusts, in response to the instruction, the screen display direction of the primary device to be consistent with the screen display direction of the target device, and displays a third interface of the first application (S2013). The primary device sends display information on the third interface to the target device (S2014). The target device displays the third interface (S2015). In other words, the screen display direction of the primary device is switched as the screen display direction of the target device is switched, to keep consistent with the screen display direction of the target device. In this way, the display information projected to the target device by the primary device adapts to the screen display direction of the target device.

Figure 17A:
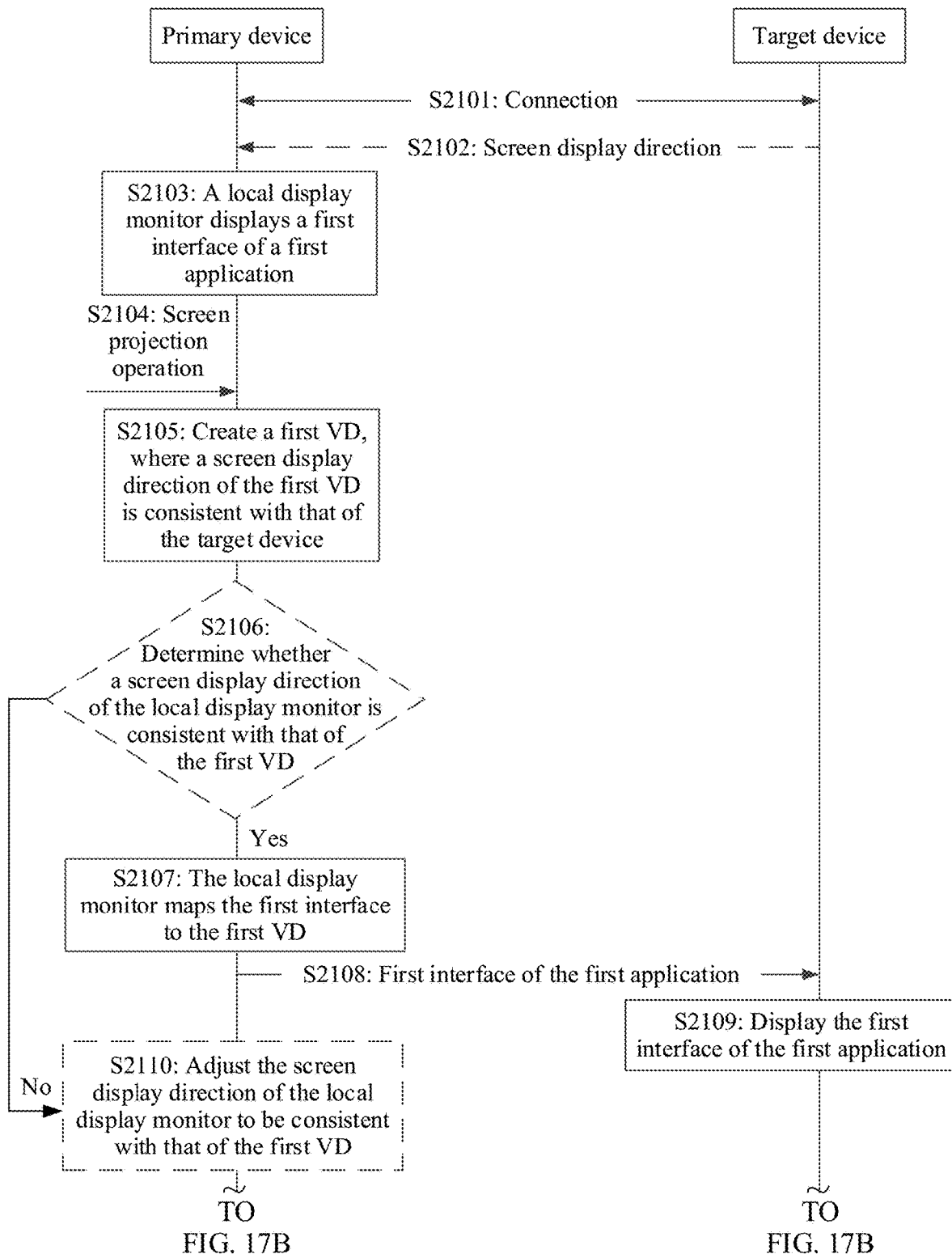
Figure 17B:
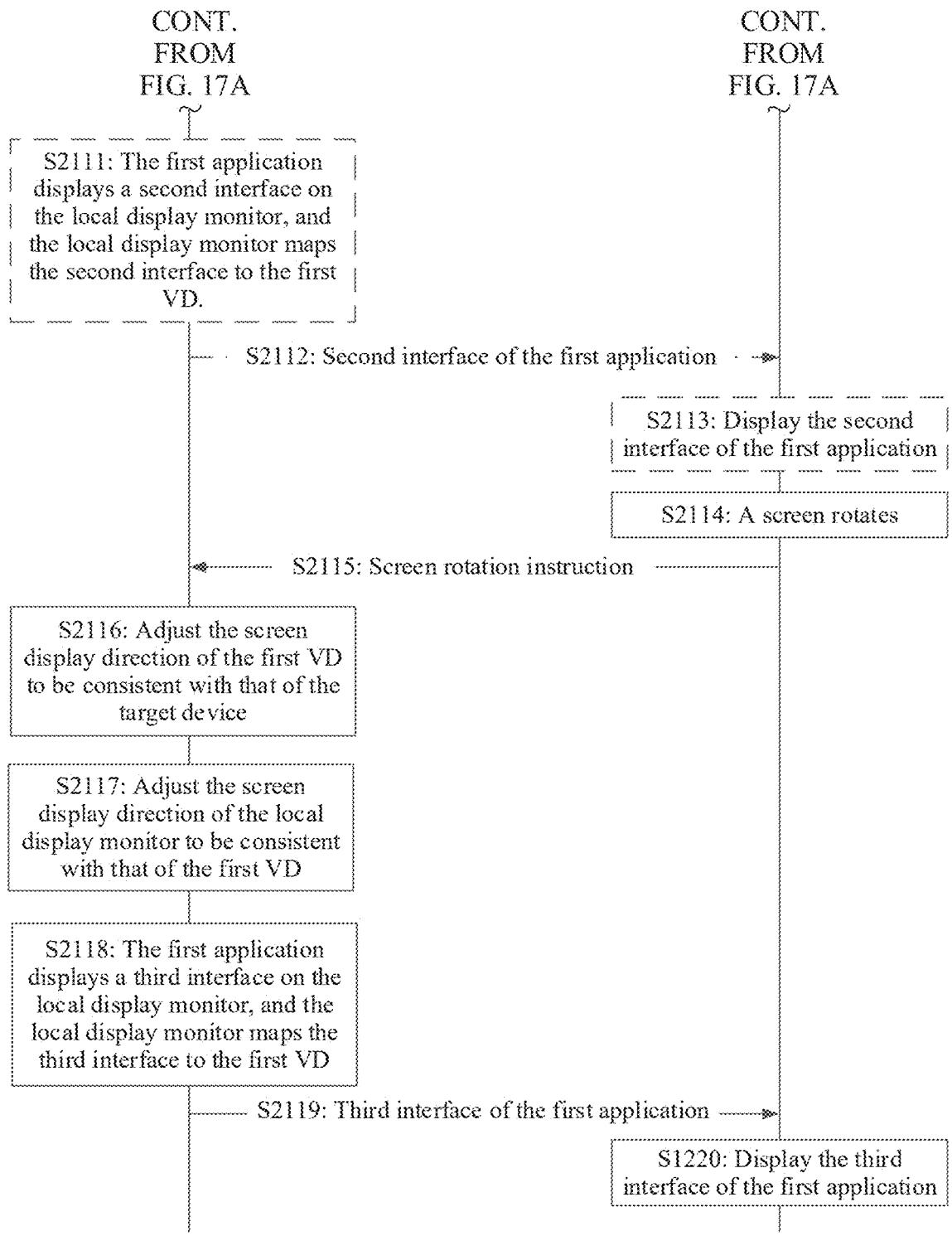

FIG. 17A and FIG. 17B are another schematic flowchart of a display method according to an embodiment of this application. The procedure shown in FIG. 17A and FIG. 17B may also be understood as a refinement of the procedure shown in FIG. 16. As shown in FIG. 17A and FIG. 17B, the procedure includes the following steps.

S2101: A primary device is connected to a target device.

S2102: The target device sends a screen display direction to the primary device.

S2103: A local display monitor of the primary device displays a first interface of a first application.

S2104: The primary device receives a screen projection operation.

For example, for implementation principles of S2101 to S2104, refer to the implementation principles of S1101 to S1104 in FIG. 11. Details are not described again.

S2105: The primary device creates a first VD, where a screen display direction of the first VD is consistent with a screen display direction of the target device.

S2106: The primary device determines whether a screen display direction of the local display monitor is consistent with that of the first VD. If the screen display directions are consistent, S2107 to S2109 are performed. If the screen display directions are inconsistent, S2110 to S2113 are performed.

S2107: The local display monitor maps the first interface of the first application to the first VD.

S2108: The first VD sends the first interface of the first application to the target device.

S2109: The target device displays the first interface.

S2110: The primary device adjusts the screen display direction of the local display monitor to be consistent with that of the first VD.

S2111: The first application displays a second interface on the local display monitor, and the local display monitor maps the second interface to the first VD.

S2112: The first VD sends the second interface of the first application to the target device.

S2113: The target device displays the second interface.

S2114: The target device detects screen rotation.

S2115: The target device sends a screen rotation instruction to the primary device.

For example, for implementation principles of S2114 and S2115, refer to the implementation principles of S1111 and S1112 in FIG. 11. Details are not described again.

S2116: The primary device adjusts, according to the screen rotation instruction, the screen display direction of the first VD to be consistent with that of the target device.

S2117: The primary device adjusts the screen display direction of the local display monitor to be consistent with that of the first VD.

S2118: The first application displays a third interface on the local display monitor, and the local display monitor maps the third interface to the first VD.

S2119: The first VD sends the third interface to the target device.

S2120: The target device displays the third interface.

It should be noted that, optional steps in FIG. 17A and FIG. 17B are represented by using dashed lines. When none of the optional steps is performed, the display method according to this application includes: A local display monitor of the primary device displays a first interface of a first application (S2103). The primary device detects a screen projection operation (S2104). The primary device creates a first VD in response to the operation, where a screen display direction of the first VD is consistent with that of the target device (S2105). The local display monitor of the primary device maps the first interface to the first VD (S2107). The first VD sends display information on the first interface to the target device (S2108). The target device displays the first interface (S2109). The target device detects a screen rotation operation (S2114). The target device sends a screen rotation instruction to the primary device (S2115). The primary device adjusts, in response to the instruction, the screen display direction of the first VD to be consistent with a screen display direction of the target device after the target device is rotated (S2116). The primary device adjusts the screen display direction of the local display monitor to be consistent with that of the first VD (S2117). The first application displays a third interface on the local display monitor, and the local display monitor maps the third interface to the first VD (S2118). The first VD sends display information on the third interface to the target device (S2119). The target device displays the third interface (S2120).

Figure 18:
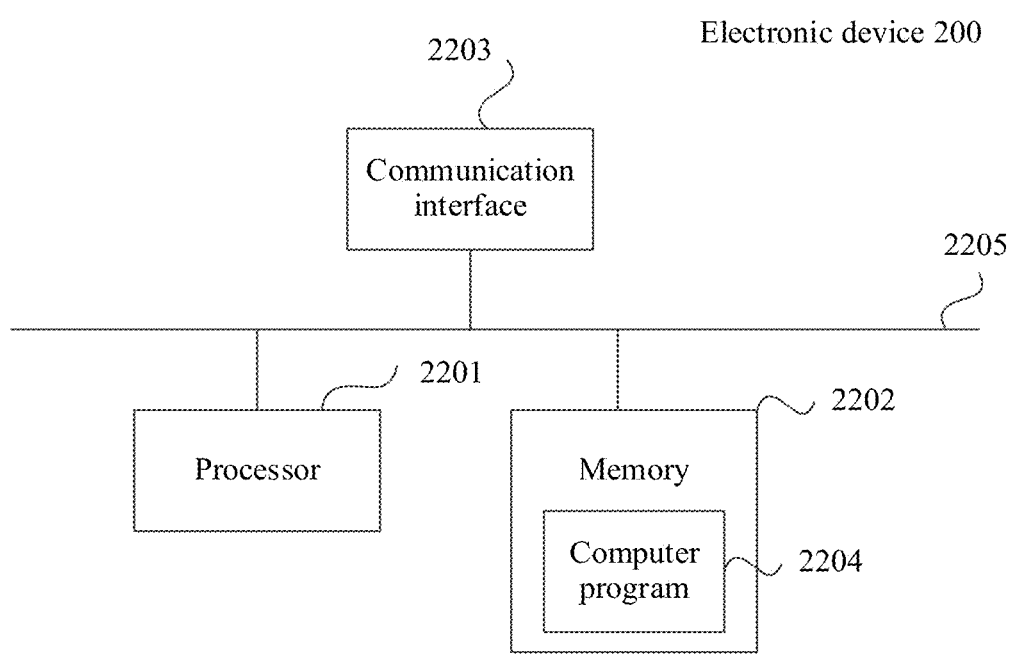
FIG. 18 is a schematic diagram of a structure of an electronic device according to an embodiment of this application.

FIG. 18 is a schematic diagram of a structure of an electronic device 2200 according to an embodiment of this application. The electronic device 2200 may be the foregoing primary device or target device. As shown in FIG. 18, the electronic device 2200 may include one or more processors 2201, one or more memories 2202, a communication interface 2203, and one or more computer programs 2204. The foregoing components may be connected by using one or more communication buses 2205. The one or more computer programs 2204 are stored in the memory 2202 and are configured to be executed by the one or more processors 2201, and the one or more computer programs 2204 include instructions. For example, the foregoing instructions may be used to perform related steps of the primary device in the foregoing corresponding embodiment. The communication interface 2203 is configured to implement communication between the primary device and another device (for example, the target device). For example, the communication interface may be a transceiver.

This embodiment of this application further provides a communication system. The communication system includes a first electronic device and a second electronic device. The first electronic device may be the foregoing primary device, and the second electronic device may be the foregoing target device. For example, the first electronic device may be a device with a display screen, such as a mobile phone, a tablet computer, a PC, or a watch. The second electronic device may be a large-screen device such as a tablet computer, a PC, or a television. For structures of the first electronic device and the second electronic device, refer to FIG. 18. For example, when the electronic device 2200 shown in FIG. 18 is the first electronic device, when the instructions of the one or more computer programs 2204 are executed by the processor, the first electronic device is enabled to perform steps of the foregoing first electronic device (that is, the primary device). When the electronic device 2200 shown in FIG. 18 is the second electronic device, when the instructions of the one or more computer programs 2204 are executed by the processor, the second electronic device is enabled to perform steps of the foregoing second electronic device (that is, the target device).

In the foregoing embodiments provided in this application, the method according to embodiments of this application is described from a perspective of using an electronic device (for example, the primary device or the target device) as an execution body. To implement functions in the method according to the embodiments of this application, the electronic device may include a hardware structure and/or a software module, to implement the foregoing functions in a form of a hardware structure, a software module, or a combination of a hardware structure and a software module. Whether a function in the foregoing functions is performed by using the hardware structure, the software module, or the combination of the hardware structure and the software module depends on particular applications and design constraints of the technical solutions.

According to the context, the term "when" or "after" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)". In addition, in the foregoing embodiments, relationship terms such as "first" and "second" are used to distinguish one entity from another, but do not limit any actual relationship and sequence between these entities.

Reference to "an embodiment", "some embodiments", or the like described in this specification indicates that one or more embodiments of this application include a specific feature, structure, or characteristic described with reference to embodiments. Therefore, statements such as "in one embodiment", "in some embodiments", "in some other embodiments", and "in still some other embodiments" that appear at different places in this specification do not necessarily refer to a same embodiment, but mean "one or more but not all embodiments", unless otherwise specially emphasized in another manner. The terms "comprise", "include", "have", and other variants thereof all mean "include but is not limited to", unless otherwise specifically emphasized in another manner.

All or a part of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive Solid State Disk (SSD)), or the like. If no conflict occurs, the solutions in the foregoing embodiments may be combined for use.

It should be noted that a part of this patent application document includes copyright-protected content. The copyright owner reserves the copyright except copies are made for the patent documents or the recorded content of the patent documents in the Patent Office.

What is claimed is:

1. A method, comprising:
sending, by a first electronic device in response to a first operation, display information on a first interface of a first application on the first electronic device to a second electronic device;
displaying, by the second electronic device, the first interface;
sending, by the second electronic device in response to a screen rotation operation, an instruction to the first electronic device, wherein the instruction indicates a screen rotation direction of the second electronic device, and the screen rotation direction comprises an indication of:
switching from a landscape mode to a portrait mode, or
switching from the portrait mode to the landscape mode;
sending, by the first electronic device in response to the instruction, display information on a second interface of the first application to the second electronic device, wherein the display information on the second interface is more than or less than the display information on the first interface, or a layout manner of the display information on the second interface differs from that of the first interface,
wherein the screen rotation direction of the second electronic device indicates switching from the landscape mode to the portrait mode, and wherein at least one of the display information on the first interface comprises first display information and second display information, and the first display information and the second display information are displayed in tiles in a horizontal direction, and the second interface comprises the first display information and the second display information, and the first display information and the second display information are displayed in tiles in a vertical direction, or
wherein the screen rotation direction of the second electronic device indicates switching from the portrait mode to the landscape mode, and wherein at least one of the display information on the first interface comprises first display information and second display information, and the first display information and the second display information are displayed in tiles in the vertical direction, and the second interface comprises the first display information and the second display information, and the first display information and the second display information are displayed in tiles in the horizontal direction; and displaying, by the second electronic device, the second interface.

2. The method according to claim 1, wherein
the screen rotation direction of the second electronic device indicates switching from the landscape mode to the portrait mode, and wherein at least one of the display information on the second interface is more than the display information on the first interface, or the layout manner of the display information on the second interface differs from that of the first interface; or
wherein the screen rotation direction of the second electronic device indicates switching from the portrait mode to the landscape mode, and wherein at least one of the display information on the second interface is less than the display information on the first interface, or the layout manner of the display information on the second interface differs from that of the first interface.

3. The method according to claim 1, wherein the display information on the second interface being more than the display information on the first interface comprises:
the second interface comprises all display information on the first interface, and the second interface further comprises a part of or all display information on a third interface, wherein the third interface comprises at least:
a following interface of the first interface;
a previous interface of the first interface;
a system default interface; or
a user-specified interface.

4. The method according to claim 1, wherein sending, by the first electronic device in response to the first operation, the display information on the first interface of the first application on the first electronic device to the second electronic device comprises:
displaying, by the first electronic device, the first interface;
determining, by the first electronic device in response to the first operation, that a screen display direction of the first electronic device is consistent with that of the second electronic device; and
sending the first interface to the second electronic device in response to the screen display direction of the first electronic device being consistent with that of the second electronic device.

5. The method according to claim 4, the method further comprising:
sending a fourth interface of the first application to the second electronic device in response to the screen display direction of the first electronic device being inconsistent with that of the second electronic device, wherein display information on the fourth interface is more than or less than the display information on the first interface, or a layout manner of the display information on the fourth interface differs from that of the first interface.

6. The method according to claim 5, wherein the screen display direction of the first electronic device being inconsistent with that of the second electronic device comprises:
the first electronic device being in the landscape mode and the second electronic device being in the portrait mode, the display information on the fourth interface being more than that of the first interface, or the first interface comprises first display information and second display information, and the first display information and the second display information are displayed in tiles in the horizontal direction, and the fourth interface comprises the first display information and the second display information, and the first display information and the second display information are displayed in tiles in the vertical direction; or
the first electronic device being in the portrait mode and the second electronic device being in the landscape mode, the display information on the fourth interface being less than that of the first interface, or the first interface comprises first display information and second display information, and the first display information and the second display information are displayed in tiles in the vertical direction, and the fourth interface comprises the first display information and the second display information, and the first display information and the second display information are displayed in tiles in the horizontal direction.

7. The method according to claim 1, wherein sending, by the first electronic device in response to the first operation, the display information on the first interface of the first application on the first electronic device to the second electronic device comprises:
creating, by the first electronic device in response to the first operation, a first virtual display (VD), wherein a screen display direction of the first VD is consistent with a current screen display direction of the second electronic device;
transferring, by the first electronic device, the first application to the first VD to initiate running of the first application by the first VD;
displaying, by the first application, the first interface on the first VD; and
sending, by the first VD, the first interface to the second electronic device.

8. The method according to claim 7, wherein sending, by the first electronic device in response to the instruction, the display information on the second interface of the first application to the second electronic device comprises:
adjusting, by the first electronic device in response to the instruction, the screen display direction of the first VD to be consistent with a screen display direction of the second electronic device after the second electronic device is rotated;
adjusting, by the first application in response to the adjustment for the screen display direction of the first VD, the first interface to the second interface; and
sending, by the first VD, the second interface to the second electronic device.

9. The method according to claim 1, the method further comprising:
displaying, by the first electronic device, an interface of a second application; or
displaying the first interface.

10. A first device, comprising:
at least one processor;
at least one non-transitory computer-readable memory connected to the at least one processor and including computer program code stored thereon, wherein the at least one non-transitory computer-readable memory and the computer program code are configured, with the at least one processor, to cause the device to:
send, in response to a first operation, display information on a first interface of a first application on the device to a second device;
receive an instruction from the second device, wherein the instruction indicates a screen rotation direction of the second device, and the screen rotation direction comprises an indication of:
switching from a landscape mode to a portrait mode; or
switching from a portrait mode to a landscape mode; and
send display information on a second interface of the first application to the second device in response to the instruction, wherein the display information on the second interface is more than or less than the display information on the first interface, or a layout manner of the display information on the second interface differs from that of the first interface,
wherein the screen rotation direction of the second device indicates switching from the landscape mode to the portrait mode, and wherein at least one of the display information on the first interface comprises first display information and second display information, and the first display information and the second display information are displayed in tiles in a horizontal direction, and the second interface comprises the first display information and the second display information, and the first display information and the second display information are displayed in tiles in a vertical direction, or
wherein the screen rotation direction of the second device indicates switching from the portrait mode to the landscape mode, and wherein at least one of the display information on the first interface comprises first display information and second display information, and the first display information and the second display information are displayed in tiles in the vertical direction, and the second interface comprises the first display information and the second display information, and the first display information and the second display information are displayed in tiles in the horizontal direction.

11. The first device according to claim 10, wherein
the screen rotation direction of the second device indicates switching from the landscape mode to the portrait mode, and wherein at least one of the display information on the second interface is more than the display information on the first interface, or the layout manner of the display information on the second interface differs from that of the first interface; or
the screen rotation direction of the second device indicates switching from the portrait mode to the landscape mode, and wherein at least one of the display information on the second interface is less than the display information on the first interface, or the layout manner of the display information on the second interface differs from that of the first interface.

12. The first device according to claim 10, wherein the display information on the second interface being more than the display information on the first interface comprises:
the second interface comprises all display information on the first interface, and the second interface further comprises a part of or all display information on a third interface, wherein the third interface comprises at least:
a following interface of the first interface;
a previous interface of the first interface;
a system default interface; or
a user-specified interface.

13. The first device according to claim 10, wherein to send the display information on the first interface of the first application on the first device to the second device in response to the first operations, the device is caused to:
display the first interface;
determine that a screen display direction of the first device is consistent with that of the second device in response to the first operation; and
send the first interface to the second device in response to the screen display direction of the first device being consistent with that of the second device.

14. The first device according to claim 13, wherein the device is further caused to:
send a fourth interface of the first application to the second device when the screen display direction of the first device is inconsistent with that of the second device, wherein display information on the fourth interface is more than or less than the display information on the first interface, or a layout manner of the display information on the fourth interface differs from that of the first interface.

15. The first device according to claim 14, wherein:
in response to the first device being in the landscape mode and the second device being in the portrait mode:
the display information on the fourth interface is more than that of the first interface, or the first interface comprises first display information and second display information, and the first display information and the second display information are displayed in tiles in the horizontal direction, and
the fourth interface comprises the first display information and the second display information, and the first display information and the second display information are displayed in tiles in the vertical direction; or
in response to the first device being in the portrait mode and the second device being in the landscape mode:
the display information on the fourth interface is less than that of the first interface, or the first interface comprises first display information and second display information, and the first display information and the second display information are displayed in tiles in the vertical direction, and
the fourth interface comprises the first display information and the second display information, and the first display information and the second display information are displayed in tiles in the horizontal direction.

16. The first device according to claim 10, wherein to send the display information on the first interface of the first application on the first device to the second device in response to the first operations, the device is caused to:
create a first virtual display (VD) in response to the first operation, wherein a screen display direction of the first VD is consistent with a current screen display direction of the second device;
transfer the first application to the first VD to initiate running of the first application by the first VD;
display the first interface on the first VD by the first application; and
send the first interface to the second device by the first VD.

17. The first device according to claim 16, wherein to send the display information on the first interface of the first application on the first device to the second device in response to the first operations, the device is caused to:
adjust the screen display direction of the first VD to be consistent with a screen display direction of the second device after the second device is rotated;

adjust the first interface to the second interface by the first application in response to the adjustment for the screen display direction of the first VD; and send, by the first VD, the second interface to the second device.

18. The first device according to claim 10, the device further caused to:

after sending the display information on the first interface of the first application on the first device to the second device in response to the first operations:
  display an interface of a second application; or
  display the first interface.

* * * * *